US007585603B2

(12) United States Patent
Yamada et al.

(10) Patent No.: US 7,585,603 B2

(45) Date of Patent: Sep. 8, 2009

(54) CURABLE RESIN COMPOSITION, ELECTROPHOTOGRAPHIC PHOTORECEPTOR, PROCESS CARTRIDGE, AND IMAGE-FORMING APPARATUS

(75) Inventors: Wataru Yamada, Kanagawa (JP); Katsumi Nukada, Kanagawa (JP); Masahiro Iwasaki, Kanagawa (JP); Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 33 days.

(21) Appl. No.: 11/444,483

(22) Filed: Jun. 1, 2006

(65) Prior Publication Data

US 2007/0003850 A1 Jan. 4, 2007

(30) Foreign Application Priority Data

Jun. 24, 2005 (JP) ............................ 2005-185378
Dec. 26, 2005 (JP) ............................ 2005-373310

(51) Int. Cl.
*G03G 5/07* (2006.01)
*G03G 15/00* (2006.01)
*C08L 71/08* (2006.01)

(52) U.S. Cl. .................. 430/58.7; 430/58.75; 430/58.8; 430/59.6; 430/66; 525/390; 525/396; 399/159

(58) Field of Classification Search ............. 430/58.75, 430/58.8, 58.7, 59.6, 66; 399/159
See application file for complete search history.

(56) References Cited

U.S. PATENT DOCUMENTS 6,416,915 B1 * 7/2002 Kikuchi et al. ................ 430/56
2003/0129512 A1 * 7/2003 Sugino et al. ................. 430/66
2003/0186145 A1 * 10/2003 Morikawa et al. .......... 430/58.8
2004/0265716 A1 * 12/2004 Itami et al. ................. 430/58.8

FOREIGN PATENT DOCUMENTS

| | | | |
|---|---|---|---|
| EP | 1 246 016 A2 | | 3/2002 |
| EP | 1 321 456 A2 | | 12/2002 |
| JP | A-2002-006527 | | 1/2002 |
| JP | 2002-075644 | * | 3/2002 |
| JP | A 2002-075644 | | 3/2002 |
| JP | A-2002-082466 | | 3/2002 |
| JP | A-2002-082469 | | 3/2002 |
| JP | A-2003-186215 | | 7/2003 |
| JP | A-2003-186234 | | 7/2003 |
| JP | A 2005-053845 | | 3/2005 |
| JP | A 2006-084711 | | 3/2006 |

OTHER PUBLICATIONS

Handbook of Plastic Foams Types, Properties, Manufacture, and Applications, Handrock, Arthur, Noyes Publications, Park Ridge, NJ. 1995. pp. 183-184.*

English translation of JP 2002-075644 published Mar. 2002.*

* cited by examiner

*Primary Examiner*—Mark F Huff
*Assistant Examiner*—Peter L Vajda
(74) *Attorney, Agent, or Firm*—Oliff & Berridge, PLC

(57) ABSTRACT

A curable resin composition for use as a constituting material of an electrophotographic photoreceptor, comprises: a phenolic resin; a charge transportable material having a reactive functional group; and at least one of an organic sulfonic acid and its derivative.

15 Claims, 10 Drawing Sheets

CURABLE RESIN COMPOSITION, ELECTROPHOTOGRAPHIC PHOTORECEPTOR, PROCESS CARTRIDGE, AND IMAGE-FORMING APPARATUS

This application claims priority under 35 USC 119 from Japanese patent documents, Japanese Patent Application No. 2005-185378 filed on Jun. 24, 2005, and Japanese Patent Application No. 2005-373310 filed on Dec. 26, 2005, the disclose of which is incorporated by reference herein.

BACKGROUND

1. Technical Field

The present invention relates to a curable resin composition, an electrophotographic photoreceptor, a process cartridge and an image-forming apparatus.

2. Related Art

In recent years, further increment of speed and lengthening of life of an image-forming apparatus of a so-called xerography system having an electrifying section, an exposure section, a developing section and a transfer section are contrived by the technical advancements and developments of each member and the system. With this tendency, demands for high speed responsibility and high reliability of sub-systems are more and more increased. In particular, further high speed responsibility and high reliability are required of electrophotographic photoreceptors (hereinafter referred to as "photoreceptors" according to cases) for use in image-write and cleaning members for cleaning photoreceptors. Moreover, sliding of photoreceptors and cleaning members with each other puts a great stress on the photoreceptors and cleaning members. Accordingly, photoreceptors are susceptible to scratches, abrasions and chipping, which result in the cause of image defects.

On the other hand, demands for high image quality are also severe, and fining of toner particles, homogeneity of particle size distribution and sphering are attempted. As the manufacturing methods of toners satisfying the quality, the developments of toners manufactured in a solvent mainly comprising water, so-called chemical toners, are extensively carried out. As a result, even a photographic image quality can also be obtained in recent years.

For lengthening the life of an electrophotographic photoreceptor, it is extremely important to heighten the mechanical strength of a photosensitive layer constituting a photoreceptor.

SUMMARY

The invention provides a curable resin composition, the curable resin composition comprising: a phenolic resin; a charge transportable material having a reactive functional group; and an organic sulfonic acid and/or its derivative.

BRIEF DESCRIPTION OF THE DRAWINGS

Embodiments will be described in detail based on the following figures, wherein.

DETAILED DESCRIPTION

The exemplary embodiments of the invention are described in detail below with reference to the accompanying drawings. In the following description, the same or corresponding parts are attached with the same sign, and the overlapped description is omitted.

Figure 1:
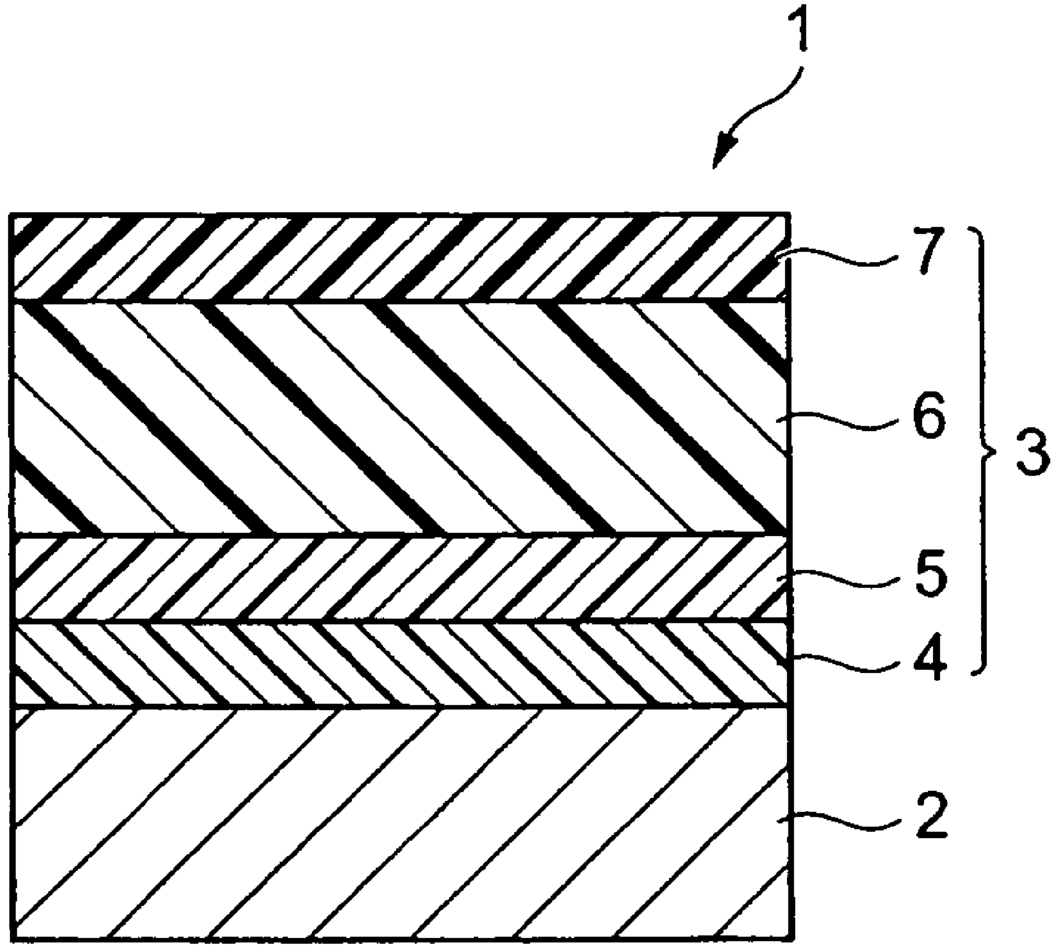
FIG. 1 is a typical cross sectional view showing one exemplary embodiment of an electrophotographic photoreceptor in the invention.

Electrophotographic Photoreceptor and Curable Resin Composition:

FIG. 1 is a typical cross sectional view showing one exemplary embodiment of an electrophotographic photoreceptor in the invention. Electrophotographic photoreceptor 1 shown in FIG. 1 has lamination structure comprising electrically conductive support 2 having thereon in order of undercoat layer 4, charge-generating layer 5, charge-transporting layer 6, and protective layer 7. In electrophotographic photoreceptor 1 shown in FIG. 1, protective layer 7, which is the outermost surface layer, is a functional layer formed of the cured product of the curable resin composition comprising a phenolic resin, a charge transportable material having a reactive functional group, and an organic sulfonic acid and/or the derivative of the organic sulfonic acid.

Figure 2:
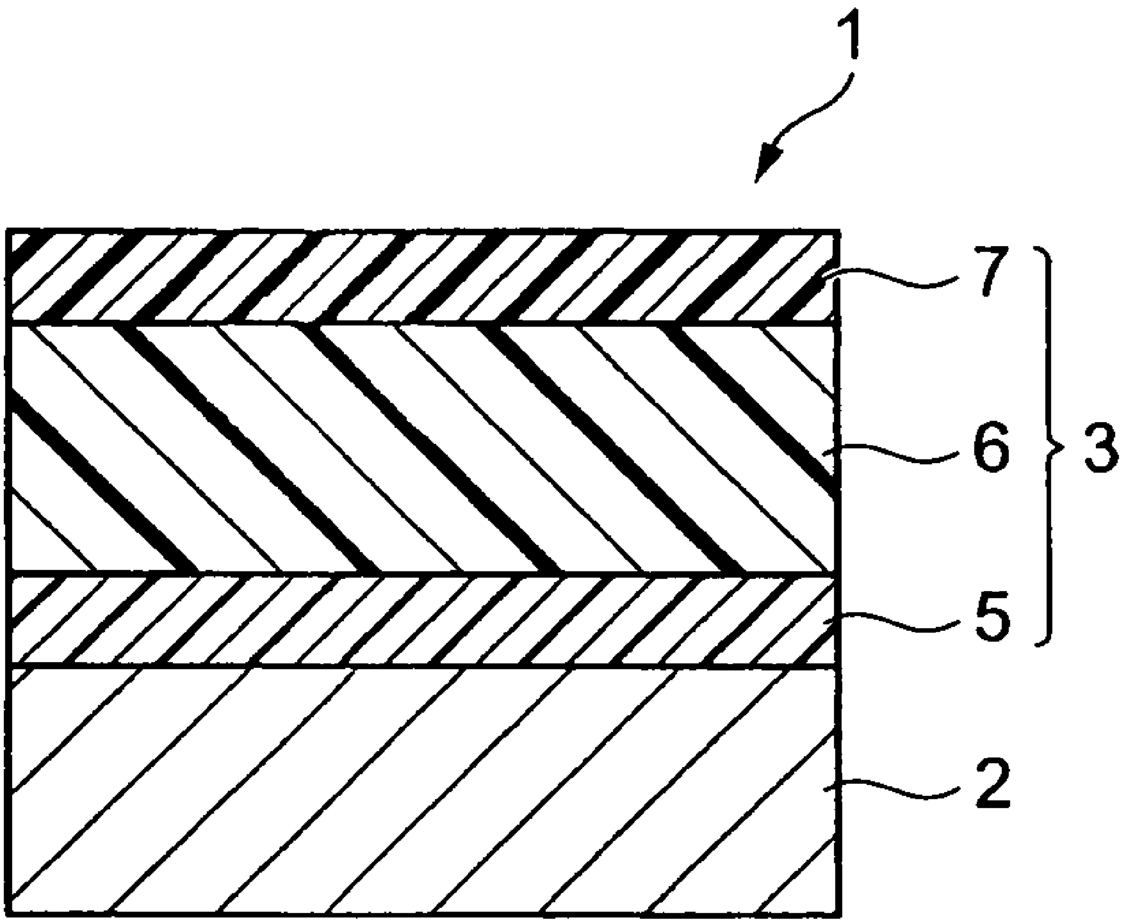
FIG. 2 is a typical cross sectional view showing another exemplary embodiment of an electrophotographic photoreceptor in the invention.
Figure 3:
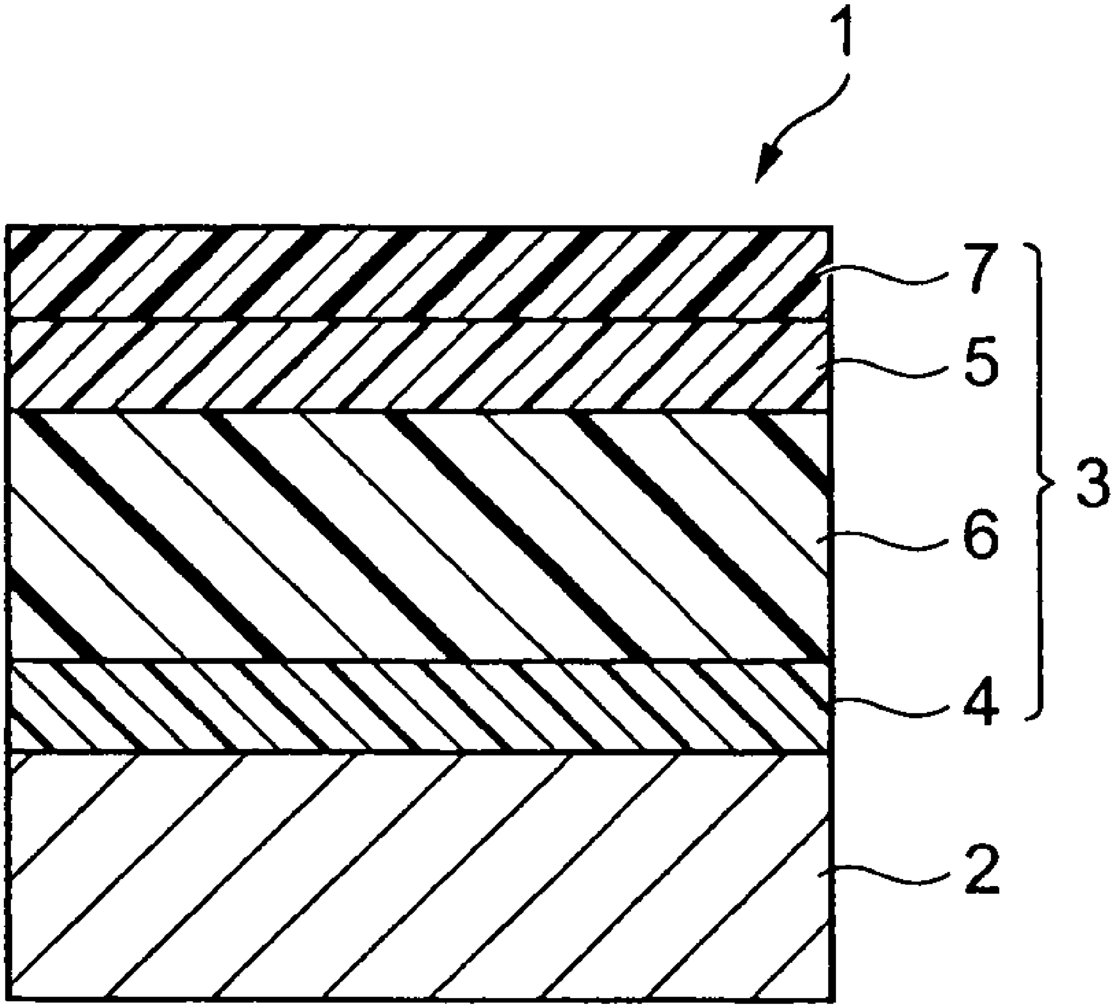
FIG. 3 is a typical cross sectional view showing another exemplary embodiment of an electrophotographic photoreceptor in the invention.
Figure 4:
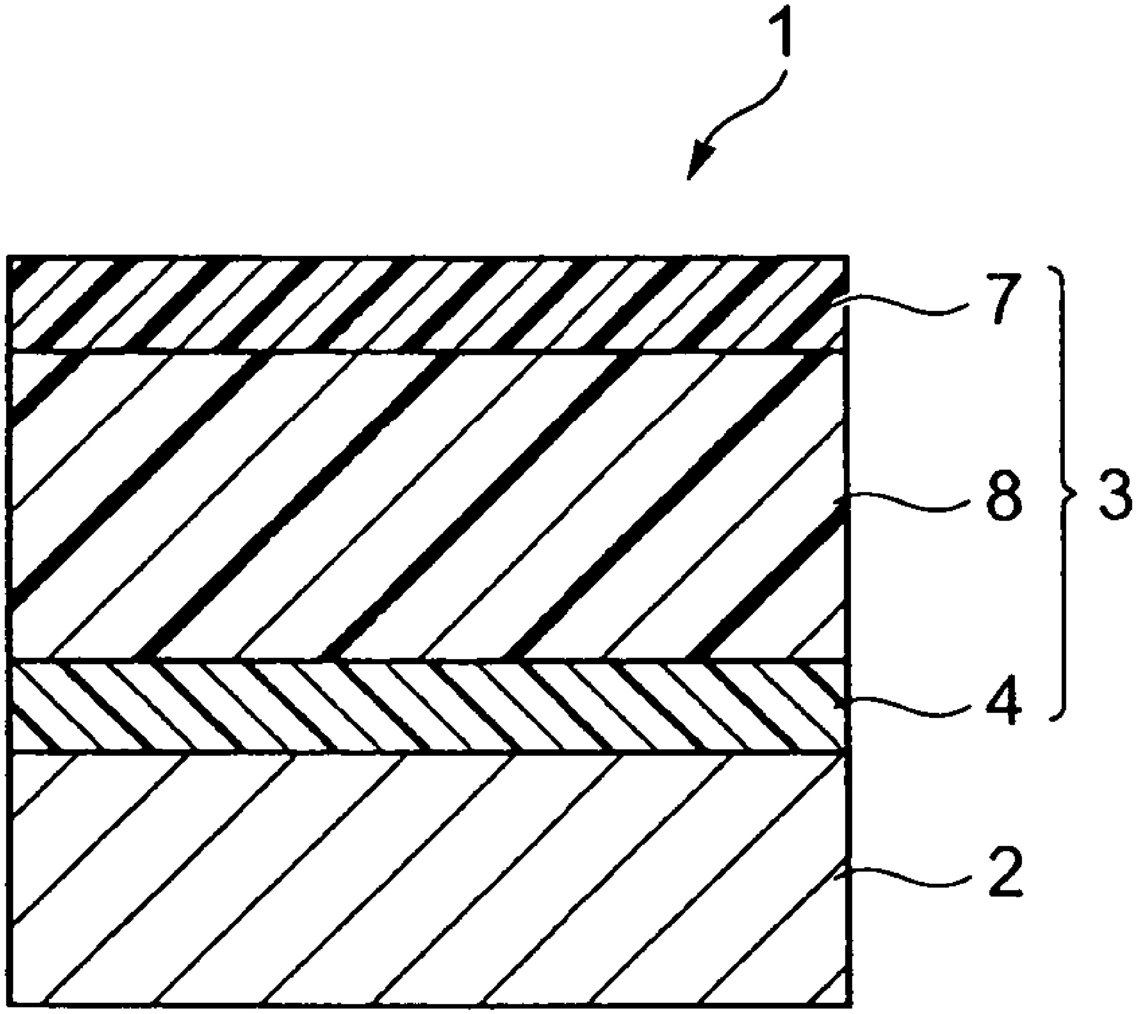
FIG. 4 is a typical cross sectional view showing another exemplary embodiment of an electrophotographic photoreceptor in the invention.
Figure 5:
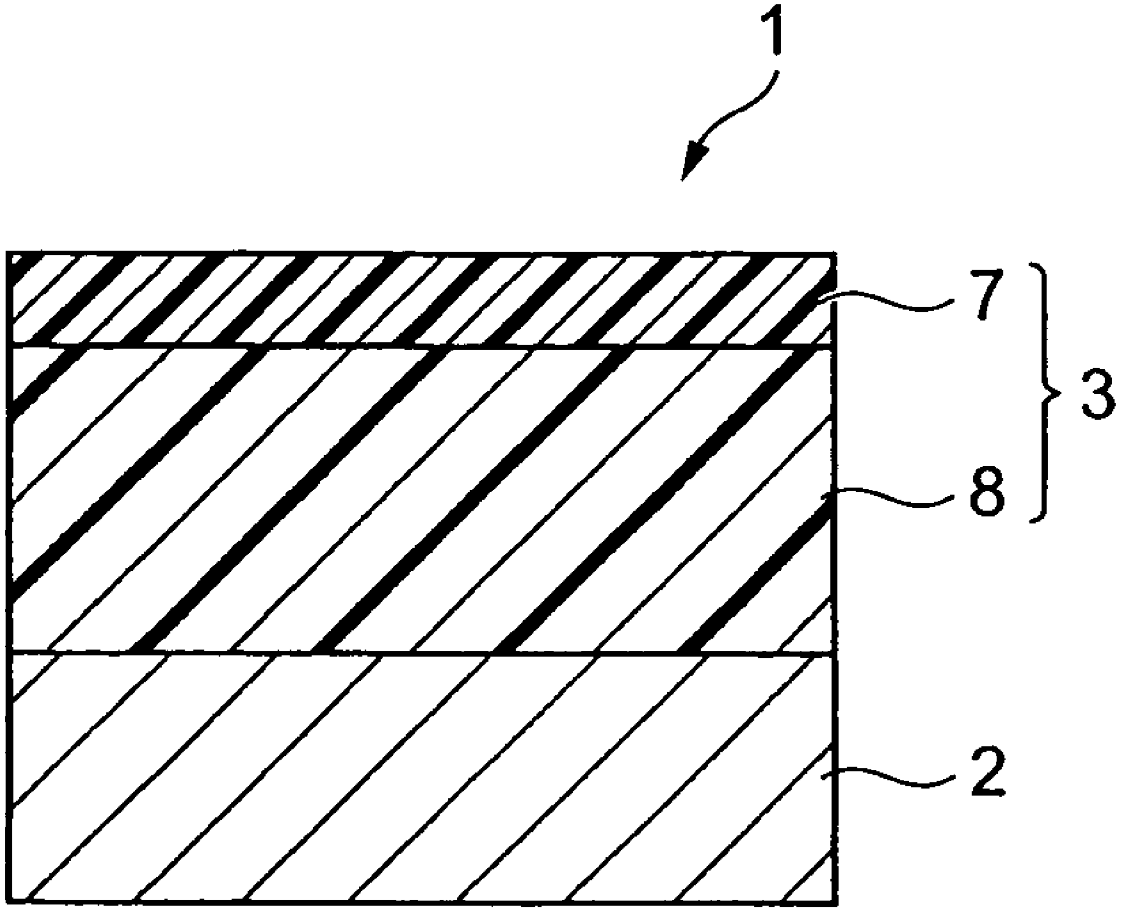
FIG. 5 is a typical cross sectional view showing another exemplary embodiment of an electrophotographic photoreceptor in the invention.

FIGS. 2 to 5 are typical cross sectional views showing other exemplary embodiments of electrophotographic photoreceptors in the invention. Electrophotographic photoreceptors shown in FIGS. 2 and 3 are equipped with photosensitive layer 3 divided in functions to charge-generating layer 5 and charge-transporting layer 6 similarly to the electrophotographic photoreceptor shown in FIG. 1. In FIGS. 4 and 5, a charge-generating material and a charge-transporting material are contained in the same layer (monolayer type photosensitive layer 8).

Electrophotographic photoreceptor 1 shown in FIG. 2 has lamination structure comprising electrically conductive support 2 having thereon in order of charge-generating layer 5, charge-transporting layer 6, and protective layer 7. Electrophotographic photoreceptor 1 shown in FIG. 3 has lamination structure comprising electrically conductive support 2 having thereon undercoat layer 4, charge-transporting layer 6, charge-generating layer 5, and protective layer 7 in this order. In electrophotographic photoreceptors shown in FIGS. 2 and 3, protective layer 7 is a functional layer comprising a cured product of the curable resin composition.

Electrophotographic photoreceptor 1 shown in FIG. 4 has lamination structure comprising electrically conductive support 2 having thereon in order of undercoat layer 4, monolayer type photosensitive layer 8, and protective layer 7. Electrophotographic photoreceptor 1 shown in FIG. 5 has structure comprising electrically conductive support 2 having laminated thereon in order of monolayer type photosensitive layer 8, and protective layer 7. In electrophotographic photoreceptors shown in FIGS. 4 and 5, protective layer 7 is a functional layer comprising a cured product of the curable resin composition.

As described above, the photosensitive layer of the electrophotographic photoreceptor in the invention may be a monolayer type photosensitive layer in which a charge-generating material and a charge-transporting material are contained in the same layer, or may be a function-separating type photosensitive layer comprising separately a layer containing a charge-generating material (a charge-generating layer) and a layer containing a charge-transporting material (a charge-transporting layer). In the case of a function-separating type photosensitive layer, either a charge-generating layer or a charge-transporting layer may be an upper layer. In the case of a function-separating type photosensitive layer, a higher function can be realized, since the functions are separated and it is sufficient for each layer to satisfy each function.

Each element is described on the basis of electro-photographic photoreceptor 1 shown in FIG. 1 as a representative example.

As electrically conductive support 2, a metal plate, a metal drum, a metal belt, etc., composed of a metal or an alloy, e.g., aluminum, copper, zinc, stainless steel, chromium, nickel, molybdenum, vanadium, indium, gold, platinum, etc., are exemplified. As electrically conductive support 2, paper, a plastic film and a belt coated, deposited or laminated with an electrically conductive compound, e.g., an electrically conductive polymer, indium oxide, etc., or a metal or an alloy, e.g., aluminum, palladium, gold, etc., can also be used.

For preventing the interference fringe occurring in laser beam irradiation, it is preferred that the surface of electrically conductive support 2 is subjected to surface roughening treatment to have a central line average surface roughness (Ra) of from 0.04 to 0.5 μm. When the Ra of the surface of electrically conductive support 2 is less than 0.04 μm, preventing effect of the interference fringe is liable to be insufficient, since the surface is close to mirror face. On the other hand, when the Ra exceeds 0.5 μm, an image quality is liable to be insufficient even if a film is formed. When incoherent lights are used as the light source, the surface roughening treatment for the prevention of interference fringe is not especially necessary, and this is suitable for lengthening the life, since the generation of defects due to surface unevenness of electrically conductive support 2 can be prevented.

As surface roughening treatments, wet honing of spraying an abrasive suspended in water on a support, centerless grinding of performing continuous grinding processing by pressing a support to a rotary grinding stone, and anodizing treatment are preferred.

As another surface roughening method, a method of dispersing electrically conductive or semi-conductive powder in a resin and forming a layer of the dispersion on the surface of a support, and roughening the surface by the fine particles dispersed in the layer, without roughening the surface of electrically conductive support 2, can also be preferably used.

The anodizing treatment is to perform anodization in an electrolytic solution with aluminum as the anode to form an oxide film on the surface of the aluminum. As the electrolytic solution, a sulfuric acid solution, an oxalic acid solution and the like are exemplified. However, a porous anodic oxide film as it stands is chemically active and is liable to be contaminated and the resistance fluctuation due to atmosphere is great. Accordingly, sealing treatment is performed to seal micro pores of the anodic oxide film by volume expansion by hydration in steam under pressure or boiling water (a metal salt, e.g., a nickel salt etc. may be added) to thereby change the surface to a more stable hydrated oxide.

The thickness of an anodic oxide film is preferably from 0.3 to 15 μm. When the thickness is less than 0.3 μm, a barrier property against injection is low, so that the effect of the treatment tends to be insufficient. On the other hand, when the thickness exceeds 15 μm, residual electric potential is liable to increase by repeated use.

Further, electrically conductive support 2 may be subjected to treatment with an acid aqueous solution or boehmite treatment. The treatment with an acid treating solution comprising phosphoric acid, chromic acid and hydrofluoric acid is performed as follows. In the first place, an acid treating solution is prepared. The blending ratio of phosphoric acid, chromic acid and hydrofluoric acid in the acid treating solution is such that phosphoric acid is in the range of from about 10 to about 11 weight %, chromic acid is in the range of from about 3 to about 5 weight %, and hydrofluoric acid is in the range of from about 0.5 to about 2 weight %, and the concentration at large of these acids is preferably in the range of from about 13.5 to about 18 weight %. The treatment temperature is preferably from 42 to 48° C., but by maintaining the temperature high, the treatment can be expedited and a thicker film can be formed. The film thickness is preferably from 0.3 to 15 μm. When the thickness is less than 0.3 μm, a barrier property against injection is low, so that the effect of the treatment tends to be insufficient. On the other hand, when the thickness exceeds 15 μm, residual electric potential is liable to increase by repeated use.

Boehmite treatment can be performed by the dip of a support in pure water at 90 to 100° C. for 5 to 60 minutes, or in steam heated at 90 to 120° C. for 5to 60 minutes. The film thickness is preferably from 0.1 to 5 μm. The treated support may further be subjected to anodizing treatment with an electrolytic solution having low solubility of the film, such as adipic acid, boric acid, borate, phosphate, phthalate, maleate, benzoate, tartrate or citrate.

Undercoat layer 4 is formed on electrically conductive support 2. Undercoat layer 4 is composed of, e.g., an organic metal compound and/or a binder resin.

As the organic metal compounds, organic zirconium compounds, e.g., zirconium chelate compounds, zirconium alkoxide compounds, and zirconium coupling compounds, organic titanium compounds, e.g., titanium chelate compounds, titanium alkoxide compounds, and titanate coupling compounds, organic aluminum compounds, e.g., aluminum chelate compounds and aluminum coupling compounds, in addition, antimony alkoxide compounds, germanium alkoxide compounds, indium alkoxide compounds, indium chelate compounds, manganese alkoxide compounds, manganese chelate compounds, tin alkoxide compounds, tin chelate compounds, aluminum silicon alkoxide compounds, aluminum titanium alkoxide compounds, and aluminum zirconium alkoxide compounds are exemplified.

As the organic metal compounds, organic zirconium compounds, organic titanyl compounds and organic aluminum compounds are especially preferably used for their low residual electric potential and showing good electrophotographic characteristics.

As the binder resins, well-known resins, e.g., polyvinyl alcohol, polyvinyl methyl ether, poly-N-vinylimidazole, polyethylene oxide, ethyl cellulose, methyl cellulose, an ethylene-acrylic acid copolymer, polyamide, polyimide, casein, gelatin, polyethylene, polyester, phenolic resin, a vinyl chloride-vinyl acetate copolymer, epoxy-resin, polyvinyl pyrrolidone, polyvinylpyridine, polyurethane, polyglutamic acid, and polyacrylic acid are exemplified. These binder resins may be used in combination of two or more in an arbitrary blending ratio according to necessity.

Undercoat layer 4 may contain a silane coupling agent, e.g., vinyltrichlorosilane, vinyltrimethoxysilane, vinyltriethoxysilane, vinyltris-2-methoxyethoxysilane, vinyltriacetoxysilane, γ-glycidoxypropyltrimethoxysilane, γ-methacryloxypropyltrimethoxysilane, γ-aminopropyltriethoxysilane, γ-chloropropyltrimethoxysilane, γ-2-aminoethylaminopropyltrimethoxysilane, γ-mercaptopropyltrimethoxysilane, γ-ureidopropyltriethoxysilane, and β-3,4-epoxycyclohexyltrimethoxysilane.

An electron transportable pigment can also be used in undercoat layer 4 as mixture and dispersion in view of low residual electric potential and environmental stability. The examples of the electron transportable pigments include organic pigments disclosed in JP-A-47-30330, e.g., a perylene pigment, a bisbenzimidazole-perylene pigment, a polycyclic quinone pigment, an indigo pigment, and a quinacridone pigment, organic pigments such as visas pigments having an electron attractive substituent, e.g., a cyano group, a nitro group, a nitroso group, or a halogen atom, and phthalocyanine pigments, and inorganic pigments, e.g., zinc oxide and titanium oxide.

Among these pigments, a perylene pigment, a bisbenzimidazole-perylene pigment, a polycyclic quinone pigment, zinc oxide and titanium oxide are preferably used for their high electron transferability.

The surfaces of these pigments may be subjected to surface treatment with the above coupling agents and binder resins for the purpose of controlling dispersibility and charge transportability Too much an amount of the electron transportable pigment lowers the strength of undercoat layer 4 and causes film defects, so that the amount is preferably about 95 weight % or less on the basis of the total amount of the solids content in undercoat layer 4, more preferably about 90 weight % or less.

For the purpose of improving electric characteristics and a light scattering property, it is preferred to add fine powders of various organic and inorganic compounds to undercoat layer 4. In particular, white pigments, e.g., titanium oxide, zinc oxide, zinc flower, zinc sulfide, white lead and lithopone, inorganic pigments as extender pigments, e.g., alumina, calcium carbonate and barium sulfate, and polytetrafluoro-ethylene resin particles, benzoguanamine resin particles and styrene resin particles are effectively used.

The fine powders to be added preferably have a volume average particle size of from 0.01 to 2 μm. The fine powders are added according to necessity, and the addition amount is preferably from about 10 to about 90 weight % on the basis of the total amount of the solids content in undercoat layer 4, more preferably from about 30 to about 80 weight %.

Undercoat layer 4 is formed with a coating solution for forming undercoat layer 4 containing these constitutional components. Organic solvents used in the coating solution for forming undercoat layer are not limited so long as they can dissolve the organic metal compounds and the binder resins, and do not cause gelation and agglomeration when the electron transportable pigments are mixed and/or dispersed.

As the organic solvents, generally used solvents can be used, e.g., methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene and toluene are exemplified. These solvents may be used alone, or two or more solvents may be used as mixture.

Constitutional components are mixed and/or dispersed according to an ordinary method using, e.g., a ball mill, a roll mill, a sand mill, an attritor, a vibrating ball mill, a colloid mill, a paint shaker or ultrasonic waves. Mixing and/or dispersion are carried out in an organic solvent.

As the coating method of undercoat layer 4, ordinary coating methods, e.g., blade coating, wire bar coating, spray coating, dip coating, bead coating, air knife coating, and curtain coating can be used.

Drying is generally performed at a temperature capable of evaporating the solvent and forming a film. Electrically conductive support 2 subjected to treatment with an acid aqueous solution or boehmite treatment is particularly liable to be insufficient in hiding power of the defect of the substrate, so that it is preferred to form undercoat layer 4.

Undercoat layer 4 has a thickness of preferably from 0.01 to 30 μm, more preferably from 0.05 to 25 μm.

Charge-generating layer 5 is composed of a charge-generating material, further, if necessary, a binder resin.

As the charge-generating materials, well known materials, for example, organic pigments, such as azo pigments, e.g., bisazo and trisazo, condensed ring aromatic pigments, e.g., dibromoanthoanthrone, and a perylene pigment, a pyrrolopyrrole pigment, a phthalocyanine pigment, etc., and inorganic pigments, such as trigonal selenium and zinc oxide can be used. Of these, hydroxygallium phthalocyanines disclosed in JP-A-5-263007 and JP-A-5-279591, chlorogallium phthalocyanines disclosed in JP-A-5-98181, dichlorotin phthalocyanines disclosed in JP-A-5-140472 and JP-A-5-140473, and titanyl phthalocyanines disclosed in JP-A-4-189873 and JP-A-5-43813 are especially preferably used.

Of the hydroxygallium phthalocyanines, those having absorption maximum in spectral absorption spectrum of 810 to 839 nm, a primary particle size of 0.10 μm or less, and a specific surface area value by a BET method of 45 $m^2/g$ or more are especially preferred.

When light sources of exposure wavelength of from 380 to 500 nm are used, metallic or nonmetallic phthalocyanine pigments, trigonal selenium and dibromoanthoanthrone are preferably used as the charge-generating materials.

The binder resins can be selected from among a wide range of insulating resins. The binder resins can also be selected from among organic photoconductive polymers, e.g., poly-N-vinylcarbazole, polyvinylanthracene, polyvinylpyrene and polysilane. As preferred binder resins, insulating resins, such as polyvinyl butyral resins, polyallylate resins (polycondensation products of bisphenol A and phthalic acid, etc.), polycarbonate resins, polyester resins, phenoxy resins, vinyl chloride-vinyl acetate copolymers, polyamide resins, acrylic resins, polyacrylamide resins, polyvinylpyridine resins, cellulose resins, urethane resins, epoxy resins, casein, polyvinyl alcohol resins, and polyvinyl pyrrolidone resins are exemplified, but the invention is not limited thereto. These binder resins can be used alone or two or more resins can be used as mixture.

Charge-generating layer 5 is formed by deposition of a charge-generating material, or by coating of a charge-generating layer-forming coating solution containing a charge-generating material and a binder resin. When charge-generating layer 5 is formed with a charge-generating layer-forming coating solution, the compounding ratio (by weight)

of the charge-generating material and the binder resin is preferably in the range of from 10/1 to 1/10.

For dispersing the constitutional materials in a charge-generating layer-forming coating solution, ordinary dispersing methods, e.g., a ball mill dispersing method, an attritor dispersing method and a sand mill dispersing method can be used. At this time, conditions that do not change the crystal form of the pigment by dispersion are required. Further, it is effective to make a particle size preferably to 0.5 μm or less by dispersion, more preferably 0.3 μm or less, and still more preferably 0.15 μm or less.

As the organic solvents for use in dispersion, generally used organic solvents can be used, e.g., methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene and toluene are exemplified. These solvents may be used alone, or two or more solvents may be used as mixture.

For forming charge-generating layer 5 with a charge-generating layer-forming coating solution, ordinary coating methods, e.g., blade coating, wire bar coating, spray coating, dip coating, bead coating, air knife coating, and curtain coating can be used.

The thickness of charge-generating layer 5 is preferably from 0.1 to 5 μm, more preferably from 0.2 to 2.0 μm.

Charge-transporting layer 6 is composed of a charge-transporting material and a binder resin, or a charge-transporting polymeric material.

As the charge-transporting materials, electron transportable compounds, such as quinone compounds, e.g., p-benzoquinone, chloranyl, bromanyl and anthraquinone, tetracyanoquinodimethane compounds, fluorenone compounds, e.g., 2,4,7-trinitrofluorenone, xanthone compounds, benzophenone compounds, cyanovinyl compounds, and ethylene compounds, and positive hole-transportable compounds such as triarylamine compounds, benzidine compounds, arylalkane compounds, aryl-substituted ethylene compounds, stilbene compounds, anthracene compounds, and hydrazone compounds are exemplified, but the invention is not restricted to these compounds. These charge-transporting materials can be used alone or two or more materials can b used as mixture.

In view of mobility, a compound represented by the following formula (a-1), (a-2) or (a-3) is preferably used as the charge-transporting material.

(a-1)

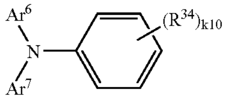

In formula (a-1), $R^{34}$ represents a hydrogen atom or a methyl group, k10 represents 1 or 2, and $Ar^6$ and $Ar^7$ each represents a substituted or unsubstituted aryl group, $-C_6H_4-C(R^{38})=C(R^{39})(R^{40})$, or $-C_6H_4-CH=CH-CH=C(Ar)_2$. As the substituents, a halogen atom, an alkyl group having from 1 to 5 carbon atoms, an alkoxyl group having from 1 to 5 carbon atoms, and a substituted amino group substituted with an alkyl group having from 1 to 3 carbon atoms are exemplified. $R^{38}$, $R^{39}$ and $R^{40}$ each represents a hydrogen atom, a substituted or unsubstituted alkyl group, or a substituted or unsubstituted aryl group, and Ar represents a substituted or unsubstituted aryl group.

(a-2)

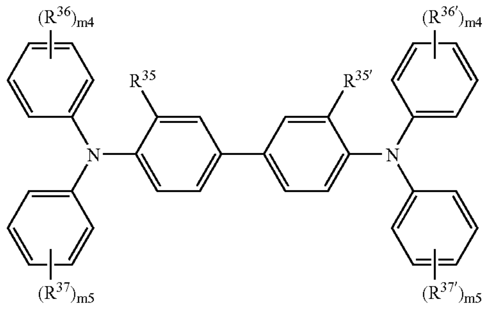

In the above formula (a-2), $R^{35}$ and $R^{35'}$ each represents a hydrogen atom, a halogen atom, an alkyl group having from 1 to 5 carbon atoms, or an alkoxyl group having from 1 to 5 carbon atoms, $R^{36}$, $R^{36'}$, $R^{37}$ and $R^{37'}$ each represents a halogen atom, an alkyl group having from 1 to 5 carbon atoms, an alkoxyl group having from 1 to 5 carbon atoms, an amino group substituted with an alkyl group having 1 or 2 carbon atoms, a substituted or unsubstituted aryl group, $-C(R^{38})=C(R^{39})(R^{40})$, or $-CH=CH-CH=C(Ar)_2$, $R^{38}$, $R^{39}$ and $R^{40}$ each represents a hydrogen atom, a substituted or unsubstituted alkyl group, or a substituted or unsubstituted aryl group, Ar represents a substituted or unsubstituted aryl group, and m4 and m5 each represents an integer of from 0 to 2.

(a-3)

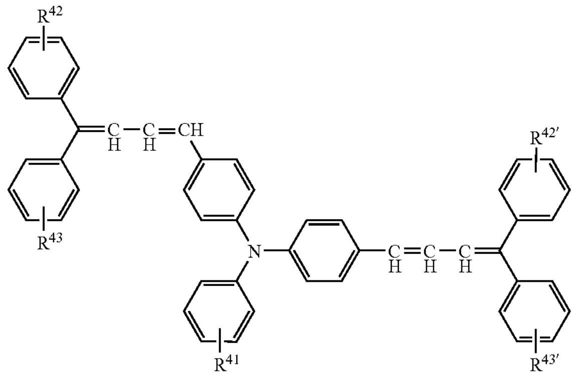

In the above formula (a-3), $R^{41}$ represents a hydrogen atom, an alkyl group having from 1 to 5 carbon atoms, an alkoxyl group having from 1 to 5 carbon atoms, a substituted or unsubstituted aryl group, or $-CH=CH-CH=C(Ar)_2$, Ar represents a substituted or unsubstituted aryl group, and $R^{42'}$, $R^{42}$, $R^{43}$ and $R^{43'}$ each represents a hydrogen atom, a halogen atom, an alkyl group having from 1 to 5 carbon atoms, an alkoxyl group having from 1 to 5 carbon atoms, an amino group substituted with an alkyl group having 1 or 2 carbon atoms, or a substituted or unsubstituted aryl group.

As the binder resins for use in charge-transporting layer 6, polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, and styrene-alkyd resins are exemplified. These binder resins can be used alone or two or more resins can be used as mixture. The compounding ratio (by weight) of the charge-transporting material and the binder resin is preferably in the range of from 10/1 to 1/5.

As the charge-transporting polymeric materials, well-known polymeric materials having charge transportability, e.g., poly-N-vinylcarbazole and polysilane can be used. Polyester series charge-transporting polymeric materials disclosed in JP-A-8-176293 and JP-A-8-208820 have high charge transportability and especially preferred.

Charge-transporting polymeric materials can be used alone as the constituent of the charge-transporting layer 6, but they may be mixed with the binder resins to form a film.

Charge-transporting layer 6 is formed with a charge-transporting layer-forming coating solution containing the above constituting materials.

As the solvents for a charge-transporting layer-forming coating solution, ordinarily used organic solvents, such as aromatic hydrocarbons, e.g., benzene, toluene, xylene, and chlorobenzene, ketones, e.g., acetone and 2-butanone, halogenated aliphatic hydrocarbons, e.g., methylene chloride, chloroform, and ethylene chloride, and cyclic or straight chain ethers, e.g., tetrahydrofuran and ethyl ether are exemplified. These solvents can be used alone or two or more solvents can be used as mixture.

As the coating method of a charge-transporting layer-forming coating solution, ordinary coating methods, e.g., blade coating, wire bar coating, spray coating, dip coating, bead coating, air knife coating, and curtain coating can be used.

The thickness of charge-transporting layer 6 is preferably from 5 to 50 μm, more preferably from 10 to 30 μm.

For the purpose of preventing the photoreceptor from being deteriorated by ozone and oxidizing gas generating in the image forming apparatus or light and heat, additives such as an antioxidant, a light stabilizer and heat stabilizer can be added to photosensitive layer 3.

As the antioxidants, e.g., hindered phenol, hindered amine, paraphenylenediamine, arylalkane, hydroquinone, spirochroman, spiroindanone and derivatives of these compounds, organic sulfur compounds and organic phosphorus compounds are exemplified. As the light stabilizers, e.g., derivatives of benzophenone, benzotriazole, dithiocarbamate and tetramethylpiperidine are exemplified.

In addition, for the purpose of the improvement of sensitivity, the reduction of residual electric potential, and the reduction of fatigue due to repeating use, at least one electron accepting material can be added to photosensitive layer 3.

As the electron accepting materials, e.g., succinic anhydride, maleic anhydride, dibromomaleic anhydride, phthalic anhydride, tetrabromophthalic anhydride, tetra-cyanoethylene, tetracyanoquinodimethane, o-dinitrobenzene, m-dinitrobenzene, chloranyl, dinitroanthraquinone, trinitro-fluorenone, picric acid, o-nitrobenzoic acid, p-nitrobenzoic acid, and phthalic acid can be exemplified. Of these compounds, fluorenone series and quinone series compounds, and benzene derivatives having an electron attractive substituent, e.g., Cl, CN, $NO_2$, are especially preferred.

In the electrophotographic photoreceptor in the invention, protective layer 7 is the outermost surface layer formed of the cured product of the curable resin composition comprising a phenolic resin, a charge transportable material having a reactive functional group, and an organic sulfonic acid and/or the derivative of the organic sulfonic acid. Each component constituting the curable resin composition is explained below.

As the phenolic resins, compounds having a phenolic structure, such as resorcin and bisphenols, substituted phenols having one hydroxyl group, e.g., phenol, cresol, xylenol, para-alkylphenol, and paraphenylphenol, substituted phenols having two hydroxyl groups, e.g., catechol, resorcinol and hydroquinone, bisphenols, e.g., bisphenol A and bisphenol Z, or biphenols are reacted with formaldehyde or paraformaldehyde in the presence of an acid catalyst or an alkali catalyst to manufacture monomers of monomethylolphenols, dimethylolphenols, or trimethylolphenols, mixtures of these compounds, oligomerized products of these compounds, and the mixtures of the monomers and oligomers. Of these compounds, relatively large molecules having constitutional repeating units of from 2 to 20 or so are oligomers, and lower than these are monomers.

As the acid catalysts at this time, sulfuric acid, paratoluenesulfonic acid, phenolsulfonic acid, and phosphoric acid are used. As the alkali catalysts, hydroxides and oxides of alkali metals and alkaline earth metals, e.g., NaOH, KOH, $Ca(OH)_2$, $Mg(OH)_2$, $Ba(OH)_2$, CaO, and MgO, amine series catalysts, and acetates, e.g., zinc acetate and sodium acetate are used.

As the amine series catalysts, ammonia, hexamethylenetetramine, trimethylamine, triethylamine and triethanolamine are exemplified, but the invention is not limited thereto.

When basic catalysts are used, there are cases where a carrier is conspicuously trapped with residual catalysts and electrophotographic characteristics are deteriorated. In such a case, it is preferred to distill off the residual catalysts under reduced pressure, neutralize with an acid, inactivate by making contact with an adsorbent, e.g., silica gel, or ion exchange resins, or remove the residual catalysts. A curing catalyst can also be used in curing. The curing catalysts are not especially restricted so long as they do not adversely affect electric characteristics.

It is necessary that at least an organic sulfonic acid and/or the derivative of the organic sulfonic acid be used in the curable resin composition as the acid catalyst.

As the organic sulfonic acids and/or the derivatives of the organic sulfonic acids, e.g., paratoluenesulfonic acid, dinonylnaphthalenesulfonic acid (DNNSA), dinonylnaphthalenedisulfonic acid (DNNDSA), dodecylbenzenesulfonic acid and phenolsulfonic acid are exemplified. Of these compounds, paratoluenesulfonic acid and dodecylbenzenesulfonic acid are preferred from the points of a catalytic function and film-forming property. Further, organic sulfonates can also be used, if they are dissociable in the curable resin composition to a certain degree.

The content of the phenolic resin in the curable resin composition is preferably from about 20 to about 90 weight % on the basis of the total amount of the solids content in the curable resin composition, especially preferably from about 30 to about 70 weight %. When the content of the phenolic resin is less than about 20 weight %, the mechanical strength of protective layer 7 is liable to be insufficient, and when the content exceeds about 90 weight %, smooth transfer of charge is difficult, so that electric characteristics are liable to be insufficient.

The content of the organic sulfonic acid and/or the derivative of the organic sulfonic acid in the curable resin composition is preferably from about 0.1 to about 5 weight % on the basis of the total amount of the solids content in the curable resin composition, more preferably from about 0.05 to about 3 weight %, and especially preferably from about 0.1 to about 1 weight %. When the content is less than about 0.01 weight %, the effects of catalysts cannot be obtained sufficiently, so that the mechanical strength of protective layer 7 is liable to be insufficient, while when the content exceeds about 5 weight %, the ability as a dopant becomes too high and there is the possibility of the increase of dark current.

As the charge transportable materials having a reactive functional group, those having good compatibility with the phenolic resins used are preferred, and those forming chemical bonding with the phenolic resins used are more preferred.

As the charge transportable material having a reactive functional group, a compound represented by any of formula (I), (II), (III), (IV) or (XVIII) is preferred for being excellent in a film-forming property, mechanical strength and stability.

$$F[-(X^1)_{n1}R^1\text{-}Z^1H]_{m1} \qquad (I)$$

wherein F represents an organic group derived from a compound having a positive hole-transporting property, $R^1$ represents an alkylene group, $z^1$ represents an oxygen atom, a sulfur atom, NH or COO, $X^1$ represents an oxygen atom or a sulfur atom, m1 represents an integer of from 1 to 4, and n1 represents 0 or 1;

$$F[-(X^2)_{n2}-(R^2)_{n3}\text{-}(Z^2)_{n4}G]_{n5} \qquad (II)$$

wherein F represents an organic group derived from a compound having a positive hole-transporting property, $X^2$ represents an oxygen atom or a sulfur atom, $R^2$ represents an alkylene group, $z^2$ represents an oxygen atom, a sulfur atom, NH or COO, G represents an epoxy group, n2, n3 and n4 each represents 0 or 1, and n5 represents an integer of from 1 to 4;

(III)

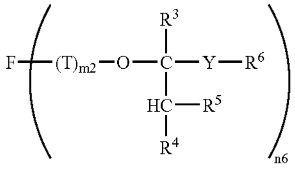

wherein F represents an organic group derived from a compound having a positive hole-transporting property, T represents a divalent group, Y represents an oxygen atom or a sulfur atom, $R^3$, $R^4$ and $R^5$ each represents a hydrogen atom or a monovalent organic group, $R^6$ represents a monovalent organic group, m2 represents 0 or 1, and n6 represents an integer of from 1 to 4, provided that $R^5$ and $R^6$ may be bonded to each other to form a heterocyclic ring with Y as a hetero atom;

(IV)

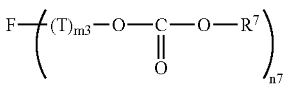

wherein F represents an organic group derived from a compound having a positive hole-transporting property, T represents a divalent group, $R^7$ represents a monovalent organic group, m3 represents 0 or 1, and n7 represents an integer of from 1 to 4;

(XVIII)

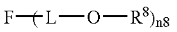

wherein F represents an organic group derived from a compound having a positive hole-transporting property; $R^8$ represents a monovalent organic group; L represents an alkylene group; and n8 represents an integer of from 1 to 4.

Further, F in the compound represented by any of the above formulae (I) to (IV) and (XVIII) is preferably a group represented by the following formula (V):

(V)

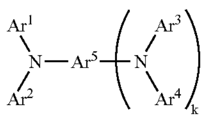

wherein $Ar^1$, $Ar^2$, $Ar^3$ and $Ar^4$ each represents a substituted or unsubstituted aryl group; $Ar^5$ represents a substituted or unsubstituted aryl group or arylene group; provided that from 1 to 4 of $Ar^1$ to $Ar^5$ have a hand to be bonded to a site represented by the following formula (VI) in the compound represented by formula (I), a site represented by the following formula (VII) in the compound represented by formula (II), a site represented by the following formula (VIII) in the compound represented by formula (III), a site represented by the following formula (IX) in the compound represented by formula (IV), or a site represented by the following formula (XIX) in the compound represented by formula (XVIII):

$$-(X^1)_{n1}R^1\text{-}Z^1H \qquad (VI)$$

$$-(X^2)_{n2}-(R^2)_{n3}\text{-}(Z^2)_{n4}G \qquad (VII)$$

(VIII)

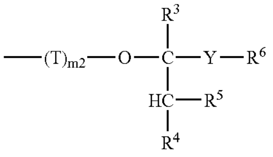

(IX)

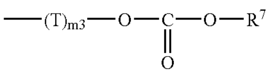

(XIX)

$$-L-O-R^8$$

As the substituted and unsubstituted aryl groups represented by $Ar^1$ to $Ar^4$ in the above formula (V), specifically the aryl groups represented by the following formulae (1) to (7) are preferred.

(1)

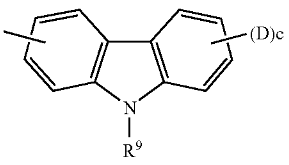

(2)

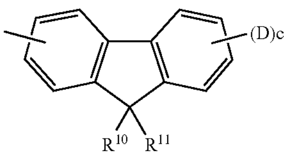

-continued (3)
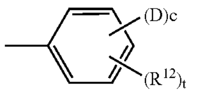

(4)
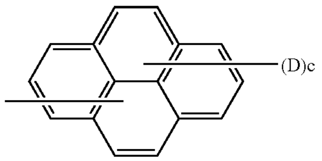

(5)
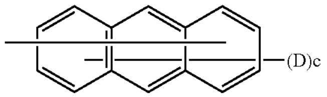

(6)
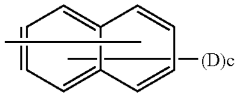

(7)
—Ar—(Z')s—Ar—(D)c

In formulae (1) to (7), $R^9$ represents a hydrogen atom, an alkyl group having from 1 to 4 carbon atoms, an alkoxyl group having from 1 to 4 carbon atoms, a phenyl group substituted with these groups, an unsubstituted phenyl group, or an aralkyl group having from 7 to 10 carbon atoms, $R^{10}$, $R^{11}$ and $R^{12}$ each represents a hydrogen atom, an alkyl group having from 1 to 4 carbon atoms, an alkoxyl group having from 1 to 4 carbon atoms, a phenyl group substituted with these groups, an unsubstituted phenyl group, an aralkyl group having from 7 to 10 carbon atoms, or a halogen atom, Ar represents a substituted or unsubstituted arylene group, D represents any structure represented by formula (VI), (VII), (VIII) or (IX), c and s each represents 0 or 1, and t represents an integer of from 1 to 3.

As Ar in the aryl group represented by the above formula (7), an arylene group represented by the following formula (8) or (9) is preferred.

(8)
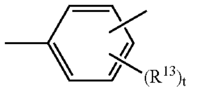

(9)
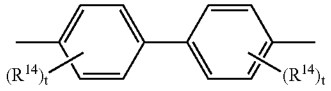

formulae (8) and (9), $R^{13}$ and $R^{14}$ each represents a hydrogen atom, an alkyl group having from 1 to 4 carbon atoms, an alkoxyl group having from 1 to 4 carbon atoms, a phenyl group substituted with an alkoxyl group having from 1 to 4 carbon atoms, an unsubstituted phenyl group, an aralkyl group having from 7 to 10 carbon atoms, or a halogen atom, and t represents an integer of from 1 to 3.

As Z' in the aryl group represented by the above formula (7), a divalent group represented by any of the following formulae (10) to (17) is preferred.

$-(CH_2)_q-$ (10)

$-(CH_2CH_2O)_r-$ (11)

(12)
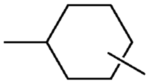

(13)
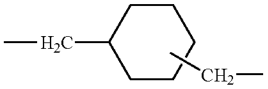

(14)
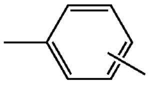

(15)
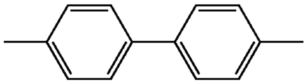

(16)
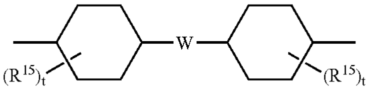

(17)
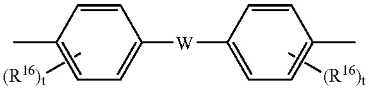

In formulae (10) to (17), $R^{15}$ and $R^{16}$ each represents a hydrogen atom, an alkyl group having from 1 to 4 carbon atoms, an alkoxyl group having from 1 to 4 carbon atoms, a phenyl group substituted with an alkoxyl group having from 1 to 4 carbon atoms, an unsubstituted phenyl group, an aralkyl group having from 7 to 10 carbon atoms, or a halogen atom, W represents a divalent group, q and r each represents an integer of from 1 to 10, and t represents an integer of from 1 to 3.

In the above formula (16) or (17), W represents a divalent group represented by any of the following formulae (18) to (26). In formula (25), u represents an integer of from 0 to 3.

$-CH_2-$ (18)

$-C(CH_3)_2-$ (19)

$-O-$ (20)

$-S-$ (21)

$-C(CF_3)_2-$ (22)

$-Si(CH_3)_2-$ (23)

(24)
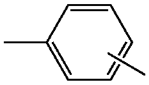

(25)
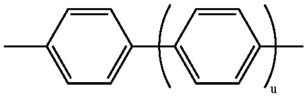

-continued

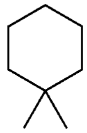

(26)

As the specific structure of $Ar^5$ in the above formula (V), the structure of c=1 in the specific structures of $Ar^1$ to $Ar^4$ when k represents 0, and the structure of c=0 in the specific structures of $Ar^1$ to $Ar^4$ when k represents 1 are exemplified.

As the examples of the compounds represented by formula (I), more specifically the following compounds (I-1) to (I-37) are exemplified. In the following Tables, with respect to the compounds whose bonding hands are shown but the substituents are not shown, the substituents are methyl groups.

TABLE 1

| | |
|---|---|
| I-1 | 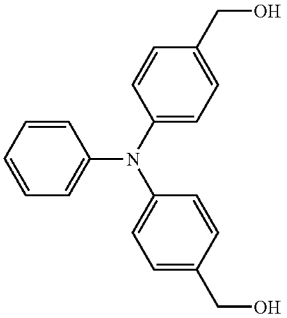 |
| I-2 | 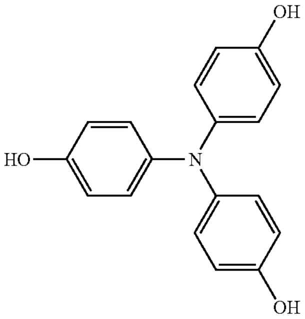 |
| I-3 | 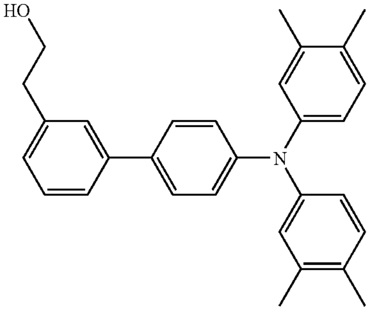 |

TABLE 1-continued

| | |
|---|---|
| I-4 | 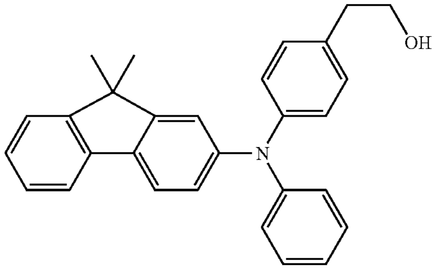 |
| I-5 | 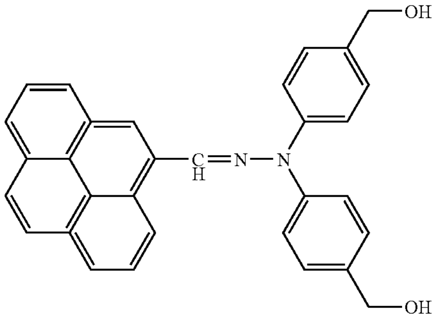 |

TABLE 2

| | |
|---|---|
| I-6 | 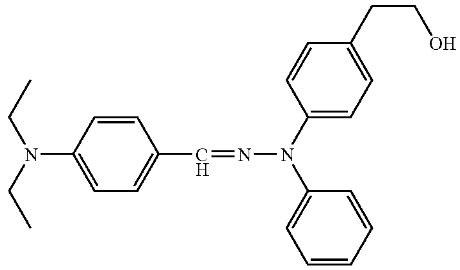 |
| I-7 | 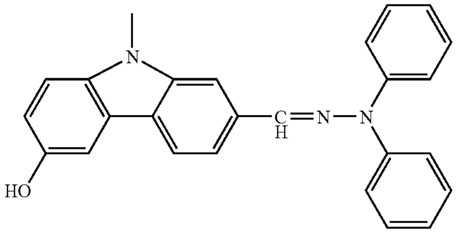 |
| I-8 | 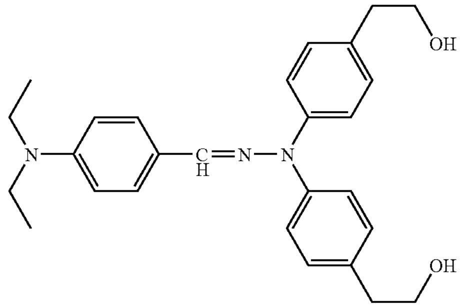 |

TABLE 2-continued
I-9
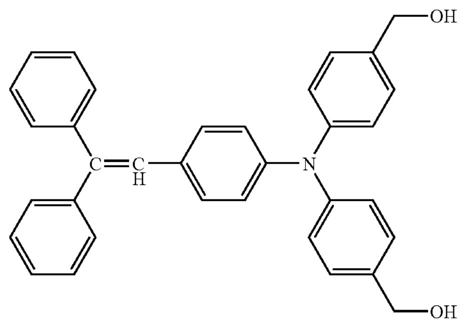
I-10
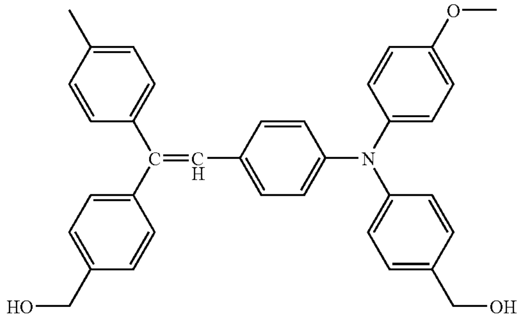
TABLE 3
I-11
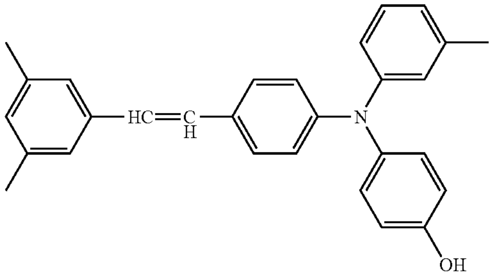
I-12
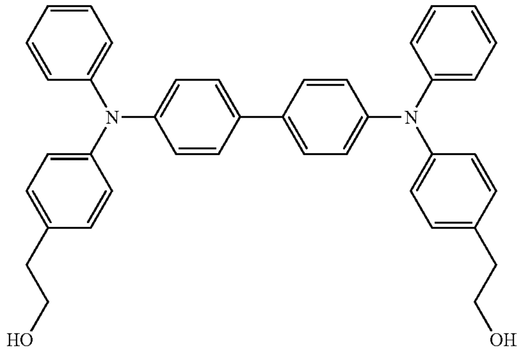
TABLE 3-continued
I-13
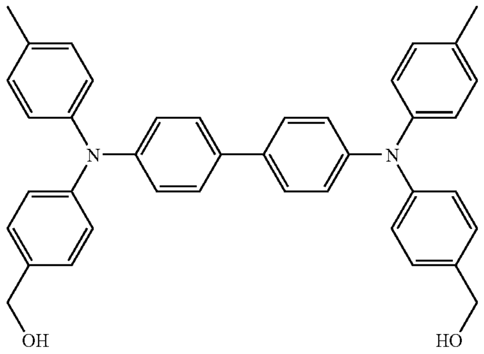
I-14
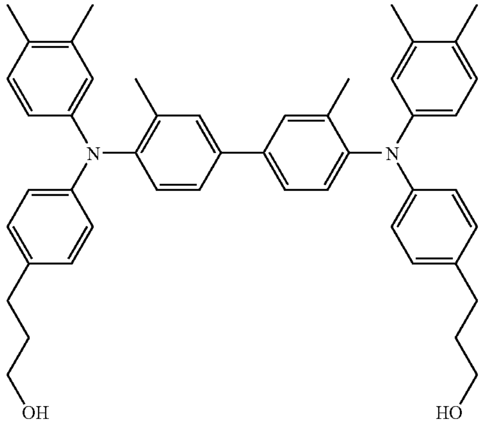
TABLE 4
I-15
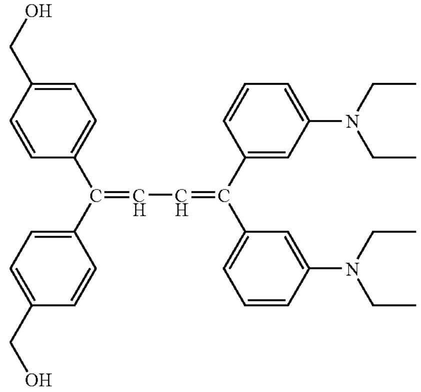
I-16
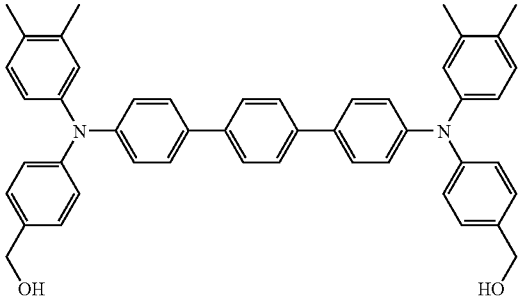

TABLE 4-continued
I-17
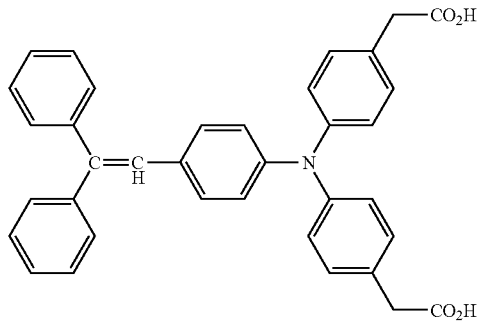
I-18
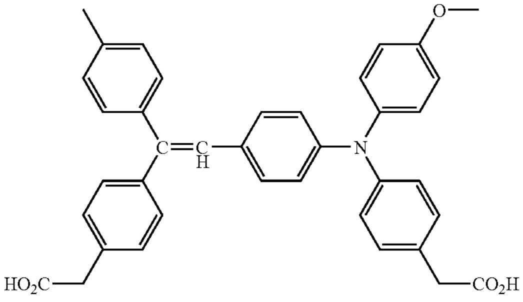
TABLE 5
I-19
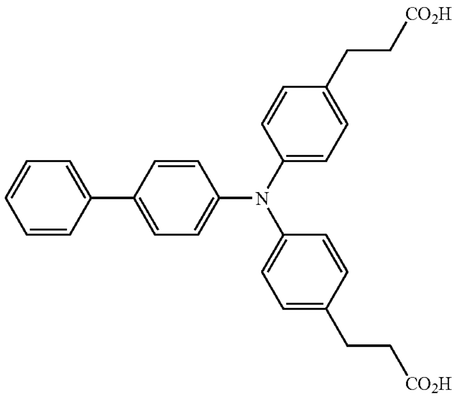
I-20
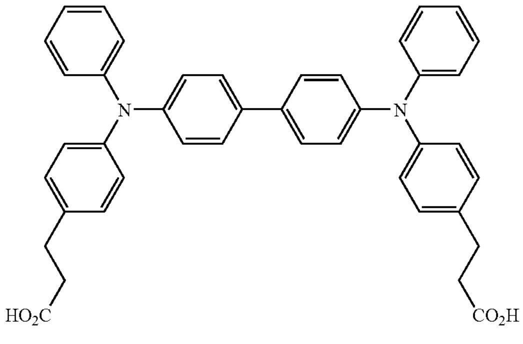
TABLE 5-continued
I-21
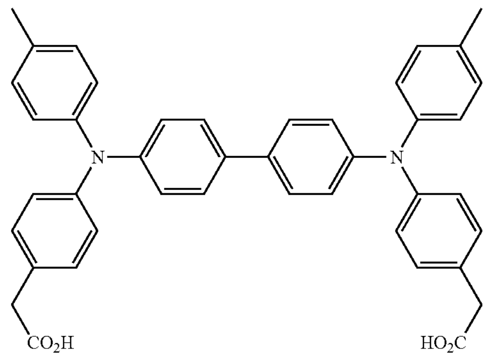
I-22
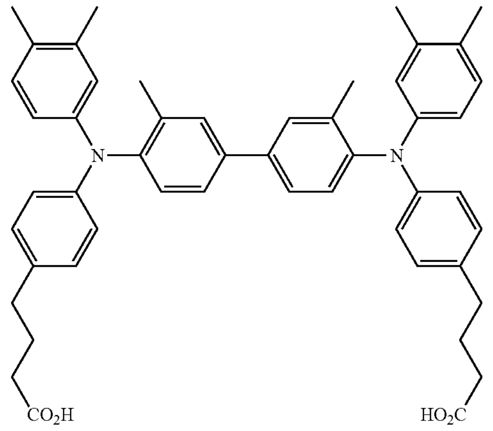
TABLE 6
I-23
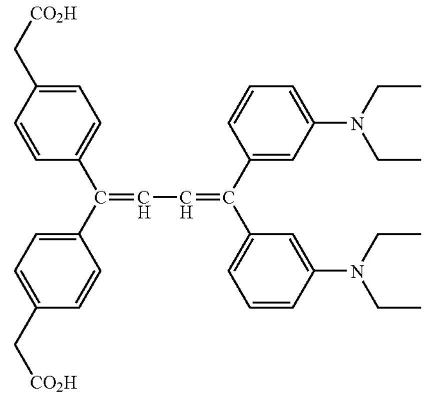

TABLE 6-continued
I-24
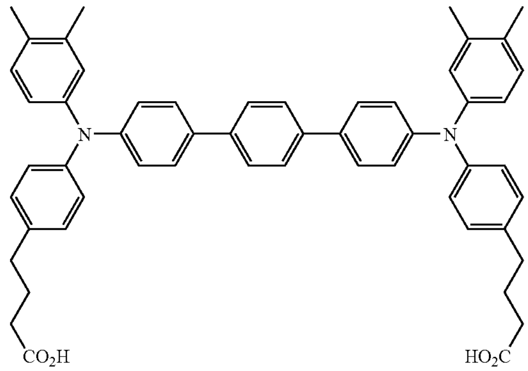
I-25
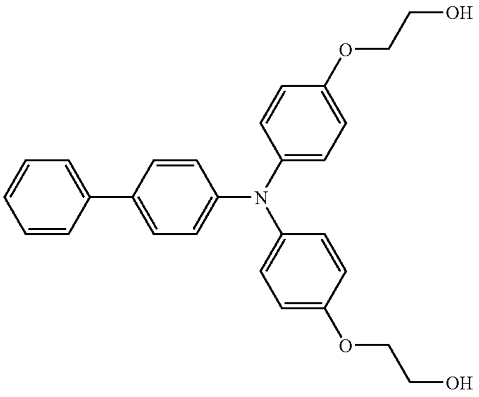
I-26
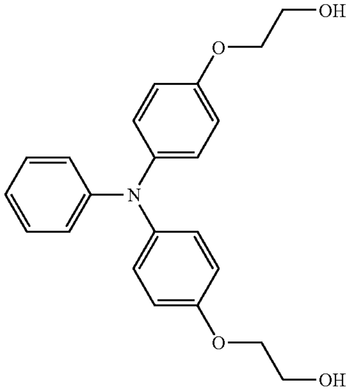
TABLE 7
I-27
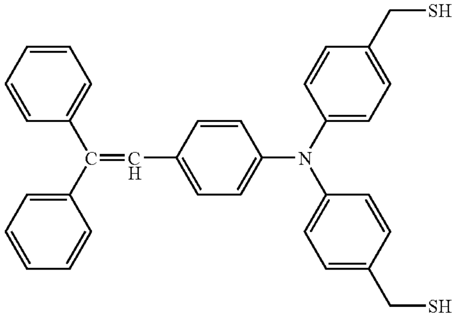
TABLE 7-continued
I-28
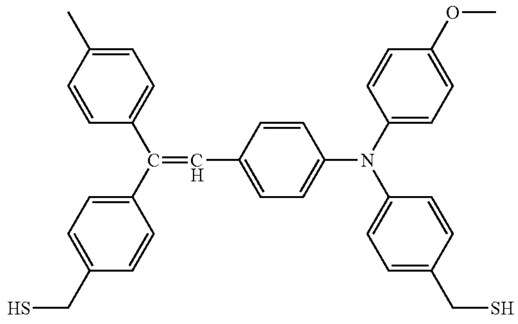
I-29
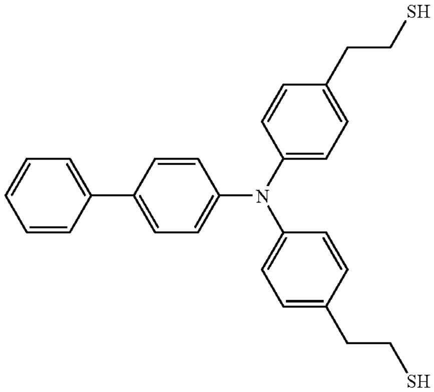
TABLE 8
I-30
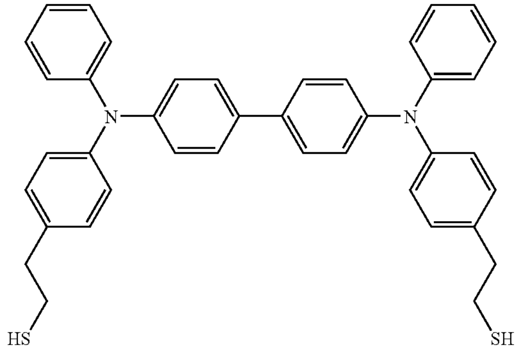
I-31
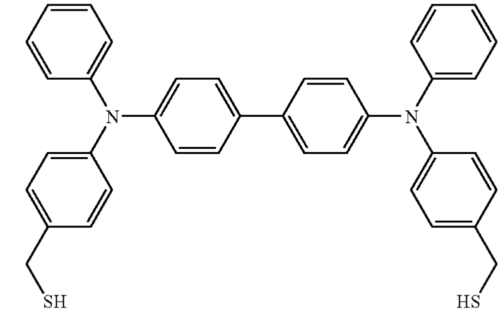

TABLE 8-continued

I-32

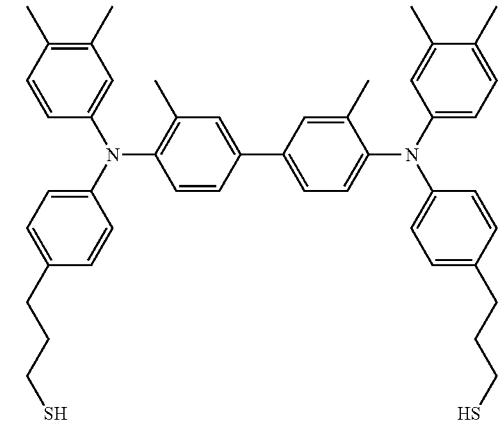

I-33

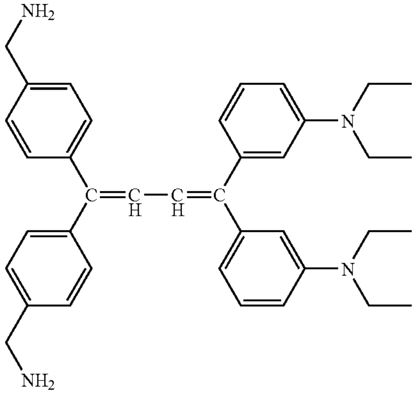

TABLE 9

I-34

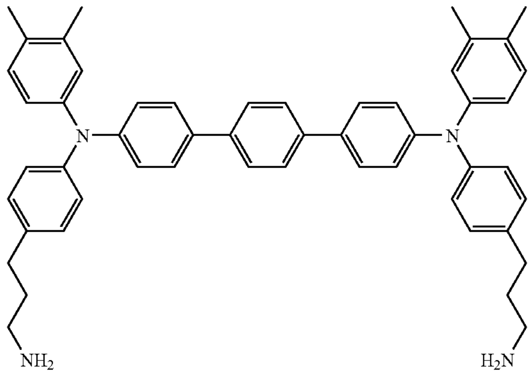

I-35

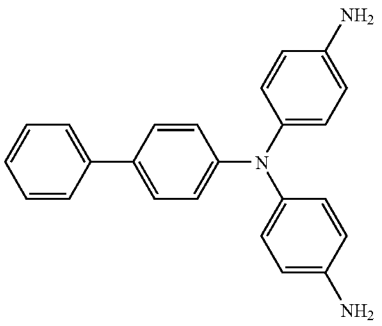

TABLE 9-continued

I-36

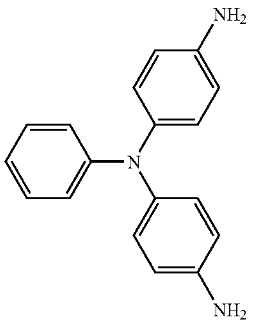

I-37

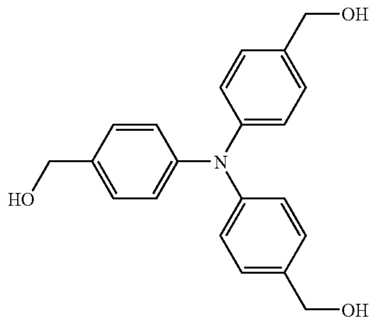

As the examples of the compounds represented by formula (II), more specifically the following compounds (II-1) to (II-47) are exemplified. In the following Tables, with respect to the compounds wherein Me and bonding hands are shown but the substituents are not shown, the substituents are methyl groups, and Et means an ethyl group.

TABLE 10

II-1

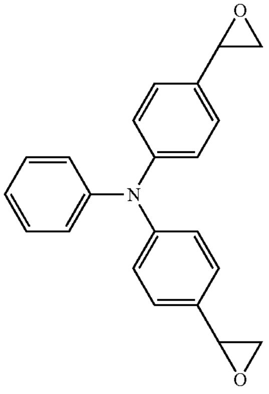

TABLE 10-continued
II-2
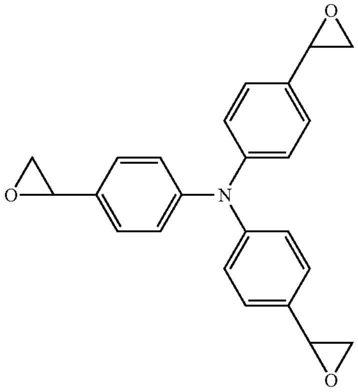
II-3
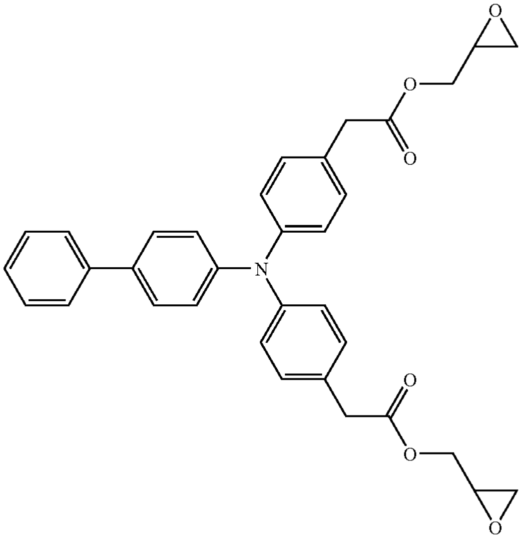
II-4
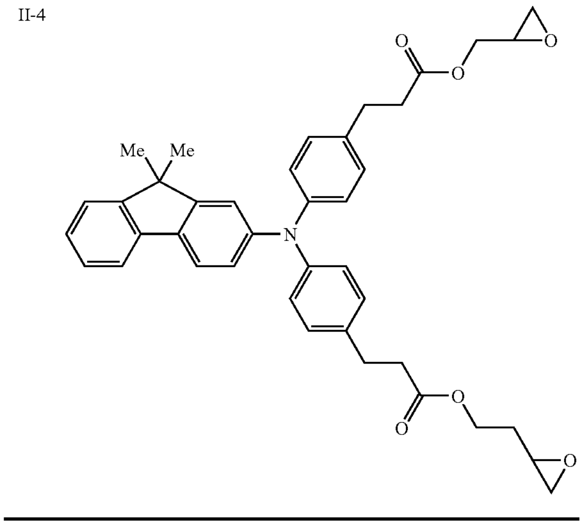
TABLE 11
II-5
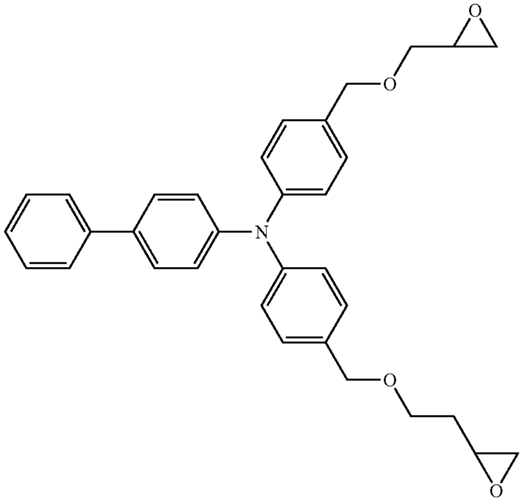
II-6
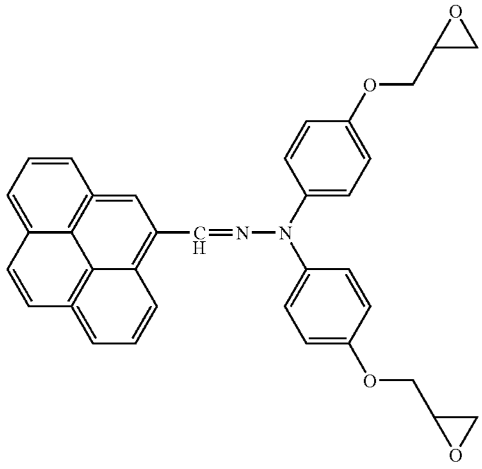
II-7
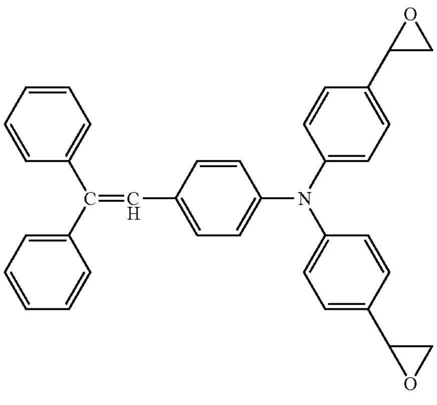

TABLE 11-continued
II-8
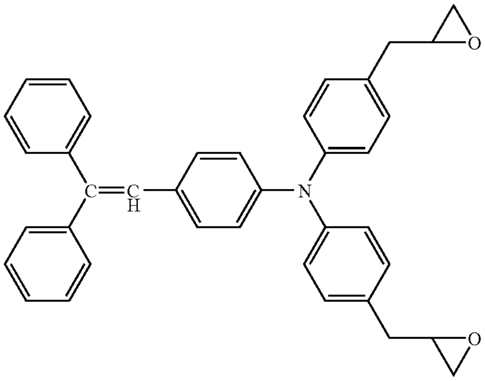
TABLE 12
II-9
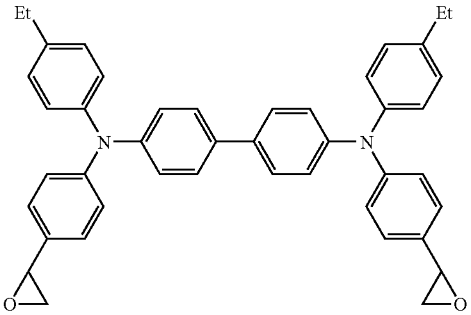
II-10
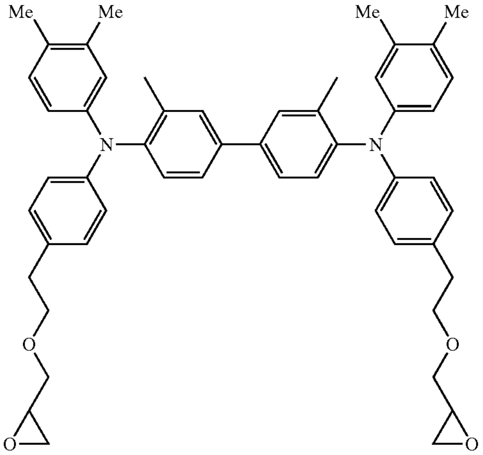
TABLE 12-continued
II-11
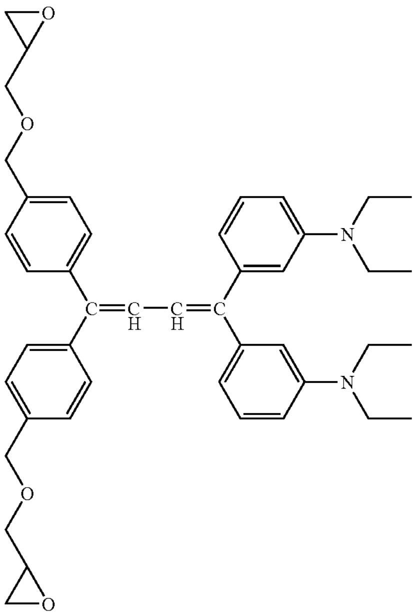
TABLE 13
II-12
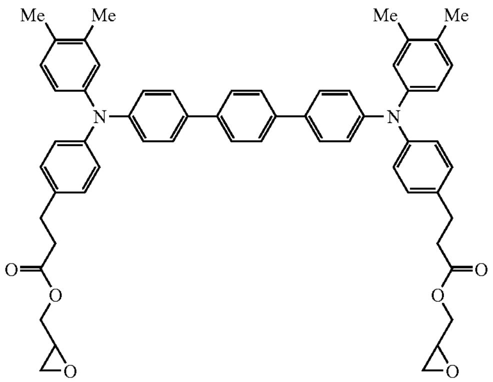
II-13
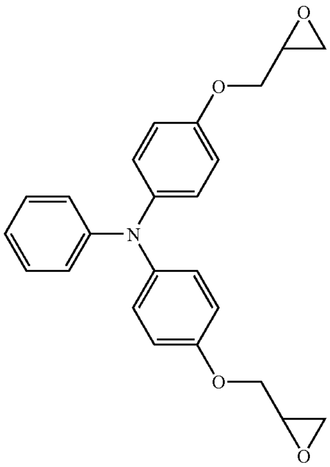

TABLE 13-continued
II-14
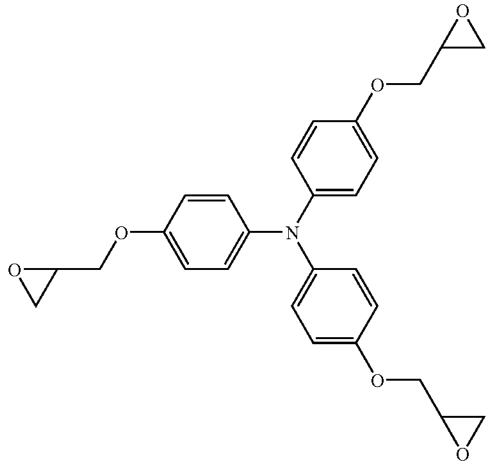
TABLE 14
II-15
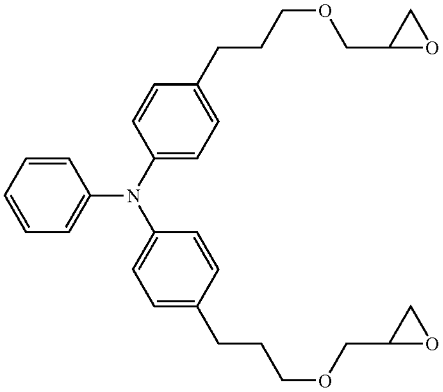
II-16
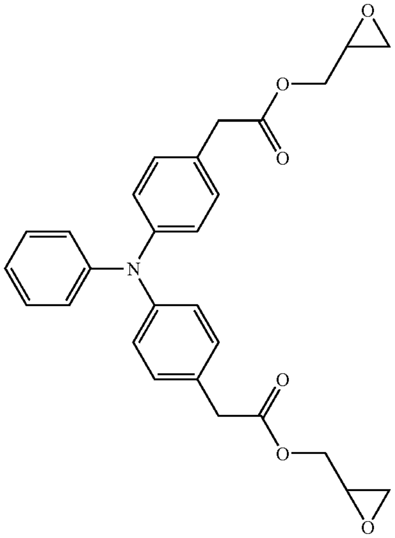
TABLE 14-continued
II-17
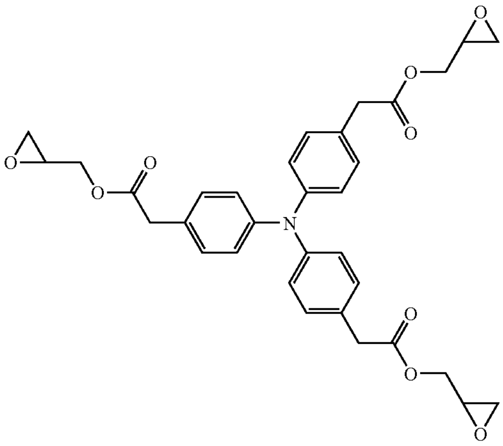
TABLE 15
II-18
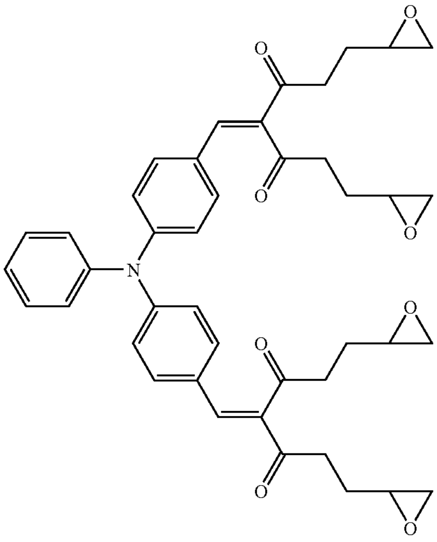
II-19
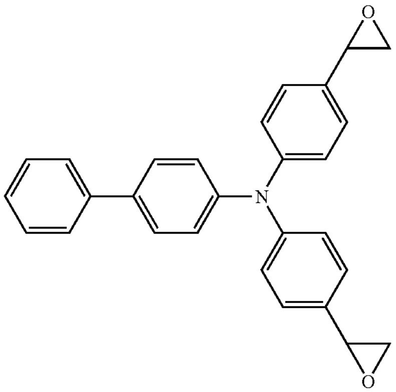

TABLE 15-continued
II-20
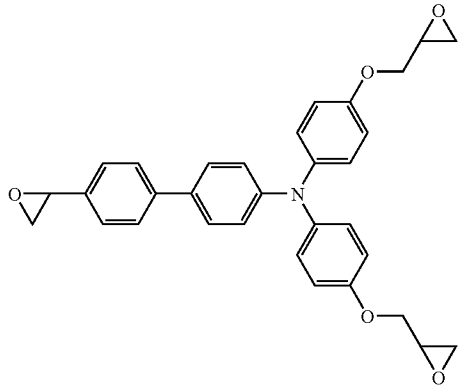
II-21
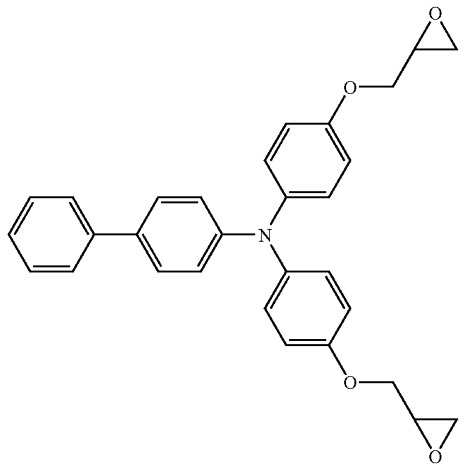
TABLE 16
II-22
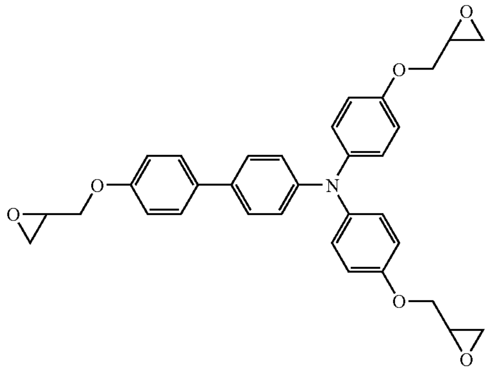
TABLE 16-continued
II-23
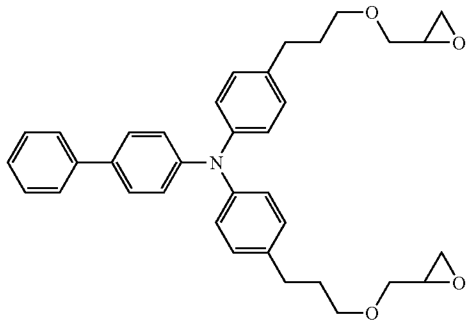
II-24
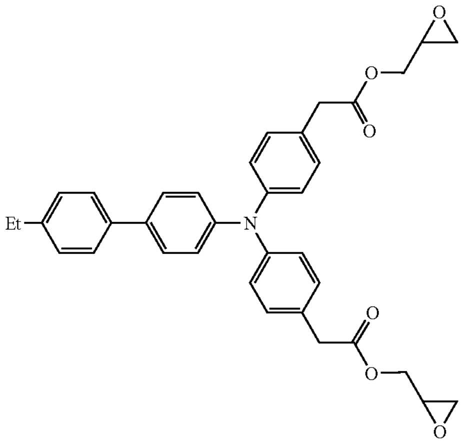
TABLE 17
II-25
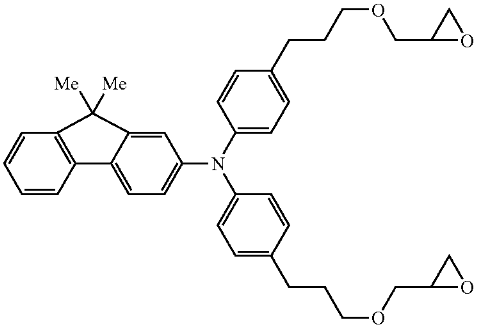

TABLE 17-continued
II-26
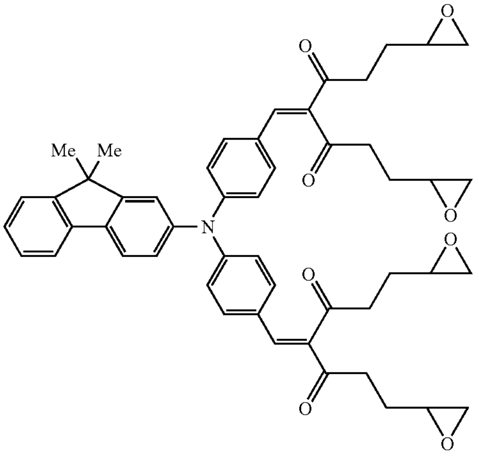
II-27
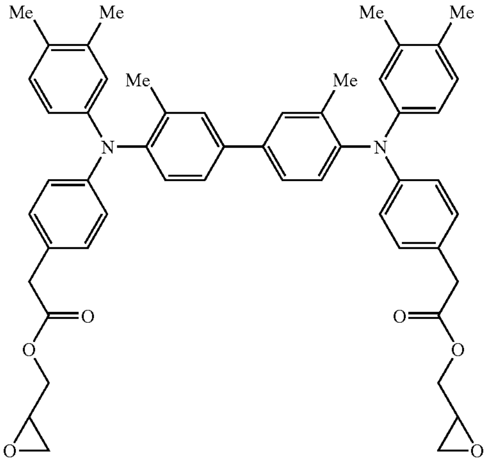
TABLE 18
II-28
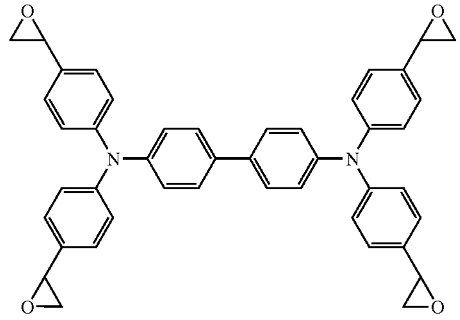
TABLE 18-continued
II-29
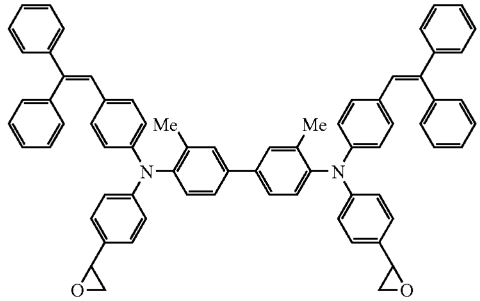
II-30
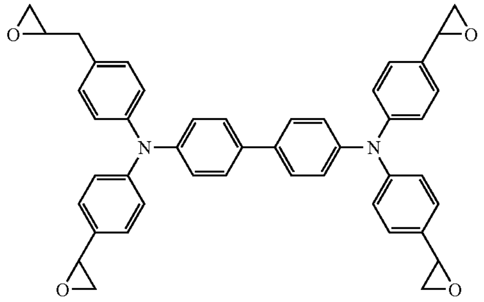
II-31
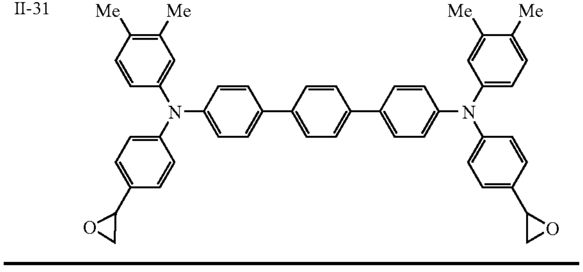
TABLE 19
II-32
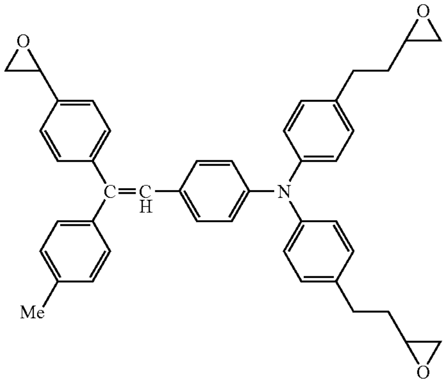

TABLE 19-continued
II-33
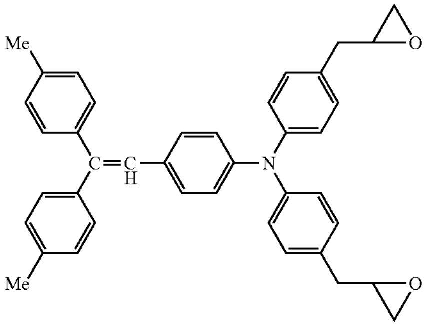
II-34
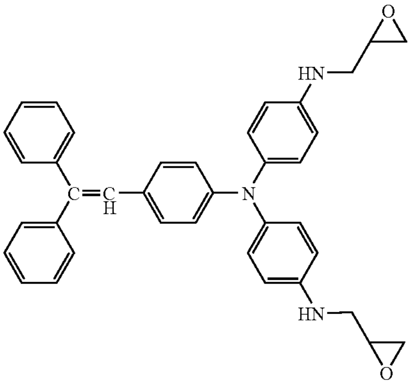
II-35
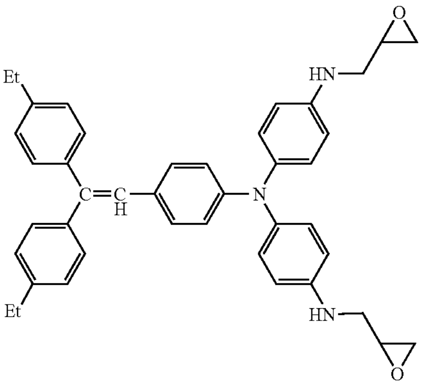
TABLE 20
II-36
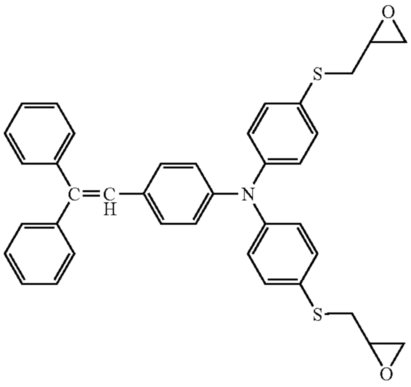
II-37
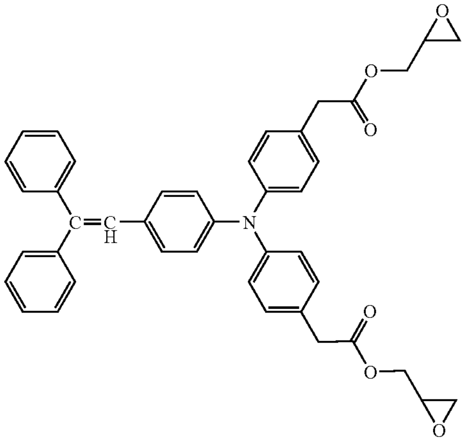
II-38
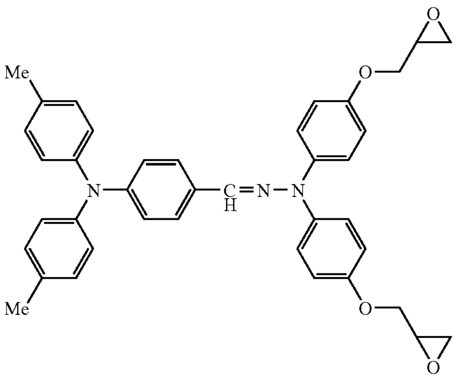

TABLE 21
II-39
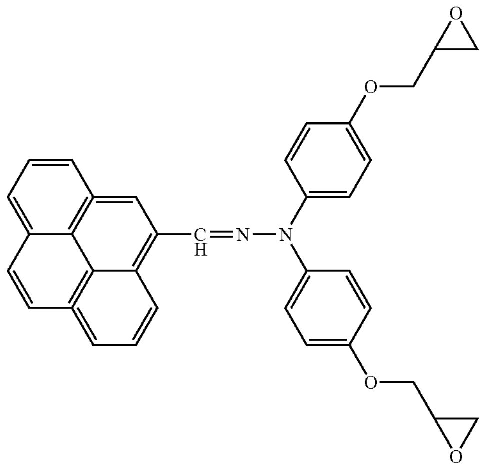
II-40
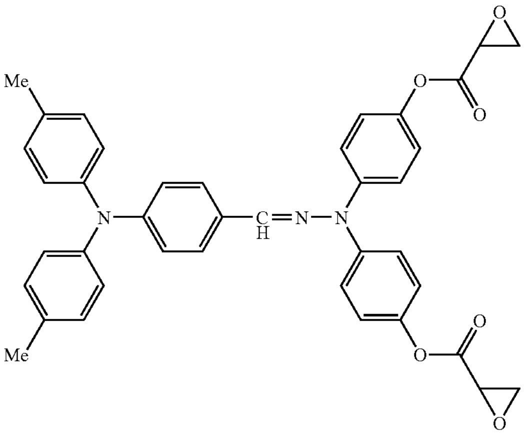
II-41
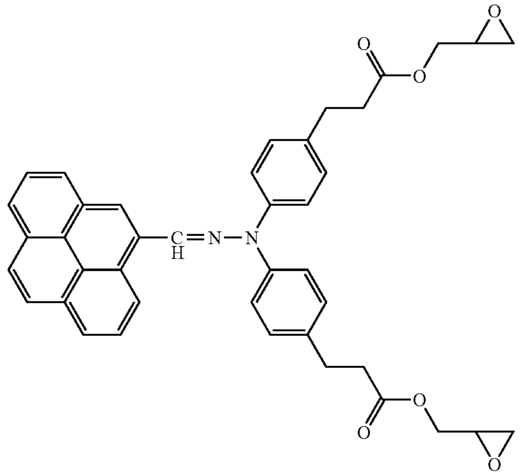
TABLE 22
II-42
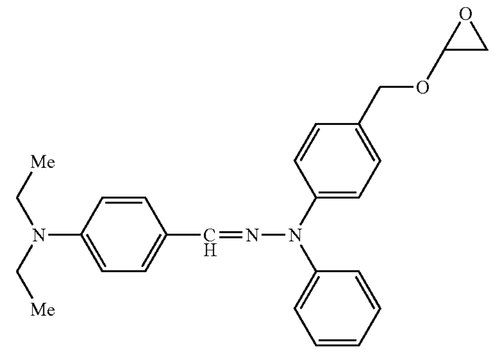
II-43
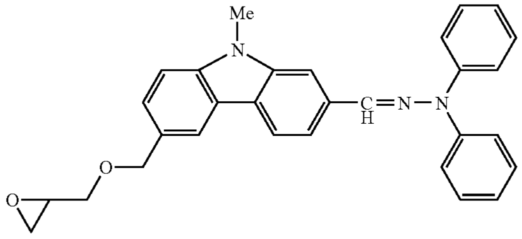
II-44
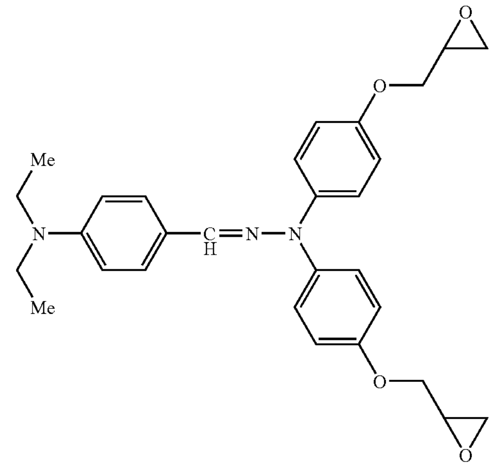

TABLE 23
II-45
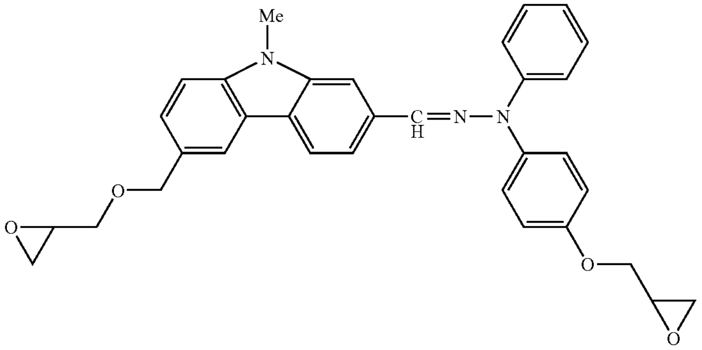
II-46
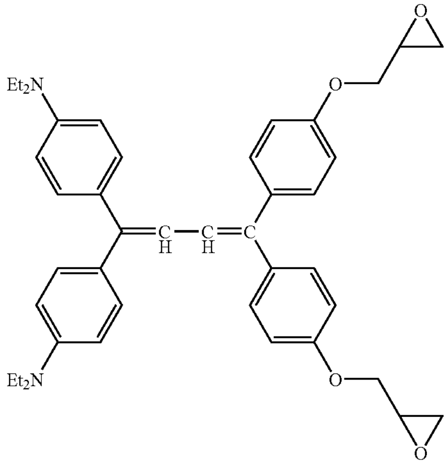
II-47
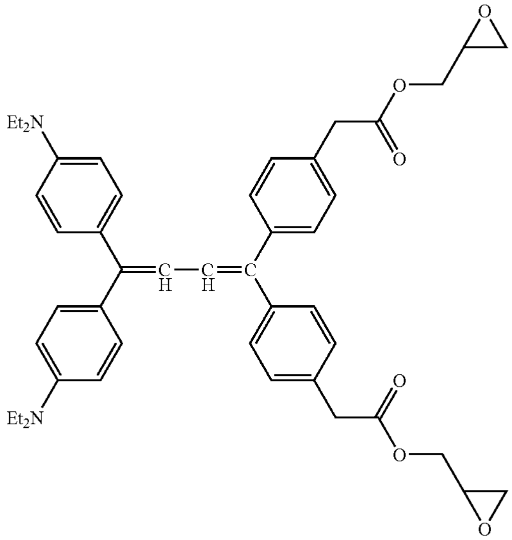
As the examples of the compounds represented by formula (III), more specifically the following compounds (III-1) to (III-40) are exemplified. In the following Tables, with respect to the compounds wherein Me and bonding hands are shown but the substituents are not shown, the substituents are methyl groups, and Et means an ethyl group.

TABLE 24
III-1
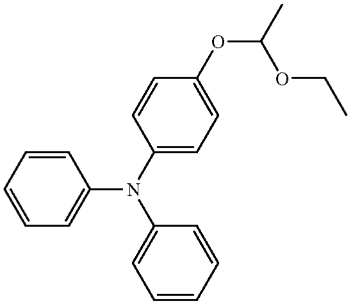
III-2
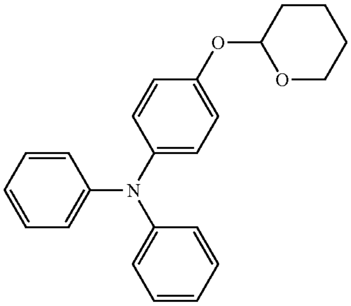
III-3
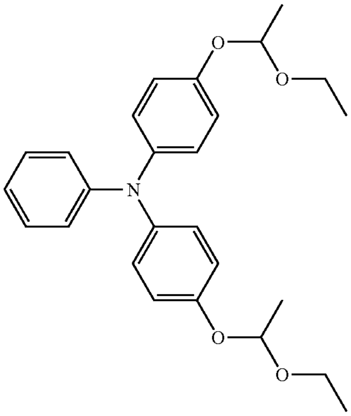
TABLE 24-continued
III-4
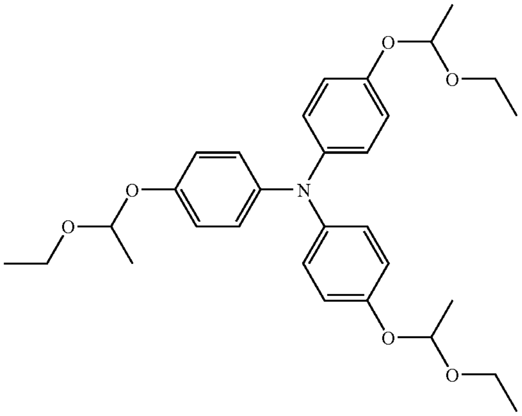
TABLE 25
III-5
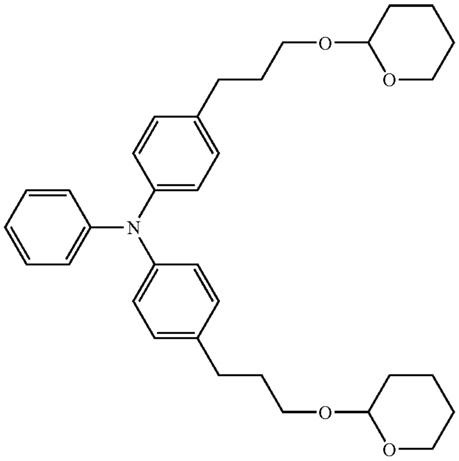
III-6
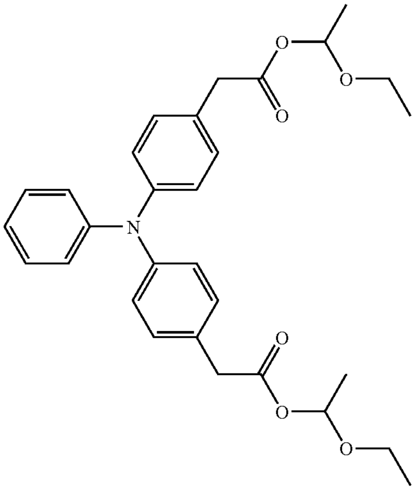

TABLE 25-continued
III-7
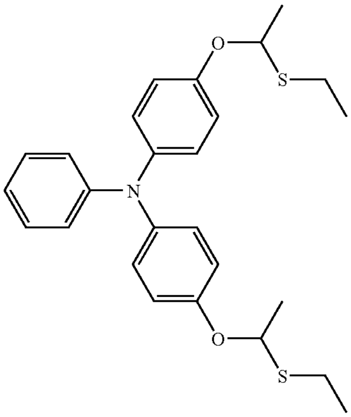
III-8
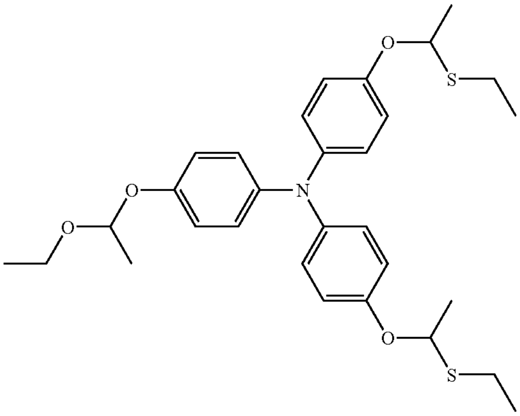
TABLE 26
III-9
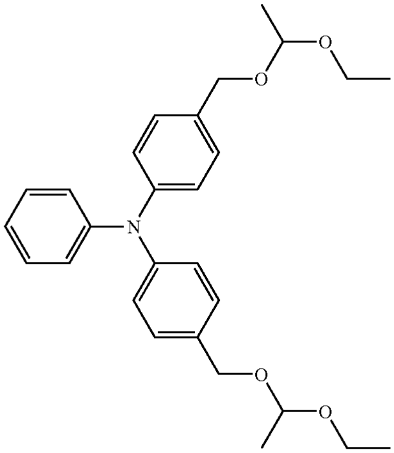
TABLE 26-continued
III-10
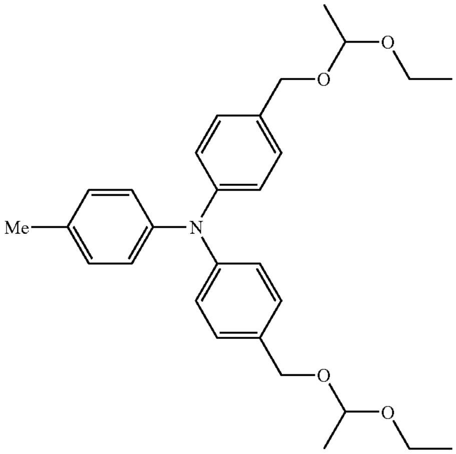
III-11
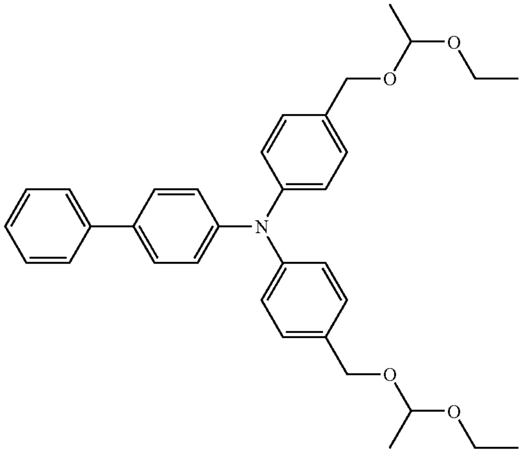
III-12
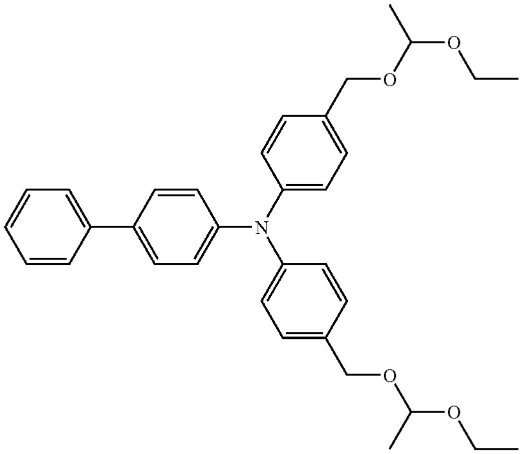

TABLE 27
III-13
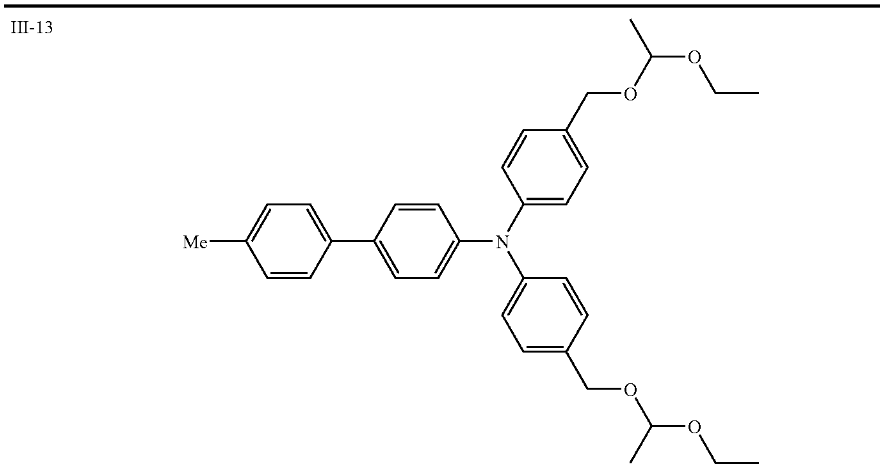
III-14
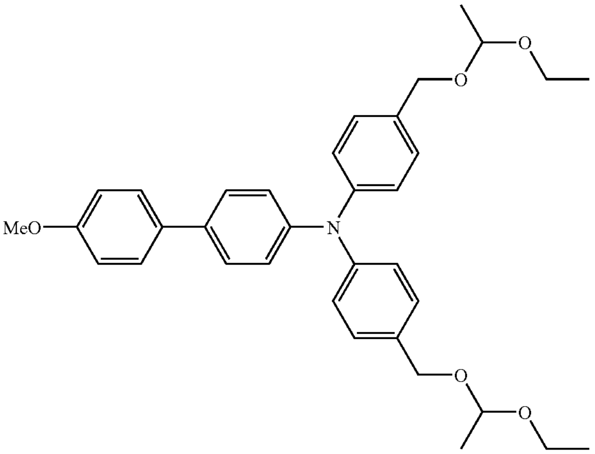
III-15
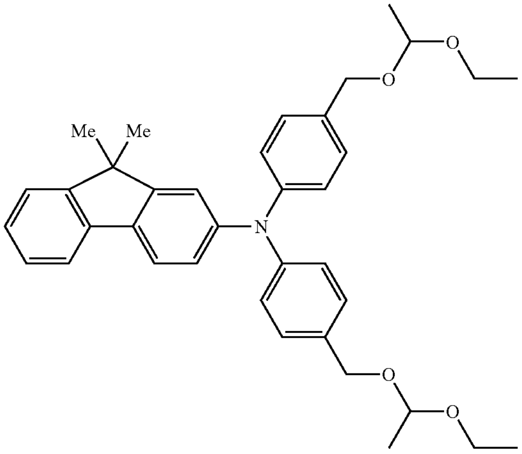

TABLE 27-continued
III-16
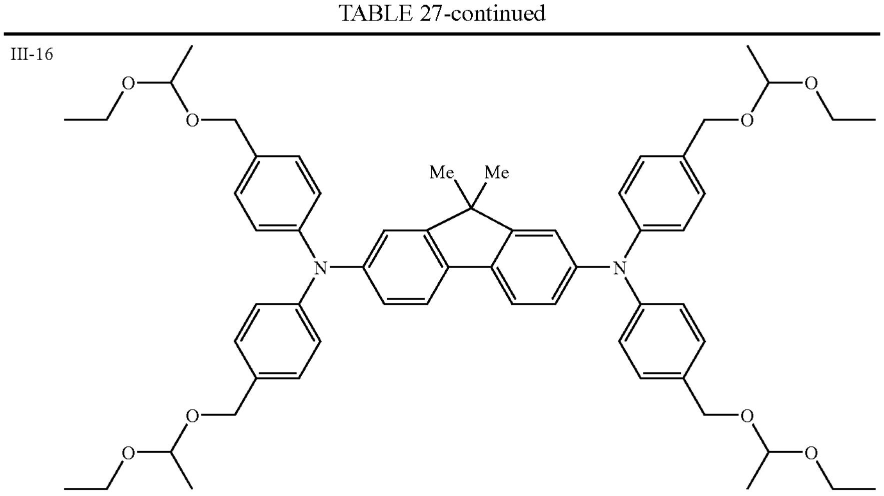
TABLE 28
III-17
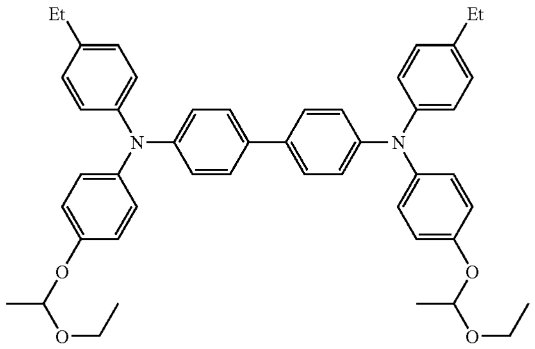
III-18
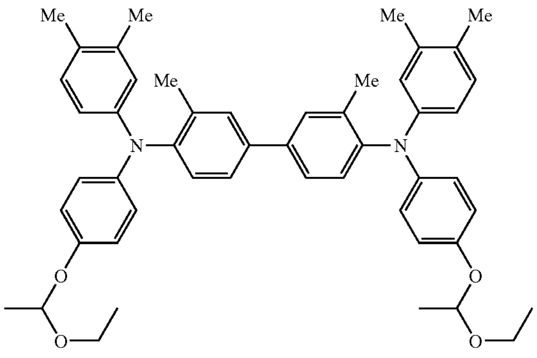
TABLE 28-continued
III-19
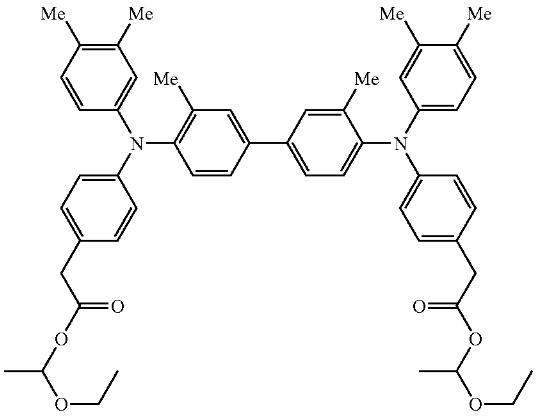
III-20
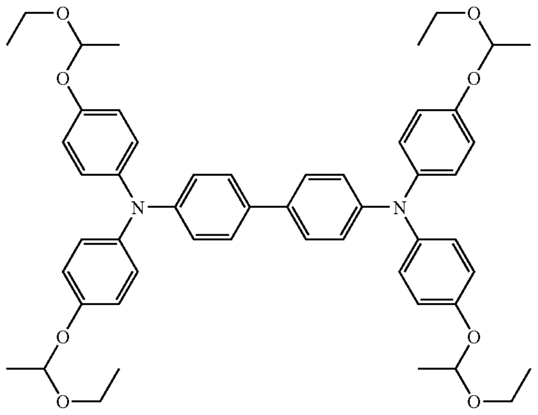

TABLE 29
III-21
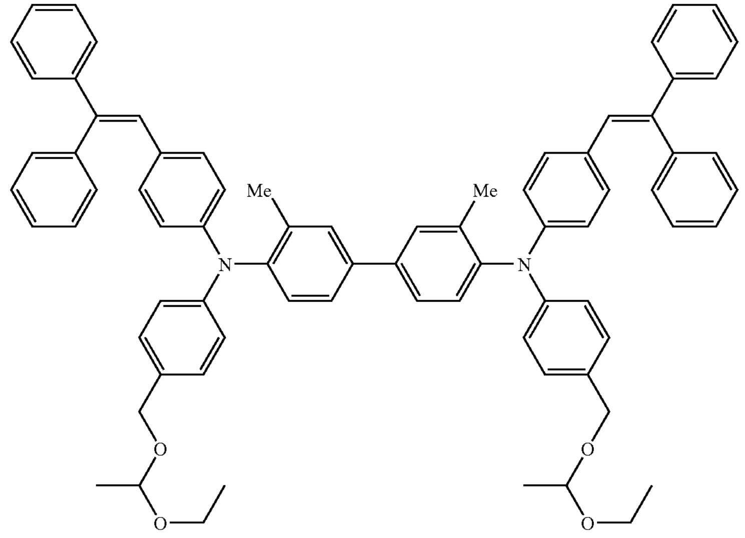
III-22
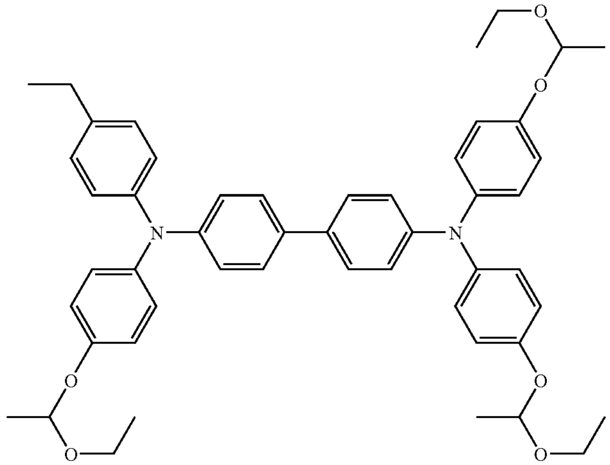
III-23
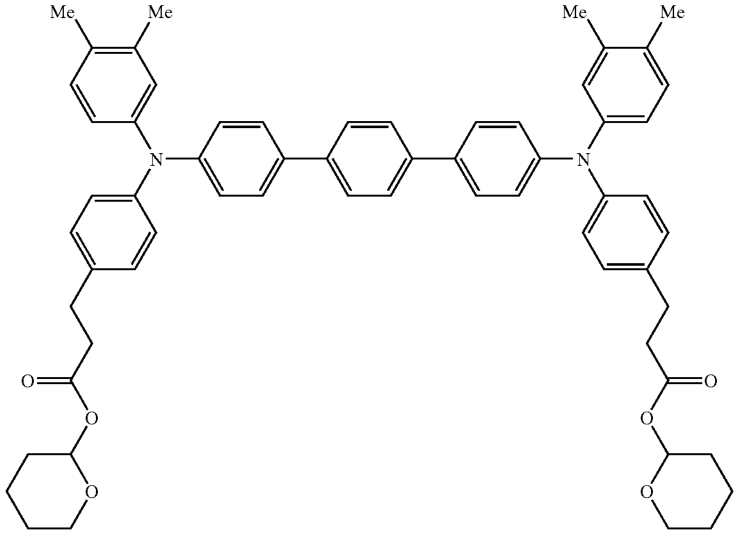

TABLE 29-continued
III-24 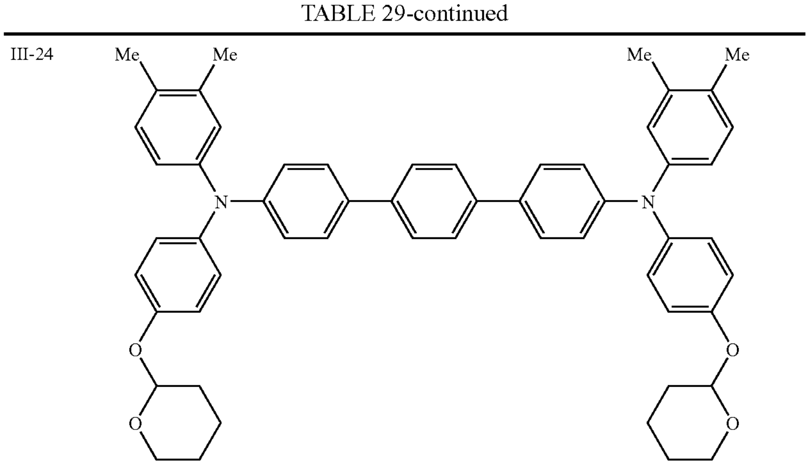
TABLE 30
III-25 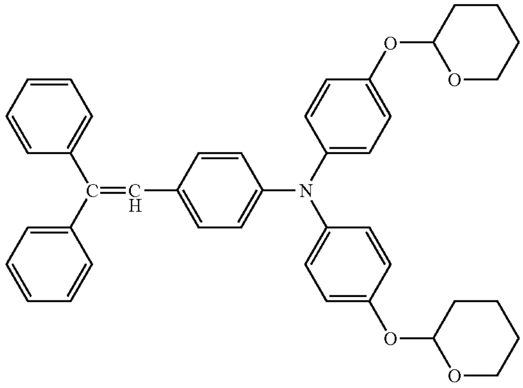
III-26 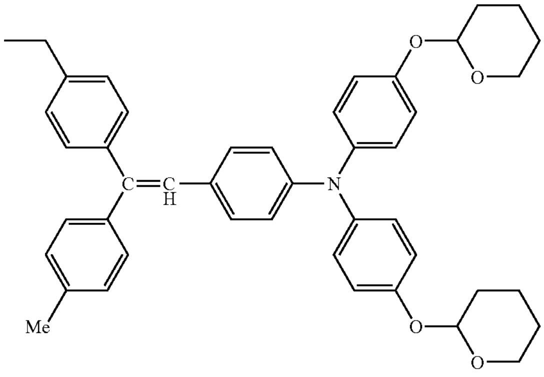
TABLE 30-continued
III-27 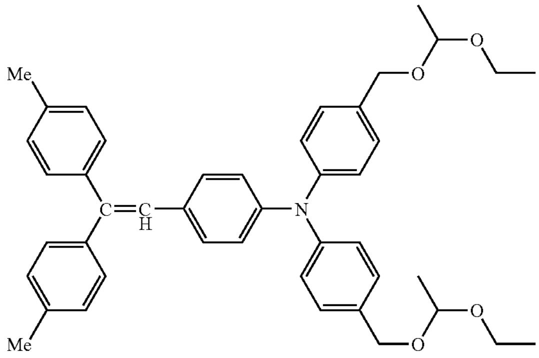
III-28 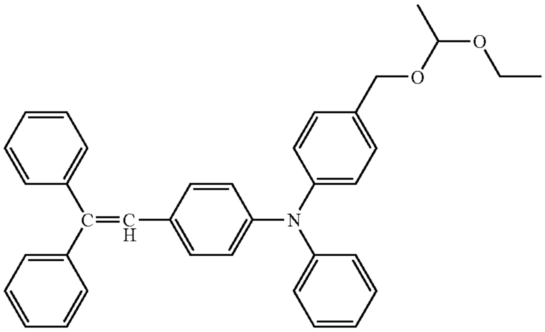

TABLE 31
III-29
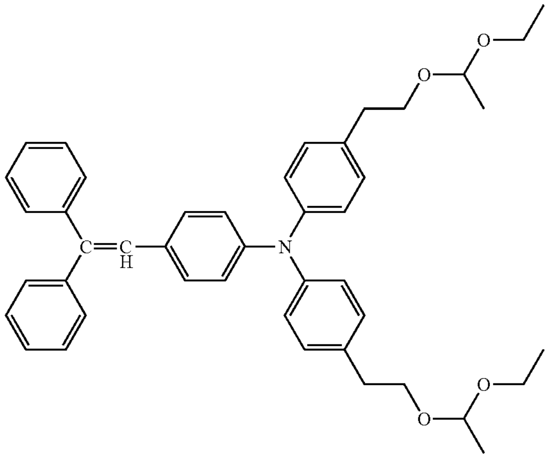
III-30
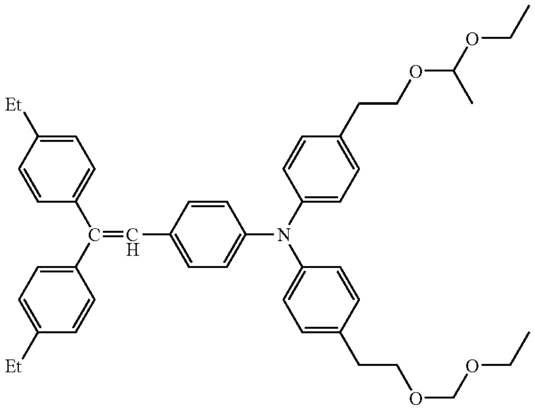
III-31
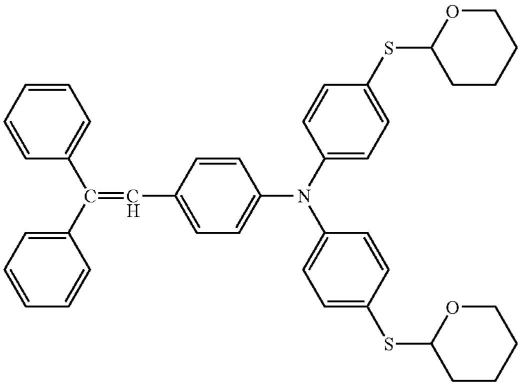
TABLE 31-continued
III-32
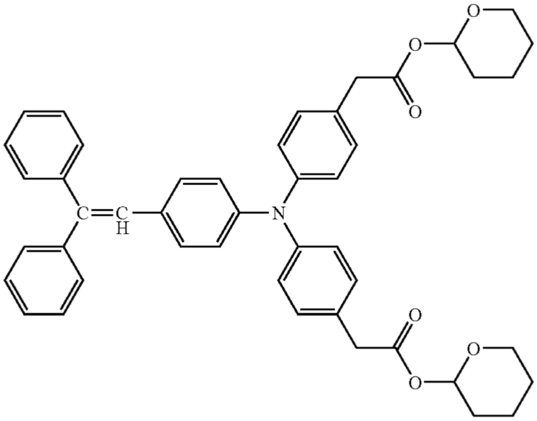
TABLE 32
III-33
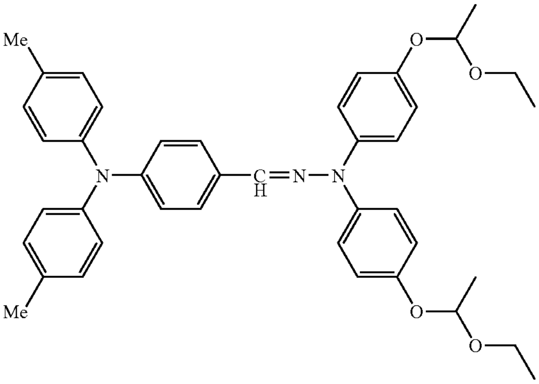
III-34
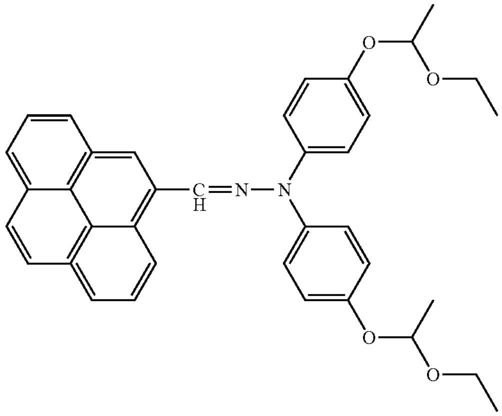

TABLE 32-continued
| | |
|---|---|
| III-35 | 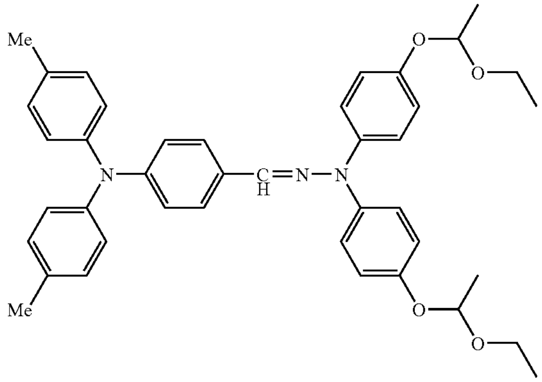 |
| III-36 | 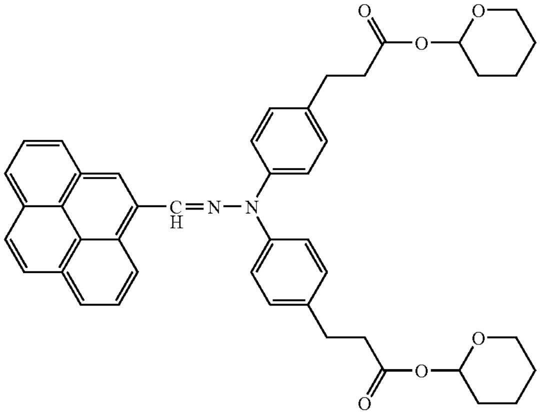 |
TABLE 33
| | |
|---|---|
| III-37 | 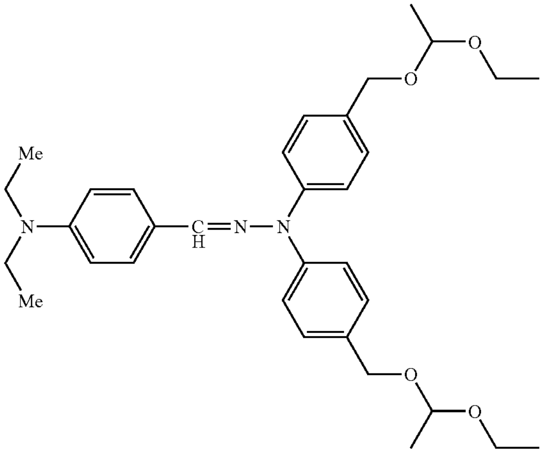 |
TABLE 33-continued
| | |
|---|---|
| III-38 | 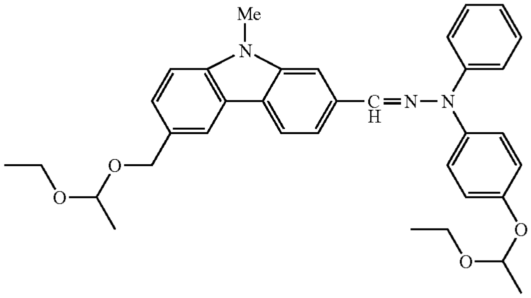 |
| III-39 | 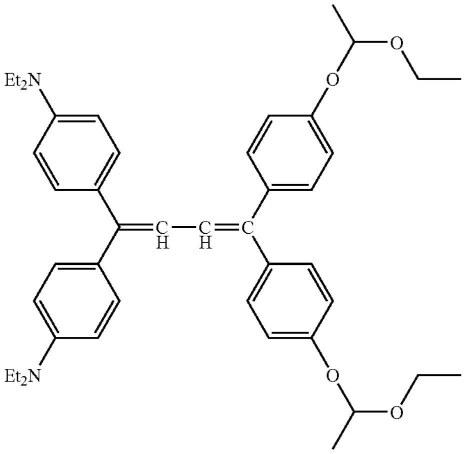 |
| III-40 | 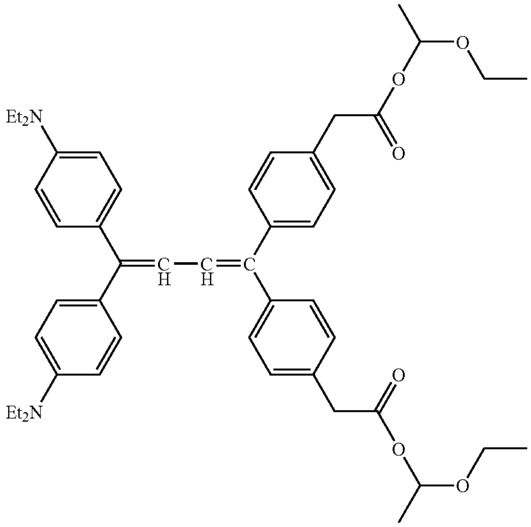 |
As the examples of the compounds represented by formula (IV), more specifically the following compounds (IV-1) to (IV-55) are exemplified. In the following Tables, with respect to the compounds wherein Me or bonding hands are shown but the substituents are not shown, the substituents are methyl groups.

TABLE 34
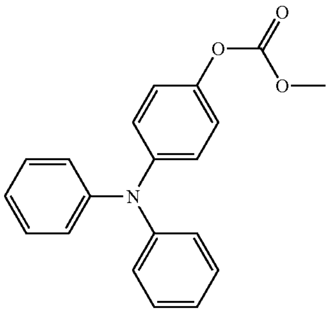
(IV-1)
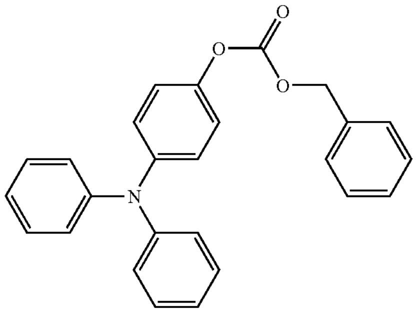
(IV-2)
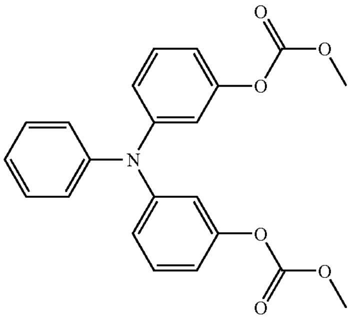
(IV-3)
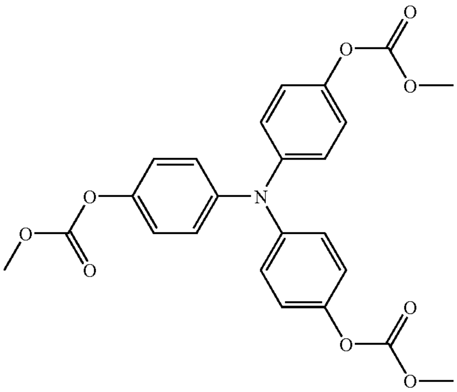
(IV-4)
TABLE 34-continued
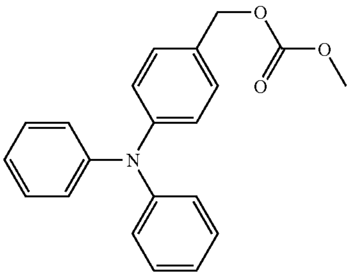
(IV-5)
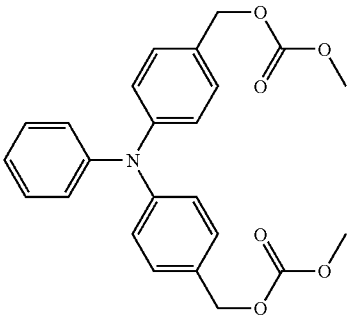
(IV-6)
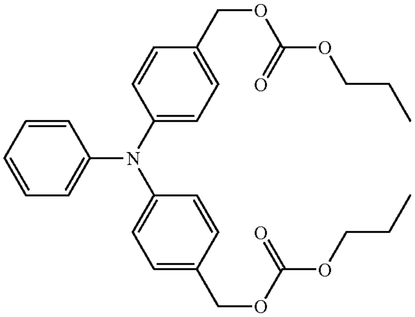
(IV-7)
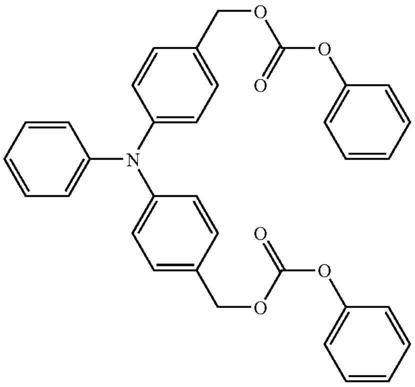
(IV-8)

TABLE 35
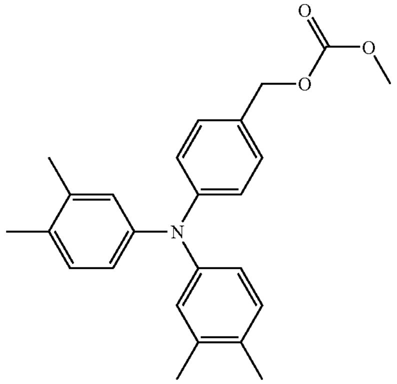
(IV-9)
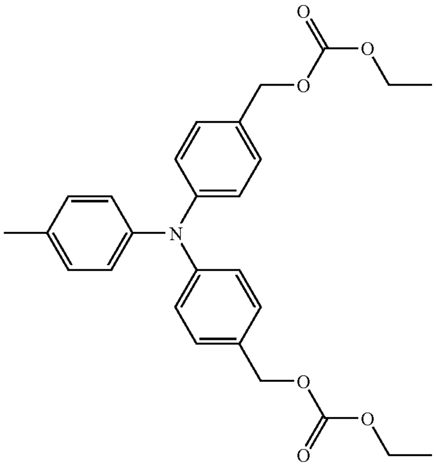
(IV-10)
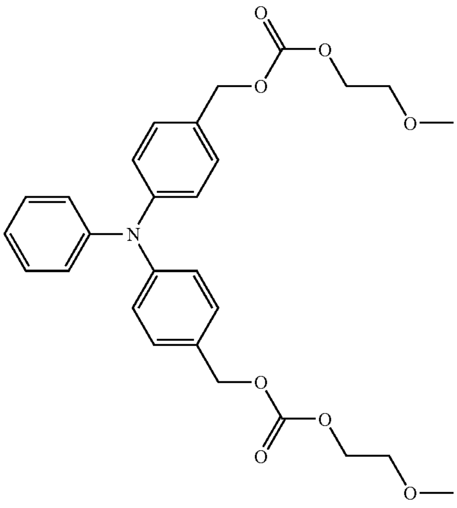
(IV-11)
TABLE 35-continued
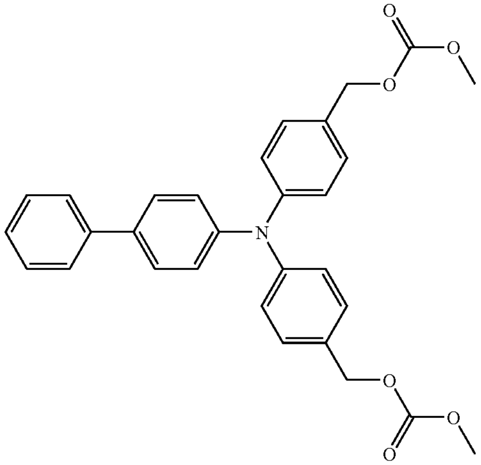
(IV-12)
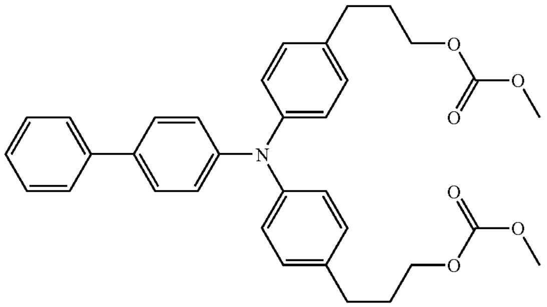
(IV-13)
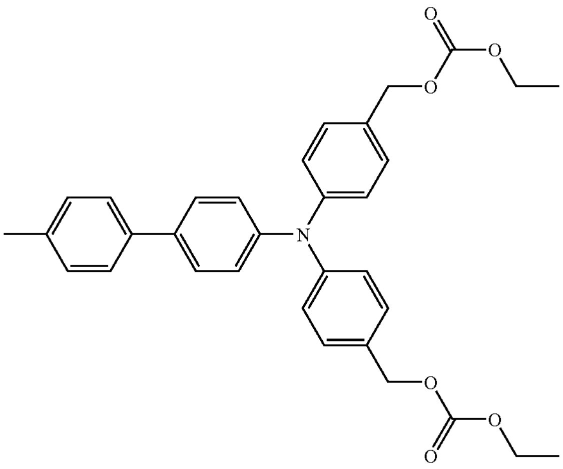
(IV-14)

TABLE 36
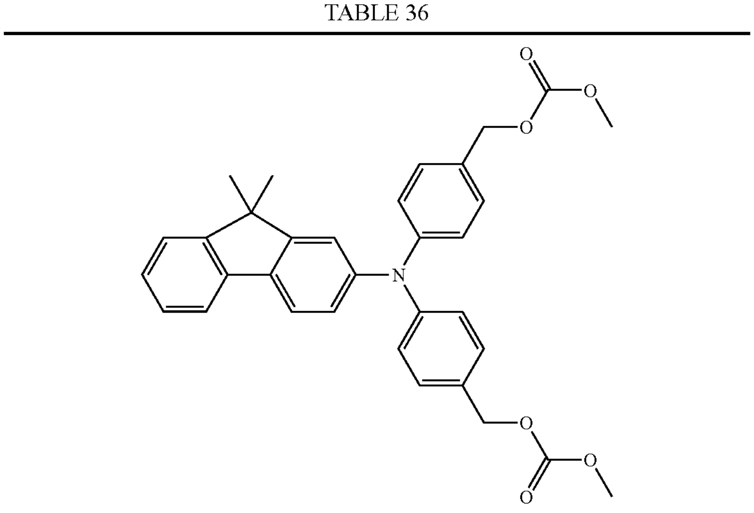
(IV-15)
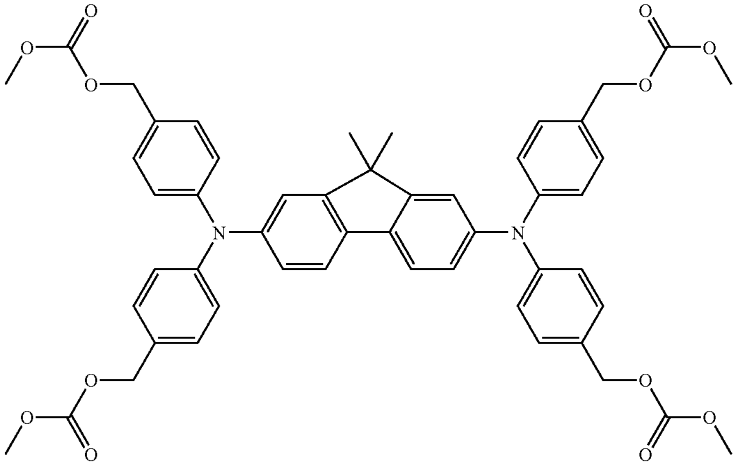
(IV-16)
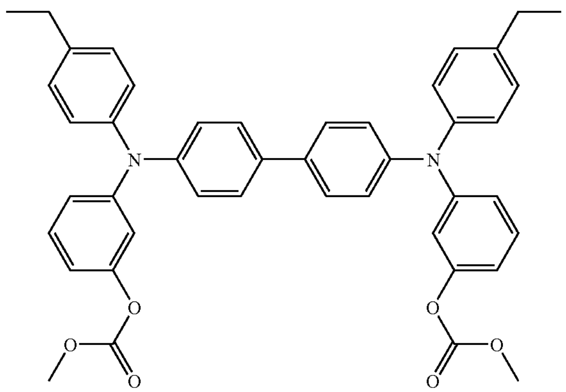
(IV-17)

TABLE 36-continued
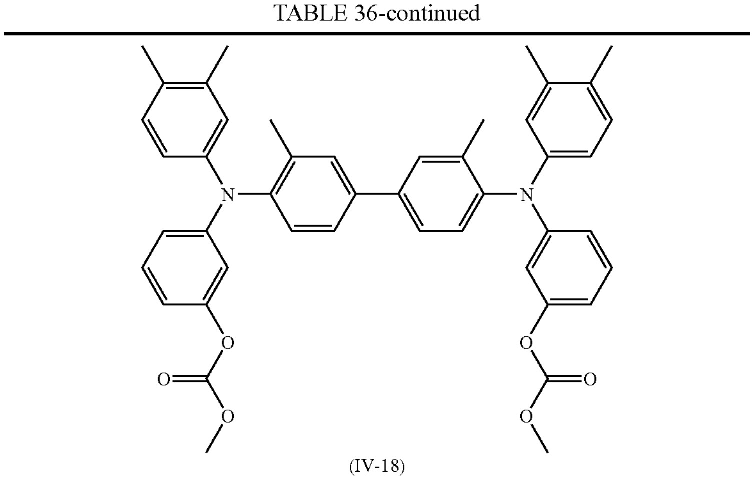
(IV-18)
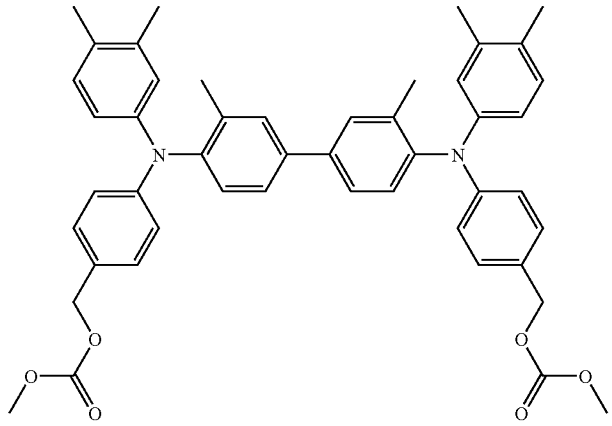
(IV-19)
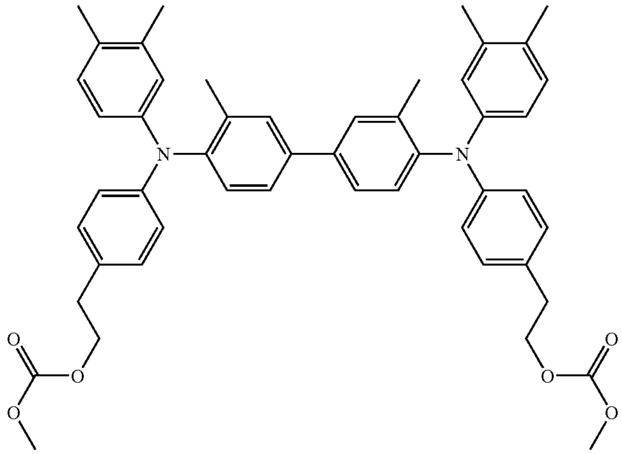
(IV-20)

TABLE 37
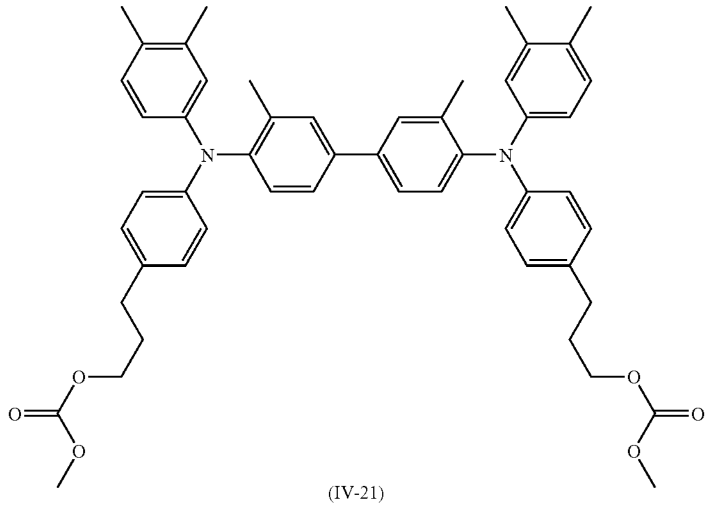
(IV-21)
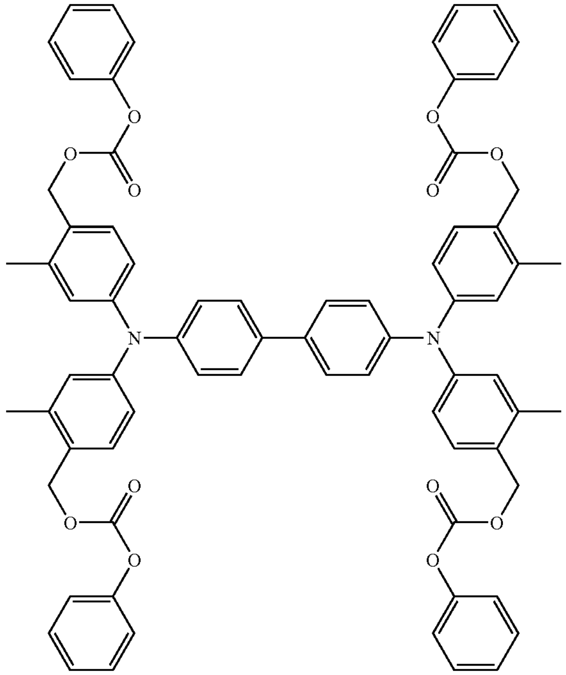
(IV-22)

TABLE 37-continued
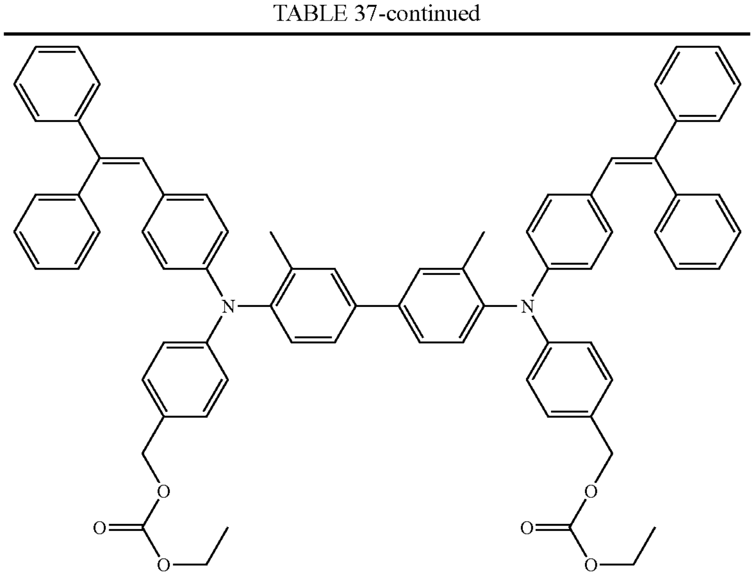
(IV-23)
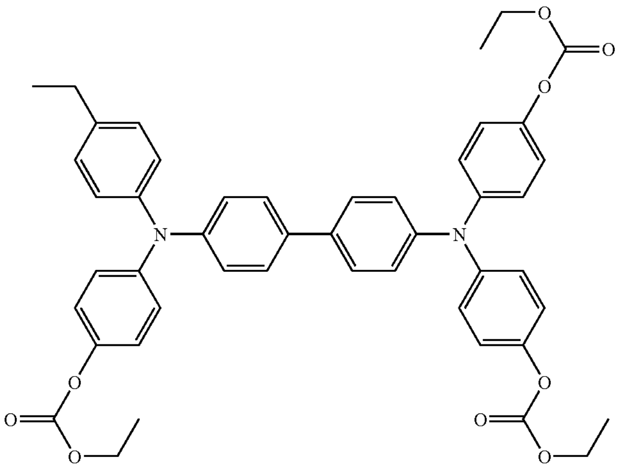
(IV-24)
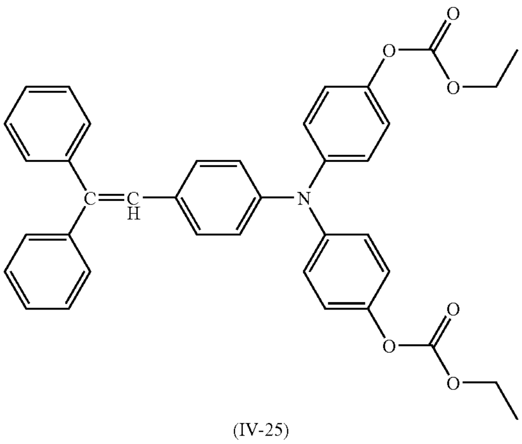
(IV-25)

TABLE 37-continued
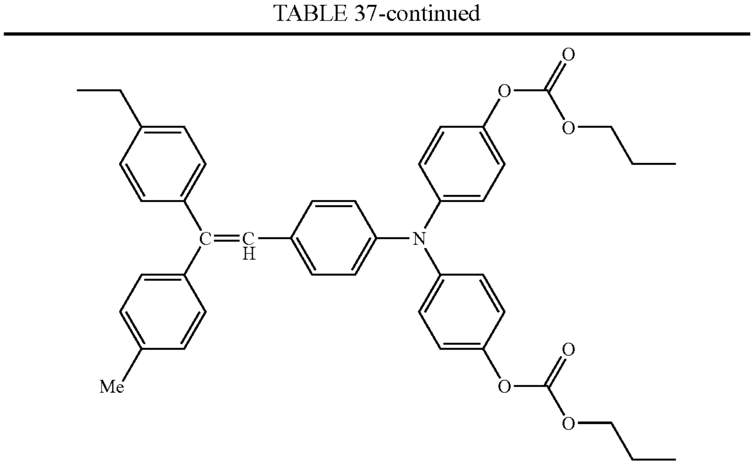
(IV-26)
TABLE 38
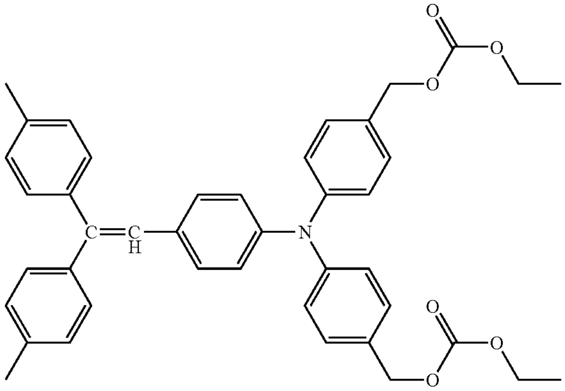
(IV-27)
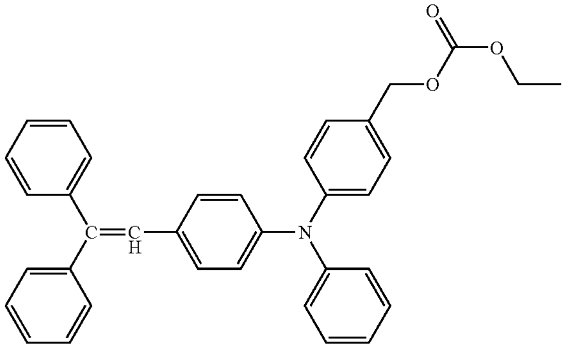
(IV-28)
TABLE 38-continued
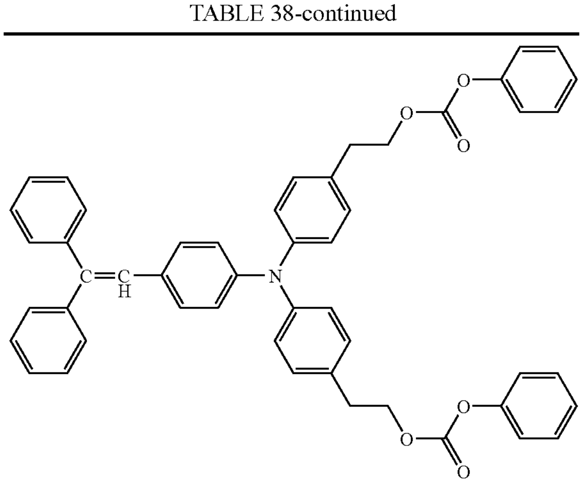
(IV-29)
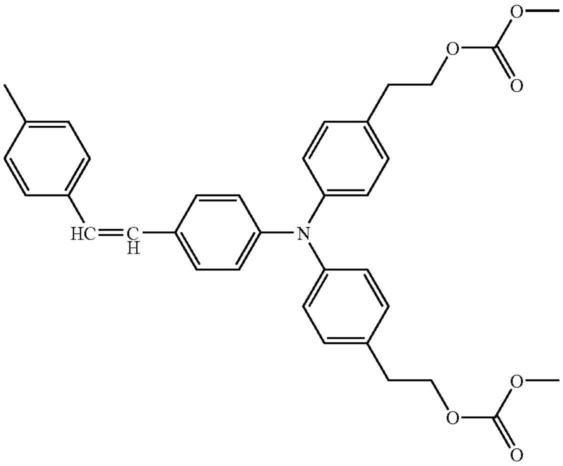
(IV-30)

TABLE 38-continued
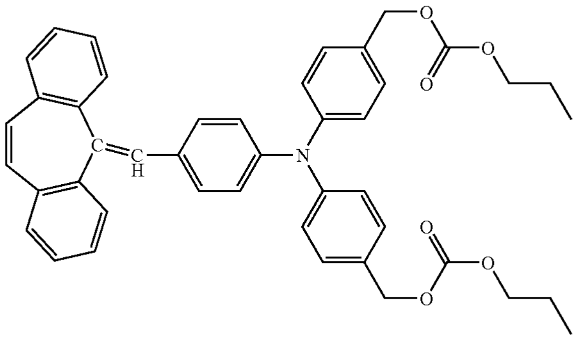
(IV-31)
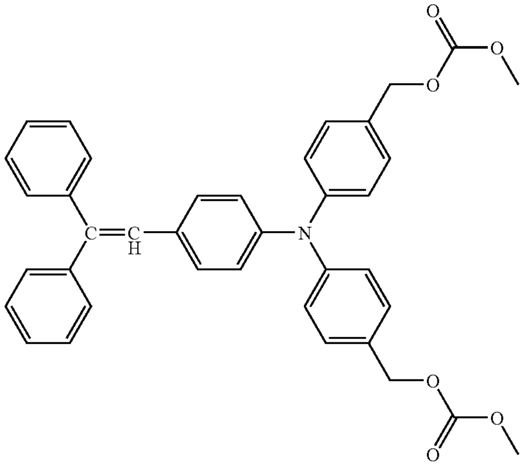
(IV-32)
TABLE 39
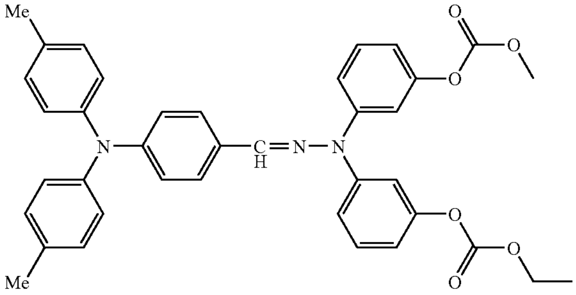
(IV-33)
TABLE 39-continued
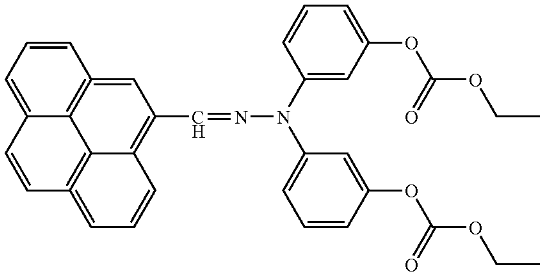
(IV-34)
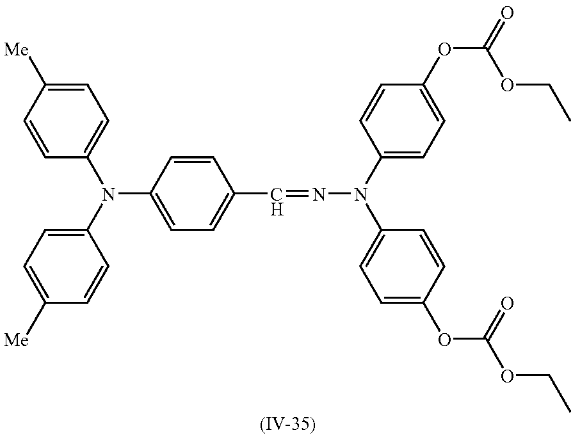
(IV-35)
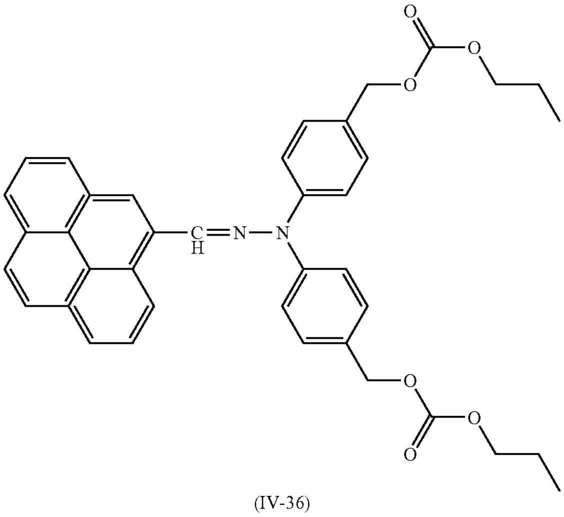
(IV-36)

TABLE 39-continued
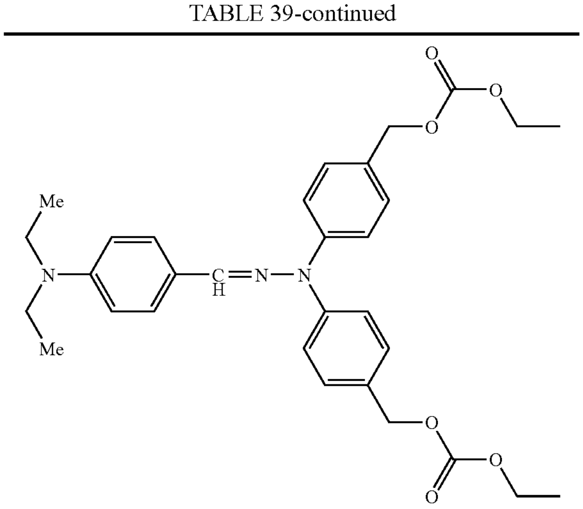
(IV-37)
TABLE 39-continued
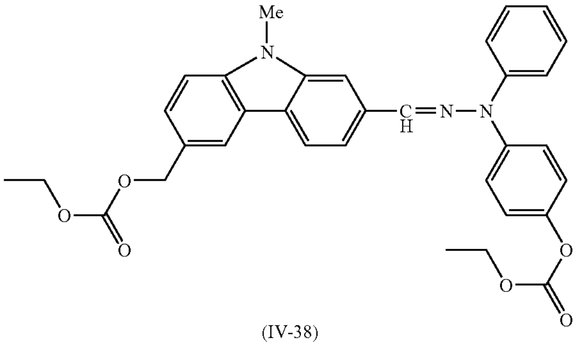
(IV-38)
TABLE 40
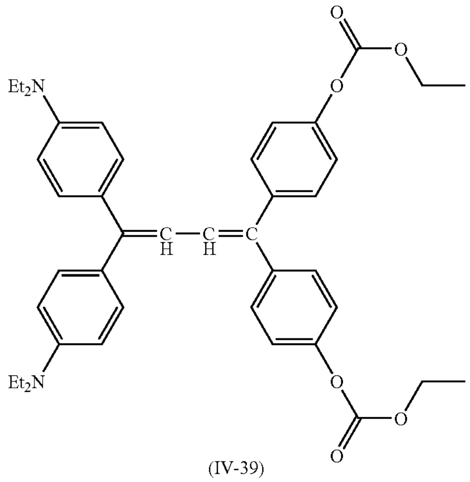
(IV-39)
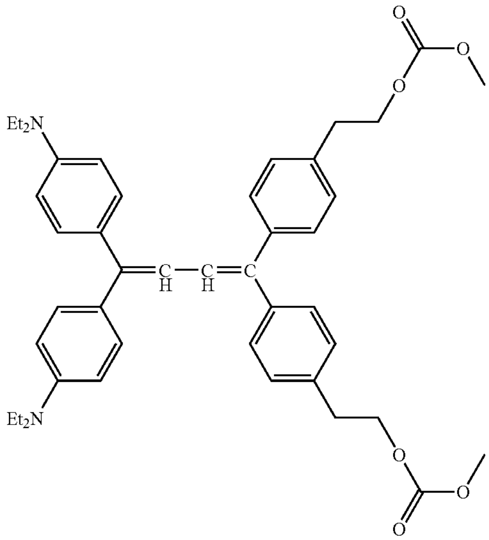
(IV-40)

TABLE 40-continued
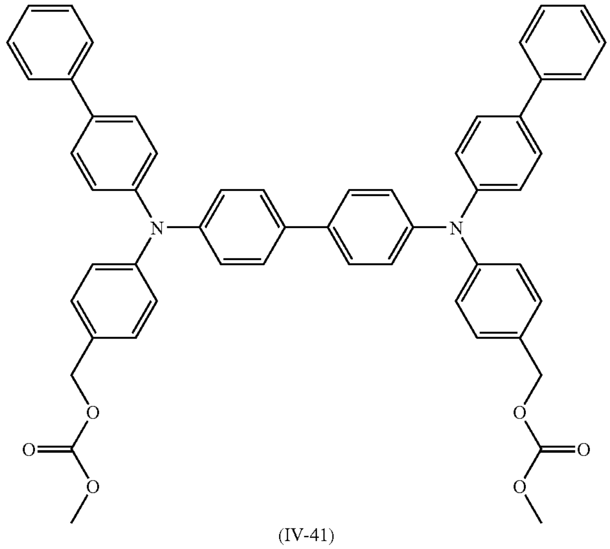
(IV-41)
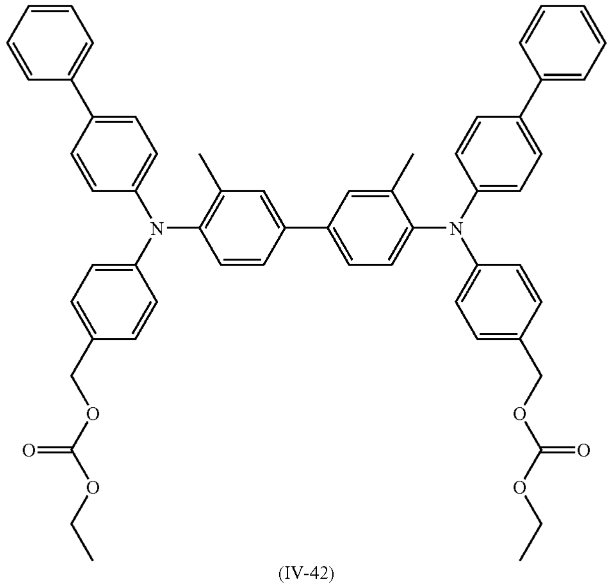
(IV-42)

TABLE 40-continued
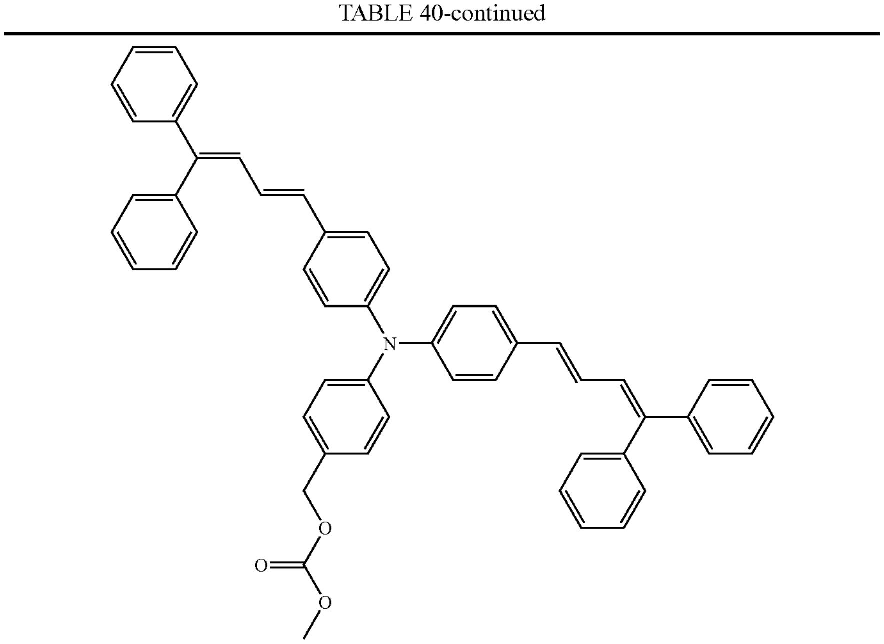
(IV-43)
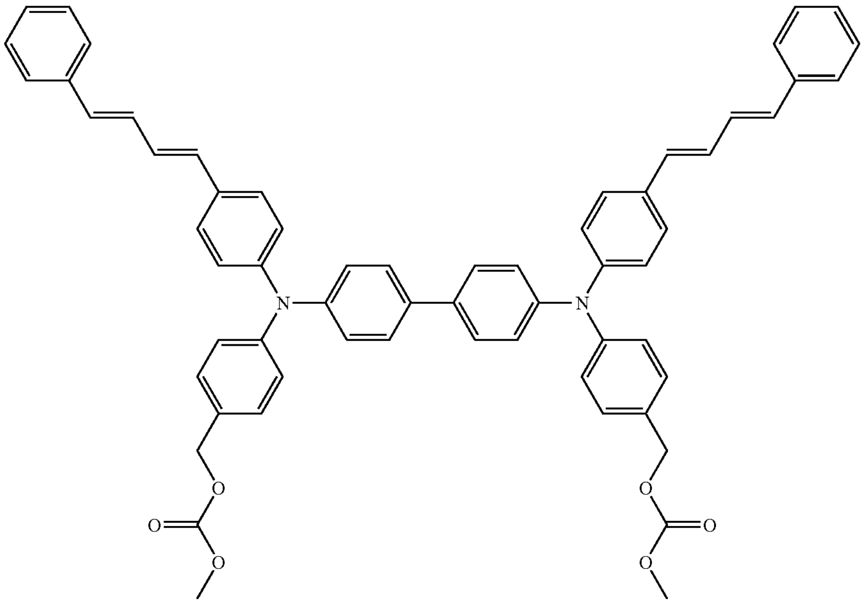
(IV-44)

TABLE 41
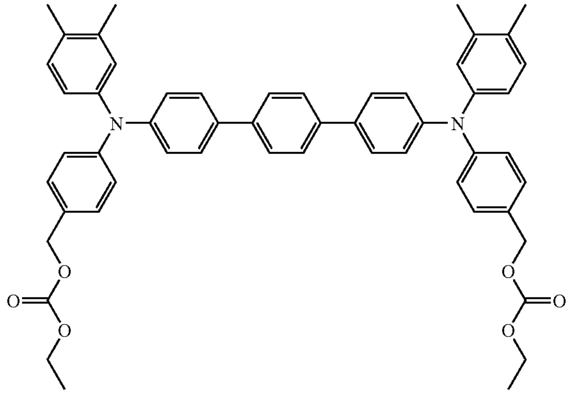
(IV-45)
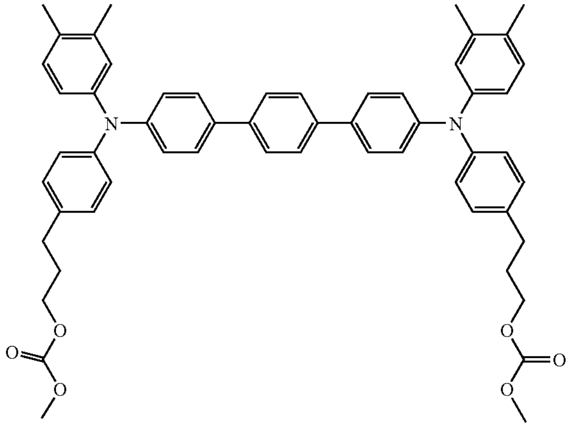
(IV-46)
TABLE 42
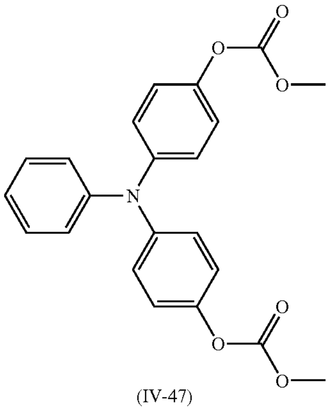
(IV-47)
TABLE 42-continued
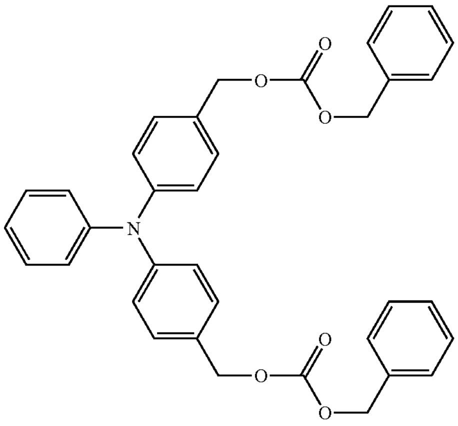
(IV-48)
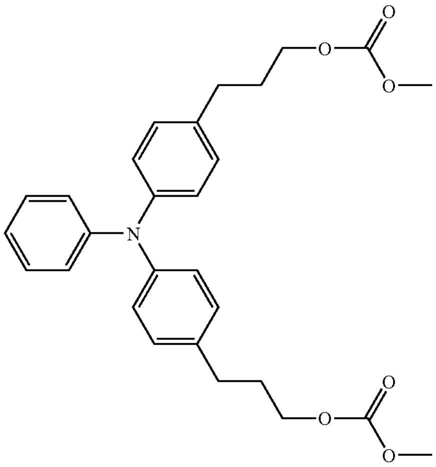
(IV-49)
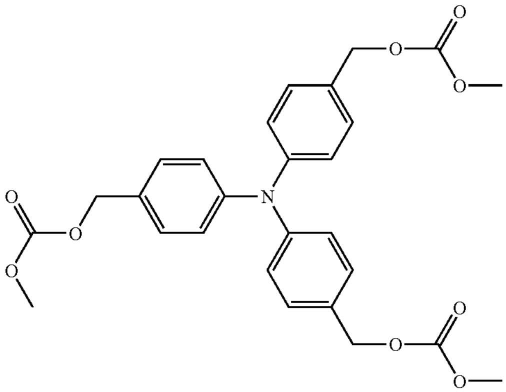
(IV-50)

TABLE 43

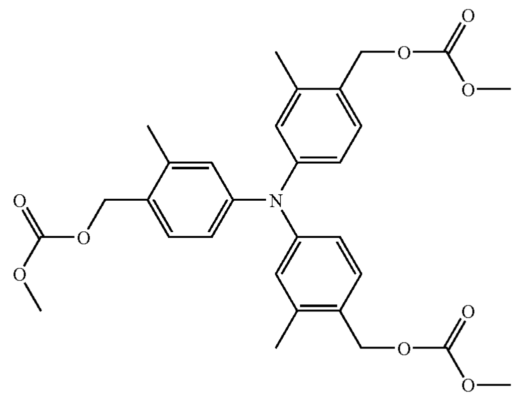

(IV-51)

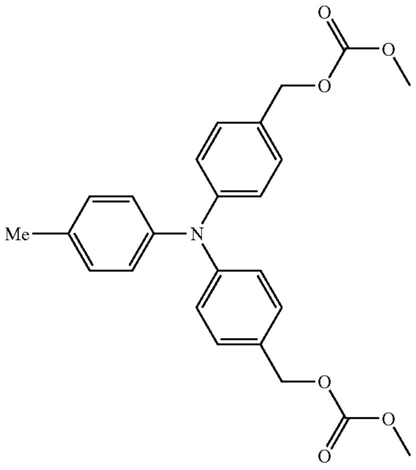

(IV-52)

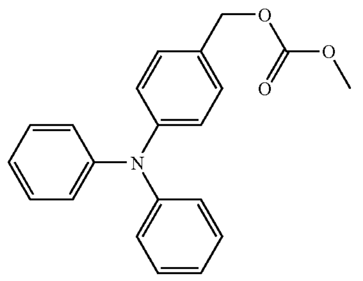

(IV-53)

TABLE 43-continued

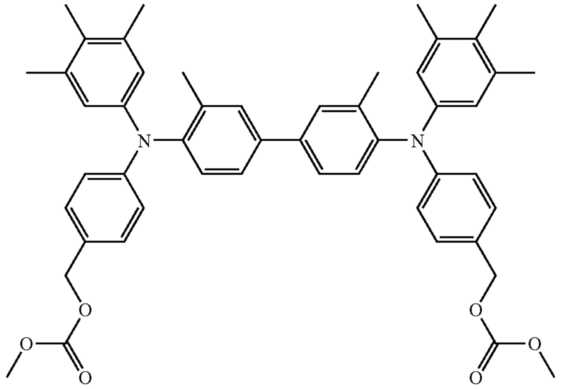

(IV-54)

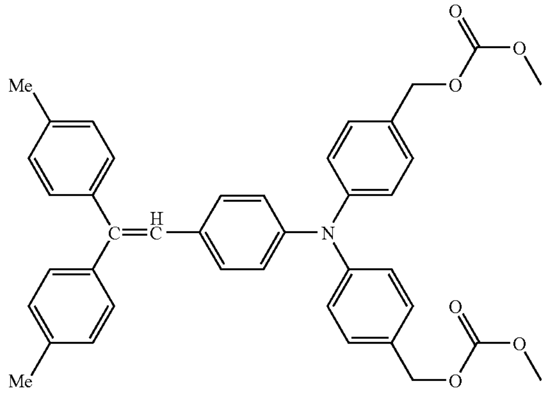

(IV-55)

Further, in the above formula (XVIII), $R^8$ preferably represents a monovalent organic group having from 1 to 18 carbon atoms, more preferably a monovalent hydrocarbon group having from 1 to 18 carbon atoms, which may be substituted with a halogen atom, or a group represented by $-(CH_2)_f-O-R^{24}$, still more preferably an alkyl group having from 1 to 4 carbon atoms, or a group represented by $-(CH_2)_f-O-R^{24}$, and especially preferably a methyl group. $R^{24}$ represents a hydrocarbon group having from 1 to 6 carbon atoms, which may form a ring, and preferably an aliphatic hydrocarbon group, e.g., a methyl group, an ethyl group, a propyl group, or a butyl group. f represents an integer of from 1 to 12, and preferably an integer of from 1 to 4. In formula (XVIII), L preferably represents an alkylene group having from 1 to 18 carbon atoms, which may be branched, and more preferably a methylene group. In formula (XVIII), when a plurality of $R^8$ or L are present, they may be the same or different.

As the specific examples of the compounds represented by formula (XVIII), the following shown compounds (XVIII-1) to (XVIII-59) are exemplified. The compounds represented by formula (XVIII) are by no means limited thereto. In the following tables, bonding hands are shown, but when a substituent is not shown, which shows a methyl group.

TABLE 44
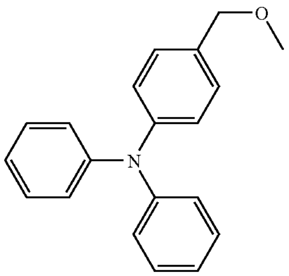
(XVIII-1)
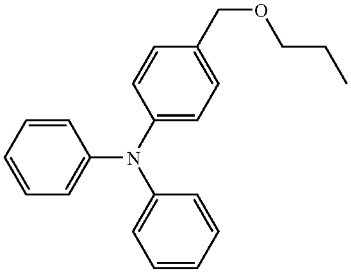
(XVIII-2)
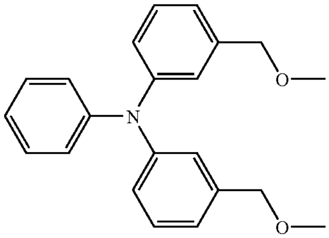
(XVIII-3)
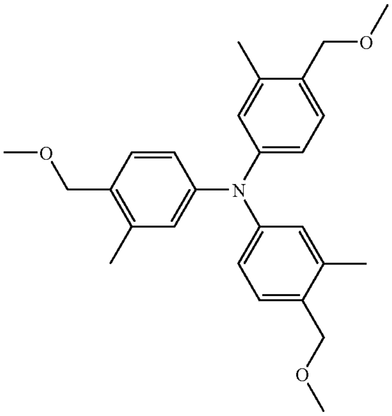
(XVIII-4)
TABLE 44-continued
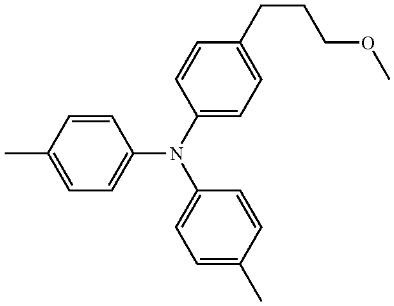
(XVIII-5)
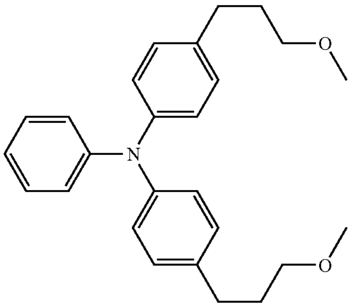
(XVIII-6)
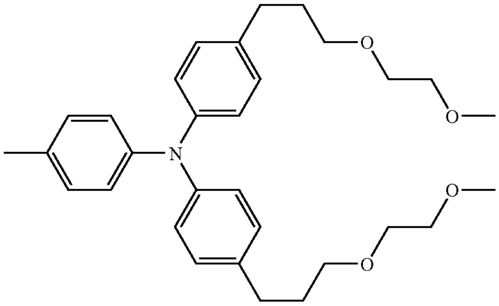
(XVIII-7)
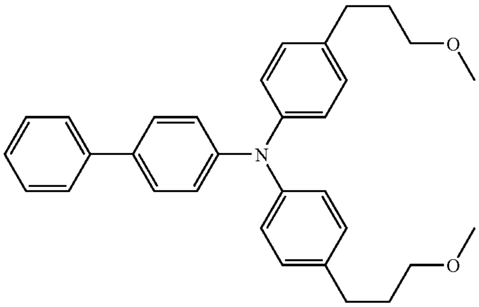
(XVIII-8)

TABLE 45
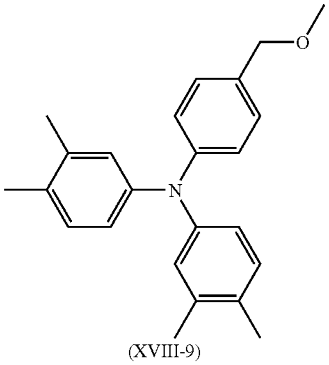
(XVIII-9)
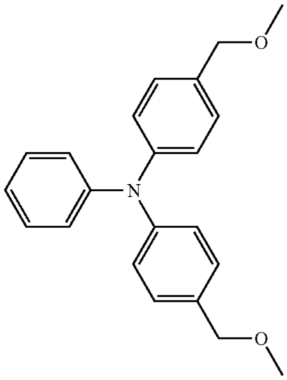
(XVIII-10)
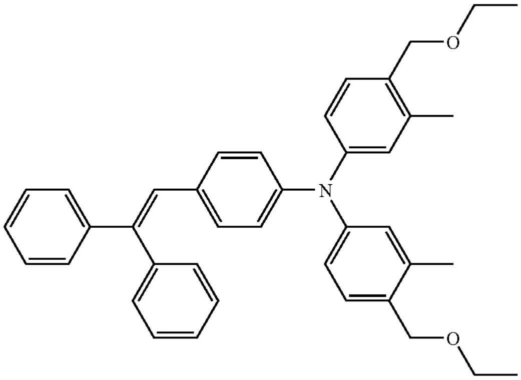
(XVIII-11)
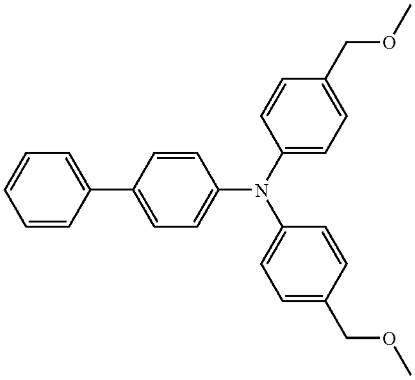
(XVIII-12)
TABLE 45-continued
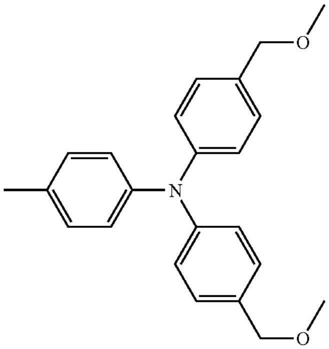
(XVIII-13)
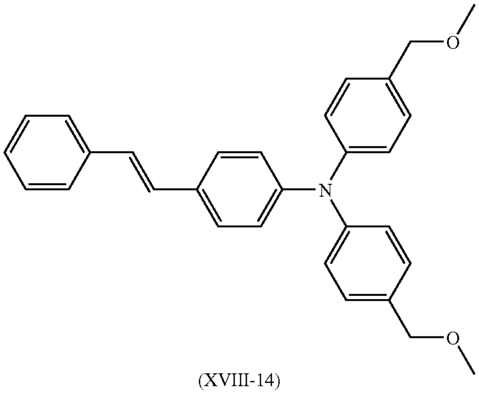
(XVIII-14)
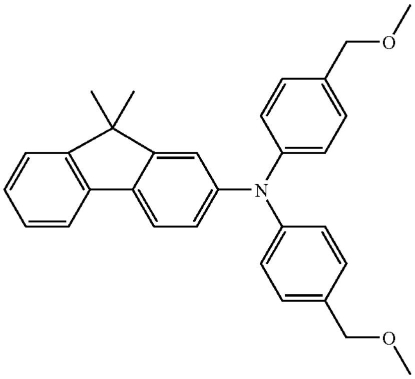
(XVIII-15)
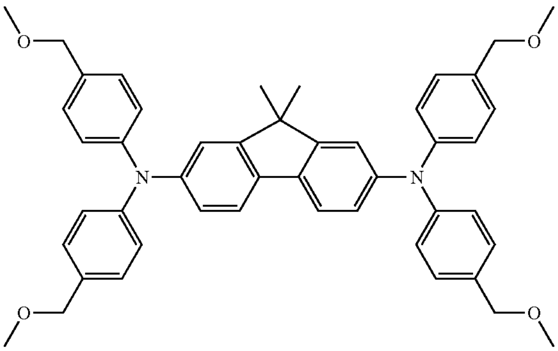
(XVIII-16)

TABLE 46
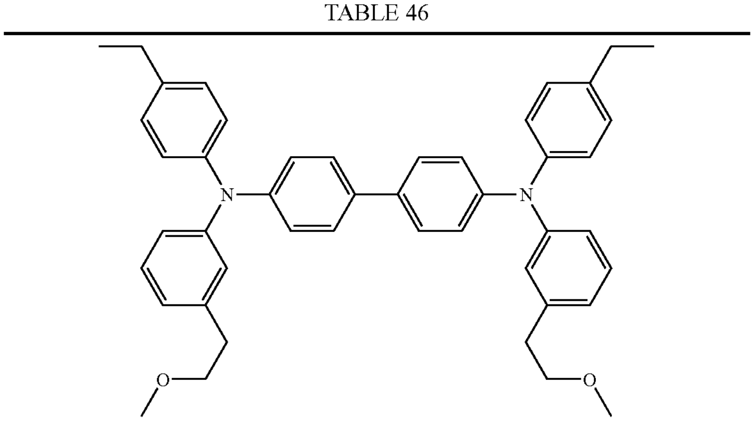
(XVIII-17)
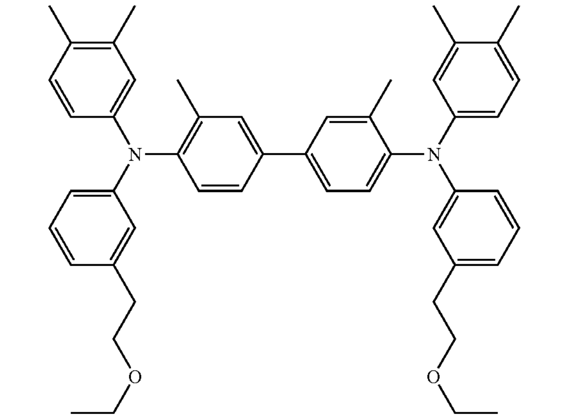
(XVIII-18)
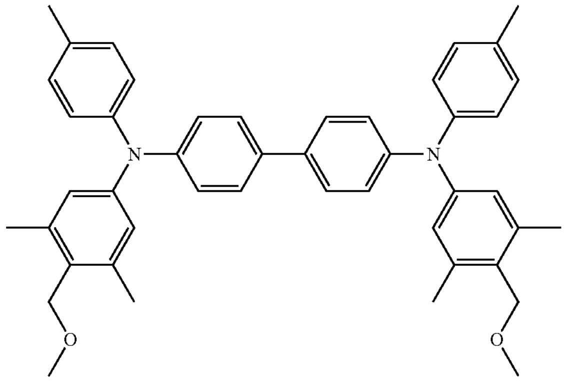
(XVIII-19)

TABLE 46-continued
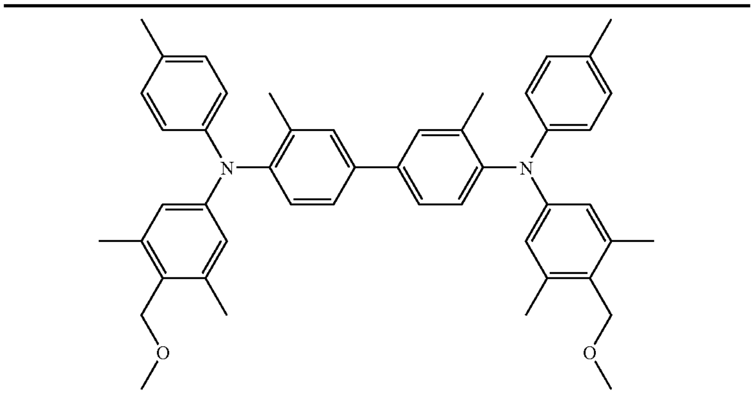
(XVIII-20)
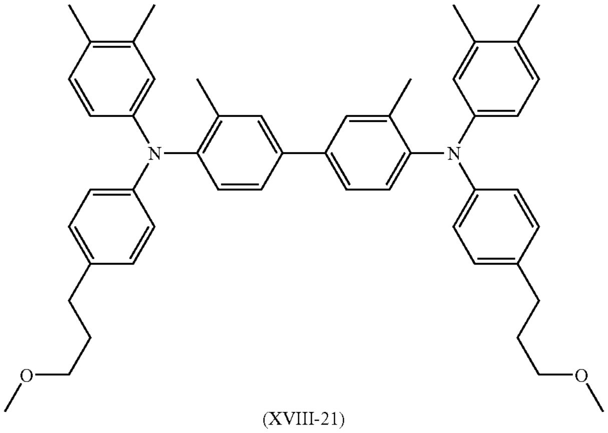
(XVIII-21)
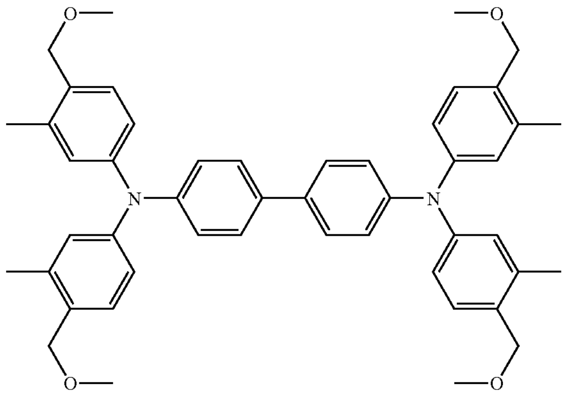
(XVIII-22)

TABLE 46-continued
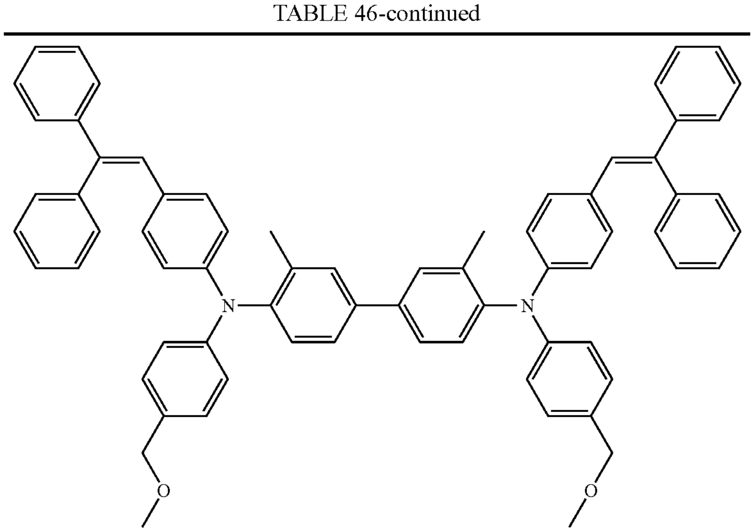
(XVIII-23)
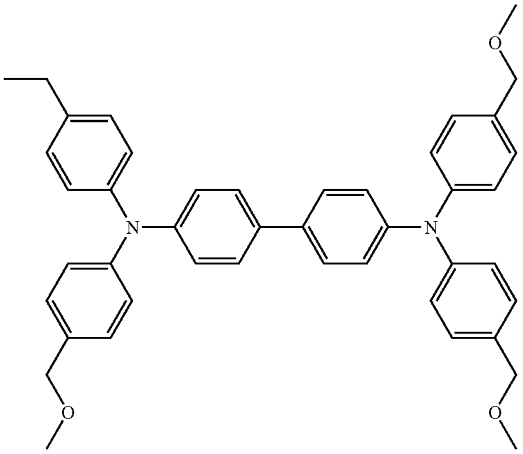
(XVIII-24)
TABLE 47
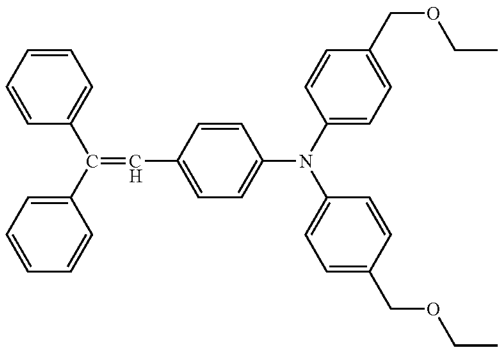
(XVIII-25)
TABLE 47-continued
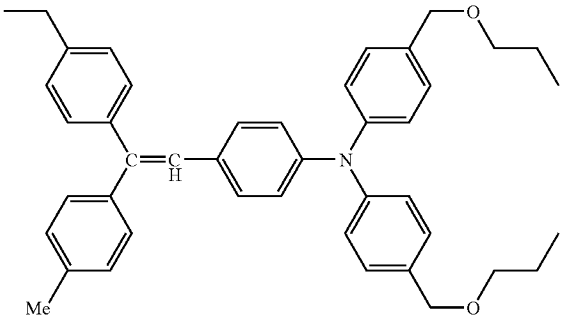
(XVIII-26)

TABLE 47-continued
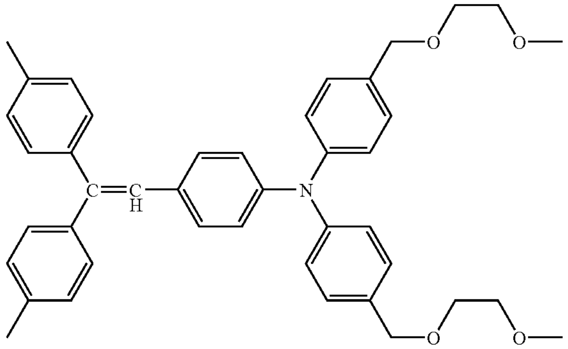
(XVIII-27)
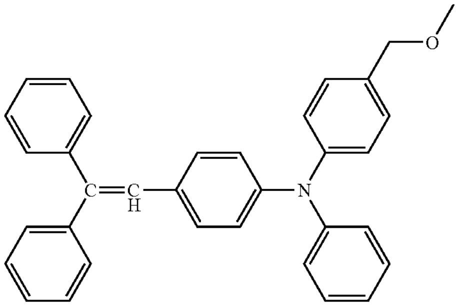
(XVIII-28)
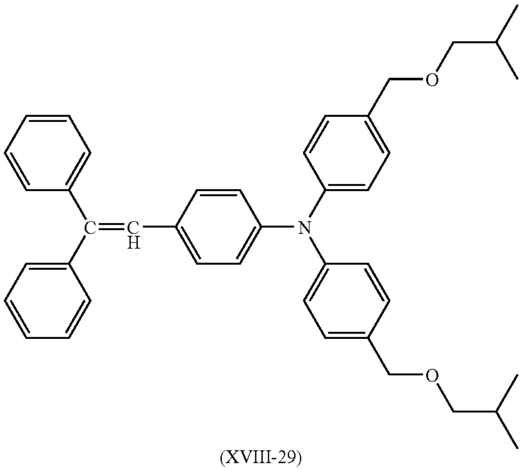
(XVIII-29)
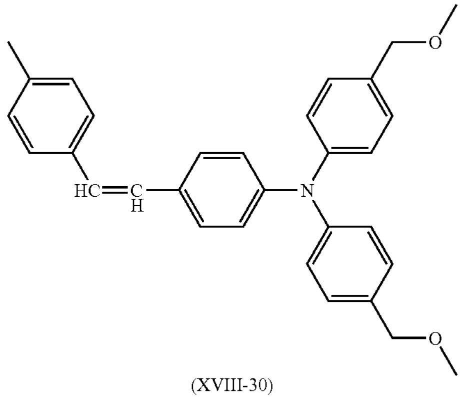
(XVIII-30)
TABLE 47-continued
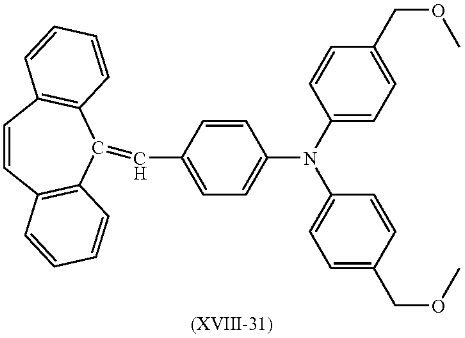
(XVIII-31)
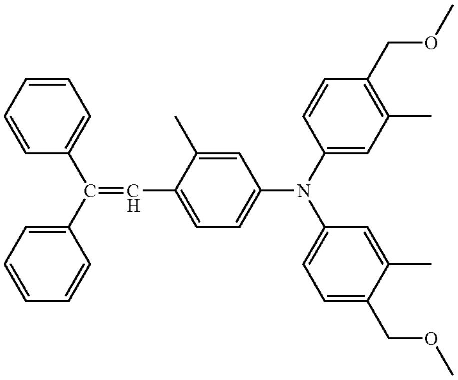
(XVIII-32)
TABLE 48
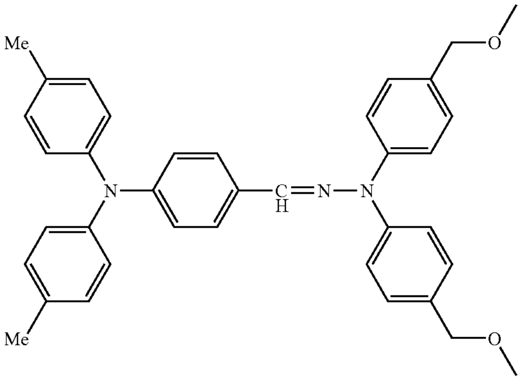
(XVIII-33)
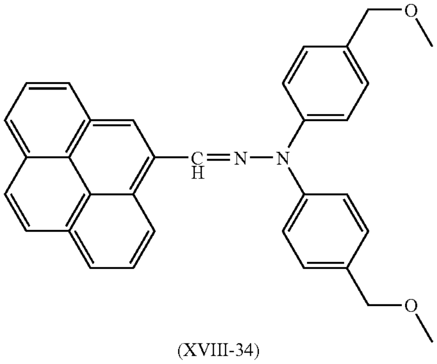
(XVIII-34)

TABLE 48-continued
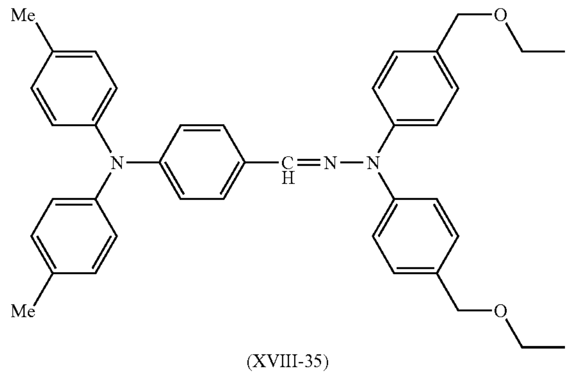
(XVIII-35)
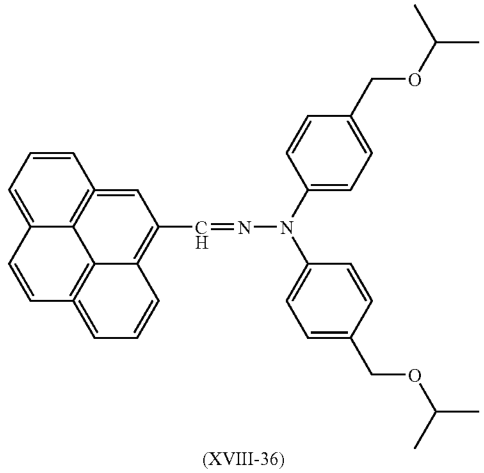
(XVIII-36)
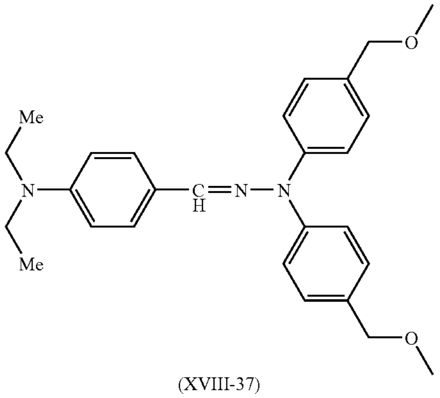
(XVIII-37)
TABLE 48-continued
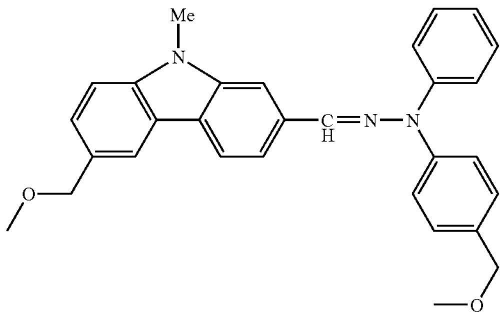
(XVIII-38)
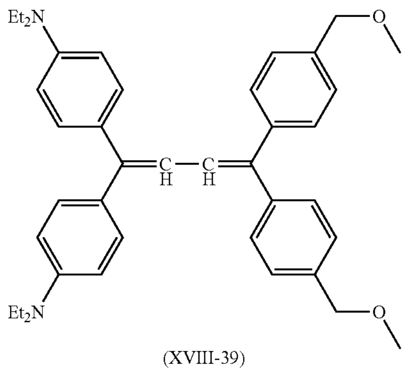
(XVIII-39)
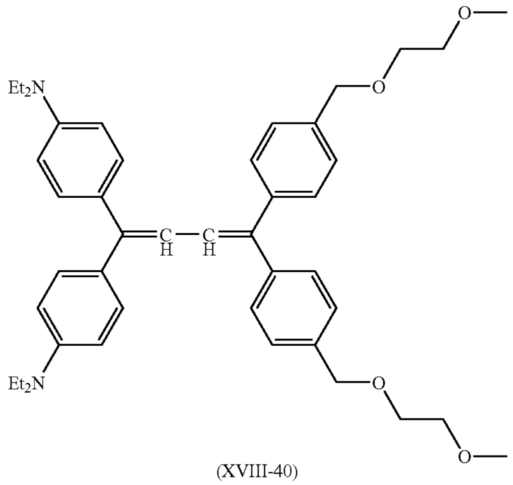
(XVIII-40)

TABLE 49
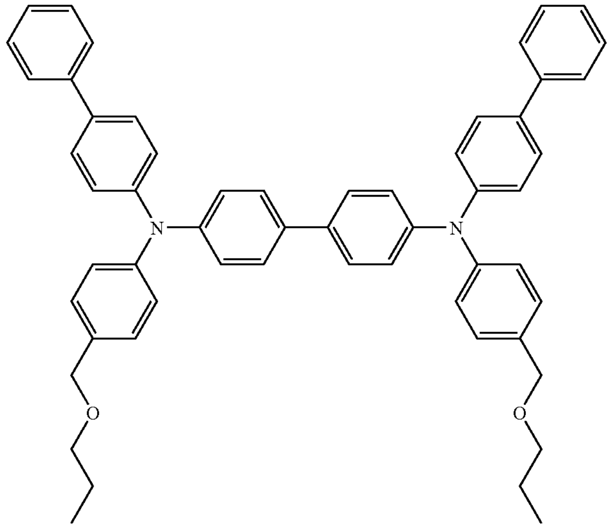
(XVIII-41)
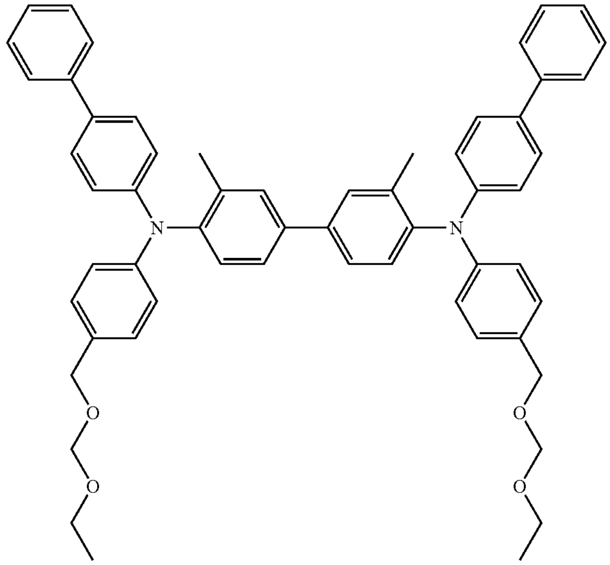
(XVIII-42)

TABLE 49-continued
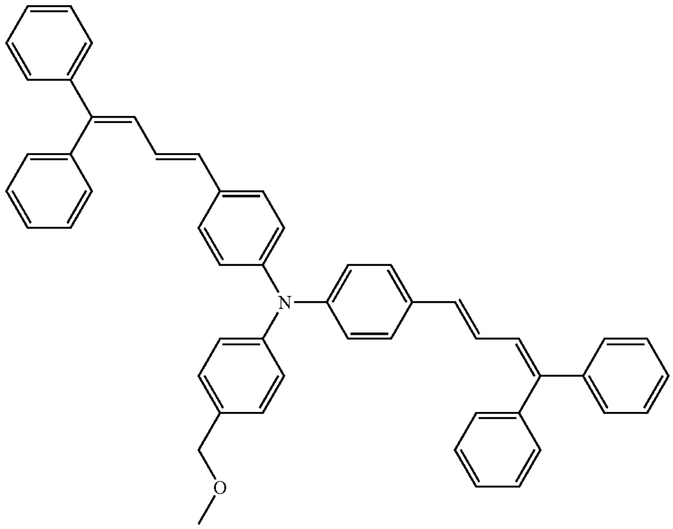
(XVIII-43)
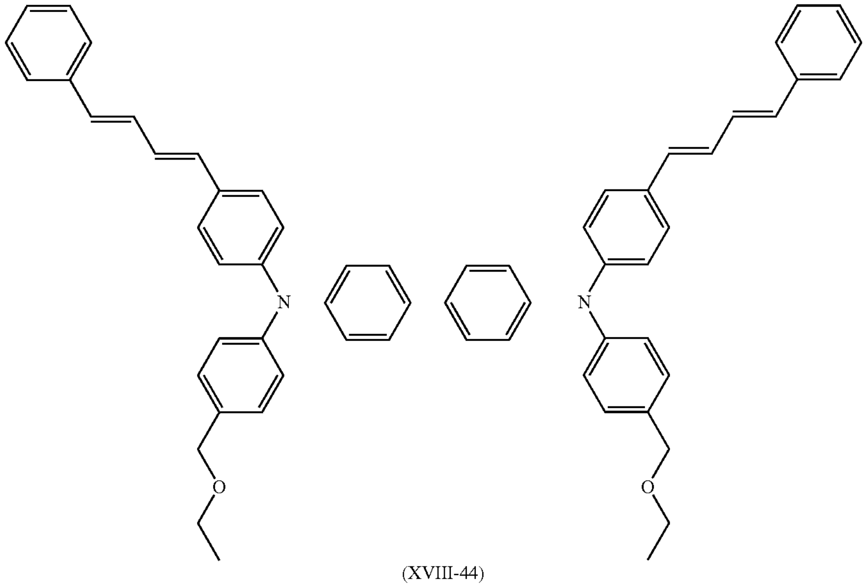
(XVIII-44)

TABLE 49-continued
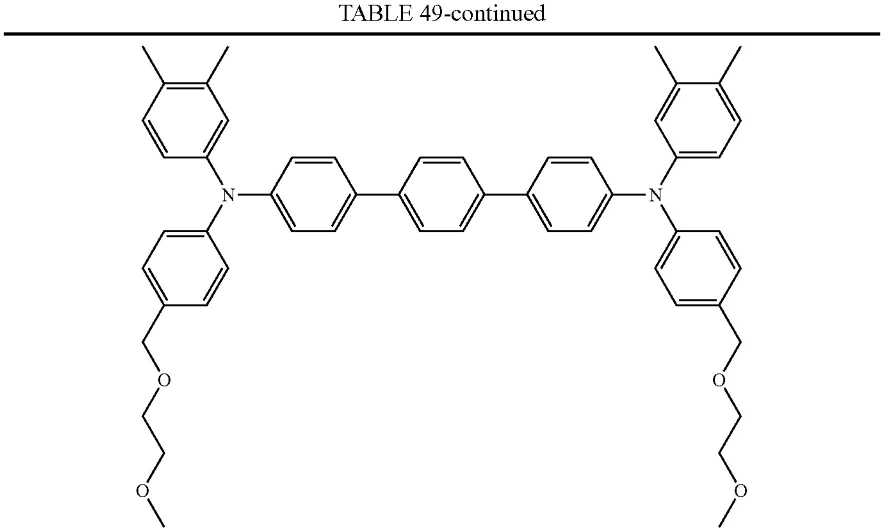
(XVIII-45)
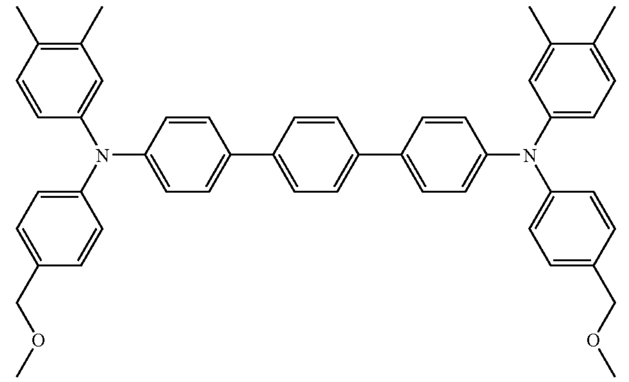
(XVIII-46)
TABLE 50
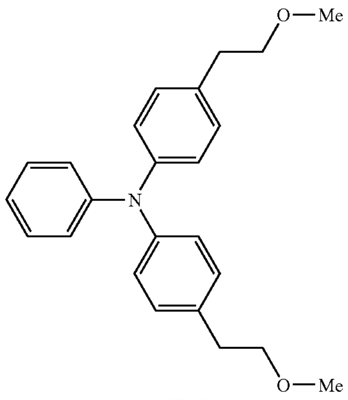
(XVIII-47)
TABLE 50-continued
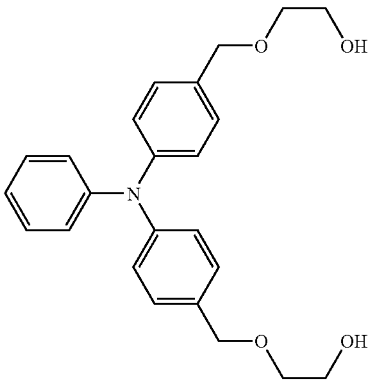
(XVIII-48)

TABLE 50-continued
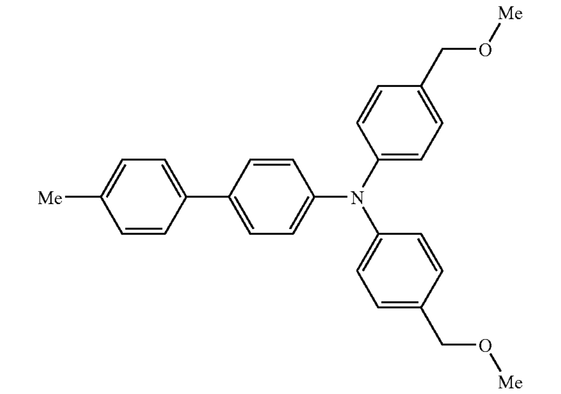
(XVIII-49)
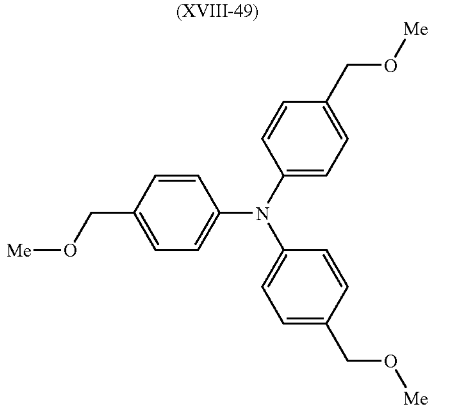
(XVIII-50)
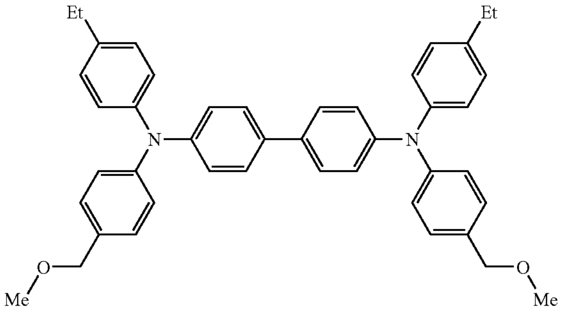
(XVIII-51)
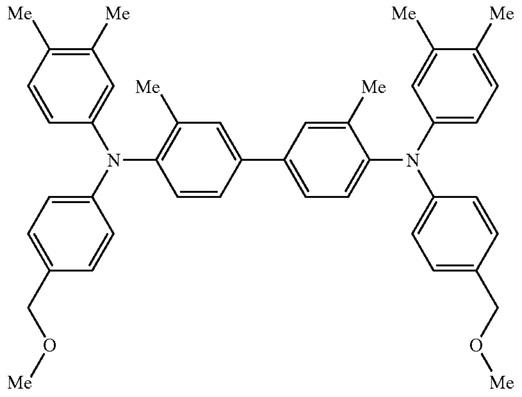
(XVIII-52)
TABLE 51
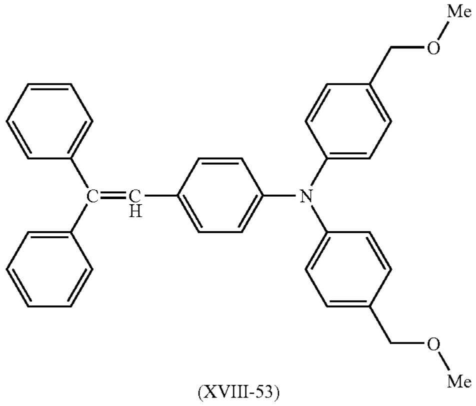
(XVIII-53)
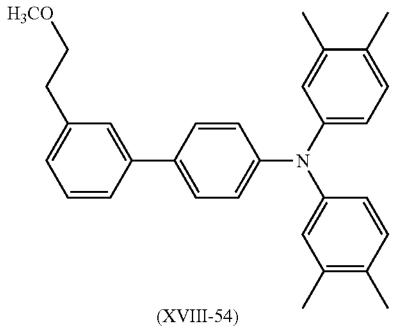
(XVIII-54)
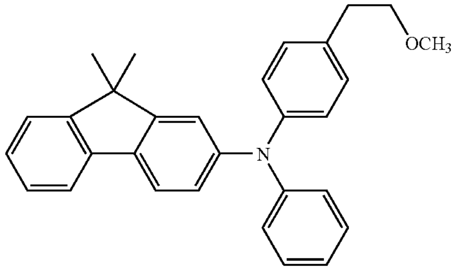
(XVIII-55)
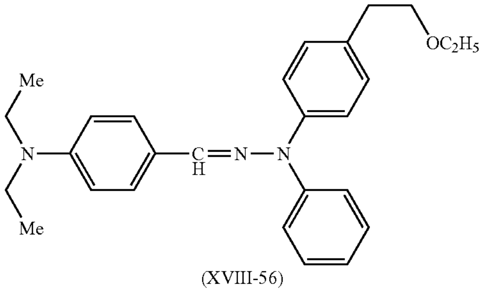
(XVIII-56)

TABLE 51-continued

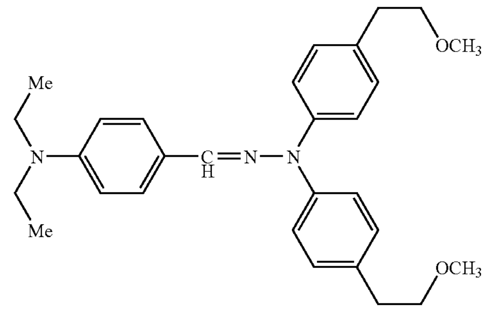

(XVIII-57)

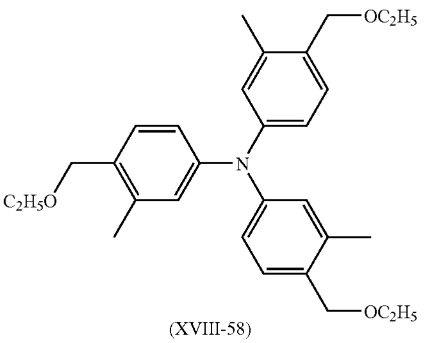

(XVIII-58)

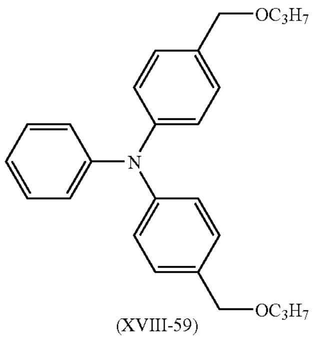

(XVIII-59)

The above compounds represented by formula (XVIII) are curable by themselves alone, and have a property of capable of showing stable electric characteristics. Accordingly, when these compounds are used in combination with a phenolic resin and an organic sulfonic acid and/or the derivative of the organic sulfonic acid, it becomes possible to remarkably improve both mechanical strength and electric characteristics of protective layer 7. The mechanism that an organic sulfonic acid and/or the derivative thereof exhibit the above effects is not necessarily clear, but it is thought that an organic sulfonic acid and/or the derivative thereof function as a catalyst in the reaction of the compound represented by formula (XVIII) and a phenolic resin to form very precise crosslinking structure and, at the same time, function as a dopant, so that electric characteristics are heightened the more. Further, according to an electrophotographic photoreceptor having such a protective layer 7, the fluctuation of charged potential can be sufficiently restrained when used for long, and images having good quality can be formed stably for a long-period of time.

In view of capable of sufficiently restraining the fluctuation of charged potential and sufficiently increasing mechanical strength when an electrophotographic photoreceptor is used for a long period of time, the compound represented by formula (XVIII) is especially preferably a compound represented by the following formula (XX).

(XX)

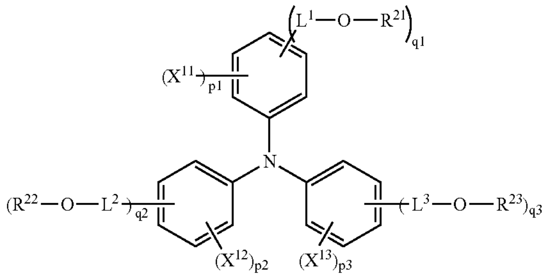

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents a monovalent organic group having from 1 to 18 carbon atoms; $L^1$, $L^2$ and $L^3$ each represents an alkylene group; p1, p2 and p3 each represents an integer of from 0 to 2; and q1, q2 and q3 each represents 0 or 1, and satisfies $q1+q2+q3 \geqq 1$.

In formula (XX), $R^{21}$, $R^{22}$ and $R^{23}$ each preferably represents a monovalent hydrocarbon group having from 1 to 18 carbon atoms, which may be substituted with a halogen atom, or a group represented by $-(CH_2)_f-O-R^{24}$, more preferably an alkyl group having from 1 to 4 carbon atoms, or a group represented by $-(CH_2)_f-O-R^{24}$, and especially preferably a methyl group. $R^{24}$ represents a hydrocarbon group having from 1 to 6 carbon atoms, which may form a ring, and preferably an aliphatic hydrocarbon group, e.g., a methyl group, an ethyl group, a propyl group, or a butyl group. f represents an integer of from 1 to 12, and preferably an integer of from 1 to 4.

In formula (XX), $L^1$, $L^2$ and $L^3$ each preferably represents an alkylene group having from 1 to 18 carbon atoms which may be branched, and more preferably a methylene group. In formula (XX), $X^{11}$, $X^{12}$ and $X^{13}$ each preferably represents an alkyl group having from 1 to 10 carbon atoms, and more preferably an alkyl group having from 1 to 4 carbon atoms.

As the specific examples of the charge transportable compounds represented by formula (XX), the following shown compounds (1) to (125) are exemplified. The following compounds (1) to (125) are those in which $X^{11}$, $X^{12}$, $X^{13}$, $R^{21}$, $R^{22}$, $R^{23}$, $L^1$, $L^2$, $L^3$, p1, p2, p3, q1, q2 and q3 in the compound represented by formula (XX) are combined as shown in the following tables.

In the tables below, "3-p" means 3-position, "4-p" means 4-position, "3,4-p" means 3,4-position, and "3,5-p" means 3,5-position.

TABLE 52

| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 1 | — | — | — | 0 | 0 | 0 | 4-p, $-CH_2-$ | — | — | $-CH(CH_3)_2$ | — | — | 1 | 0 | 0 |
| 2 | — | — | — | 0 | 0 | 0 | 3-p, $-CH_2-$ | — | — | $-CH_3$ | — | — | 1 | 0 | 0 |
| 3 | — | — | — | 0 | 0 | 0 | 4-p, $-CH_2-$ | — | — | $-CH_2CH_3$ | — | — | 1 | 0 | 0 |
| 4 | — | — | — | 0 | 0 | 0 | 4-p, $-CH_2-$ | — | — | $-(CH_2)_3CH_3$ | — | — | 1 | 0 | 0 |
| 5 | — | — | — | 0 | 0 | 0 | 4-p, $-CH_2CH_2CH_2-$ | 4-p, $-CH_2CH_2CH_2-$ | — | $-CH_3$ | $-CH_3$ | — | 1 | 1 | 0 |
| 6 | — | — | — | 0 | 0 | 0 | 4-p, $-CH_2CH_2-$ | — | — | $-CH_3$ | — | — | 1 | 0 | 0 |
| 7 | — | 4-p, $-CH_3$ | — | 0 | 1 | 0 | 4-p, $-CH_2-$ | — | — | $-CH_3$ | — | — | 1 | 0 | 0 |
| 8 | — | 4-p, $-CH_3$ | — | 0 | 1 | 0 | 4-p, $-CH_2-$ | — | — | $-CH_2CH_3$ | — | — | 1 | 0 | 0 |
| 9 | — | 4-p, $-CH_3$ | — | 0 | 1 | 0 | 4-p, $-CH_2-$ | — | — | $-CH_2CH_2CH_3$ | — | — | 1 | 0 | 0 |
| 10 | — | 4-p, $-CH_3$ | — | 0 | 1 | 0 | 4-p, $-CH_2-$ | — | — | $-(CH_2)_4CH_3$ | — | — | 1 | 0 | 0 |
| 11 | — | 4-p, $-OCH_3$ | — | 0 | 1 | 0 | 4-p, $-CH_2-$ | — | — | $-CH_3$ | — | — | 1 | 0 | 0 |
| 12 | — | 4-p, 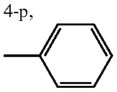 | — | 0 | 1 | 0 | 4-p, $-CH_2-$ | — | — | $-CH_2CH_2OCH_3$ | — | — | 1 | 0 | 0 |
| 13 | — | 4-p, $-CH_3$ | 4-p, $-CH_3$ | 0 | 1 | 1 | 4-p, $-CH_2-$ | — | — | $-CH_3$ | — | — | 1 | 0 | 0 |
| 14 | — | 4-p, $-CH_3$ | 4-p, $-CH_3$ | 0 | 1 | 1 | 4-p, $-CH_2-$ | — | — | $-CH_2CH_3$ | — | — | 1 | 0 | 0 |
| 15 | — | 4-p, $-CH_3$ | 4-p, $-CH_3$ | 0 | 1 | 1 | 4-p, $-CH_2-$ | — | — | $-CH_2CH_2CH_3$ | — | — | 1 | 0 | 0 |
| 16 | — | 4-p, $-CH_3$ | 4-p, $-CH_3$ | 0 | 1 | 1 | 4-p, $-CH_2-$ | — | — | $-(CH_2)_4CH_3$ | — | — | 1 | 0 | 0 |
| 17 | — | 4-p, $-CH_3$ | 4-p, $-CH_3$ | 0 | 1 | 1 | 4-p, $-CH_2-$ | — | — | $-CH_2CH(CH_3)_2$ | — | — | 1 | 0 | 0 |
| 18 | — | 4-p, $-CH_3$ | 4-p, $-CH_3$ | 0 | 1 | 1 | 4-p, $-CH_2-$ | — | — | $-CH_2CH_2OCH_3$ | — | — | 1 | 0 | 0 |
| 19 | — | 4-p, $-CH_3$ | 4-p, $-CH_3$ | 0 | 1 | 1 | 4-p, $-CH_2-$ | — | — | $-CH_2CH_2Cl$ | — | — | 1 | 0 | 0 |
| 20 | — | 4-p, $-CH_3$ | 4-p, $-CH_3$ | 0 | 1 | 1 | 4-p, $-CH(CH_3)-$ | — | — | $-CH_3$ | — | — | 1 | 0 | 0 |

TABLE 53

| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 21 | — | 4-p, $-CH_3$ | 4-p, $-CH_3$ | 0 | 1 | 1 | 4-p, $-CH(CH_3)-$ | — | — | $-CH_2CH_2OCH_3$ | — | — | 1 | 0 | 0 |
| 22 | — | 4-p, $-OCH_3$ | 4-p, $-OCH_3$ | 0 | 1 | 1 | 4-p, $-CH_2-$ | — | — | $-CH_3$ | — | — | 1 | 0 | 0 |
| 23 | — | 4-p, $-OCH_3$ | 4-p, $-OCH_3$ | 0 | 1 | 1 | 4-p, $-CH_2-$ | — | — | $-CH_2CH_3$ | — | — | 1 | 0 | 0 |
| 24 | — | 4-p, $-OCH_3$ | 4-p, $-OCH_3$ | 0 | 1 | 1 | 4-p, $-CH_2-$ | — | — | $-CH_2CH_2CH_3$ | — | — | 1 | 0 | 0 |
| 25 | — | 4-p, $-OCH_3$ | 4-p, $-OCH_3$ | 0 | 1 | 1 | 4-p, $-CH_2-$ | — | — | $-(CH_2)_4CH_3$ | — | — | 1 | 0 | 0 |
| 26 | — | 4-p, $-OCH_3$ | 4-p, $-OCH_3$ | 0 | 1 | 1 | 4-p, $-CH_2-$ | — | — | $-CH_2CH(CH_3)_2$ | — | — | 1 | 0 | 0 |
| 27 | — | 4-p, $-OCH_3$ | 4-p, $-OCH_3$ | 0 | 1 | 1 | 4-p, $-CH_2-$ | — | — | $-CH_2CH_2OCH_3$ | — | — | 1 | 0 | 0 |
| 28 | — | 4-p, $-OCH_3$ | 4-p, $-OCH_3$ | 0 | 1 | 1 | 4-p, $-CH_2-$ | — | — | $-CH_2CH_2Cl$ | — | — | 1 | 0 | 0 |
| 29 | — | 4-p, $-OCH_3$ | 4-p, $-OCH_3$ | 0 | 1 | 1 | 4-p, $-CH(CH_3)-$ | — | — | $-CH_3$ | — | — | 1 | 0 | 0 |
| 30 | — | 4-p, $-OCH_3$ | 4-p, $-OCH_3$ | 0 | 1 | 1 | 4-p, $-CH(CH_3)-$ | — | — | $-CH_2CH_2OCH_3$ | — | — | 1 | 0 | 0 |
| 31 | — | 3, 4-p, $-CH_3$ | 3, 4-p, $-CH_3$ | 0 | 2 | 2 | 4-p, $-CH_2-$ | — | — | $-CH_3$ | — | — | 1 | 0 | 0 |
| 32 | — | 3, 4-p, $-CH_3$ | 3, 4-p, $-CH_3$ | 0 | 2 | 2 | 4-p, $-CH_2-$ | — | — | $-CH_2CH_3$ | — | — | 1 | 0 | 0 |
| 33 | — | 3, 4-p, $-CH_3$ | 3, 4-p, $-CH_3$ | 0 | 2 | 2 | 4-p, $-CH_2-$ | — | — | $-CH_2CH_2CH_3$ | — | — | 1 | 0 | 0 |
| 34 | — | 3, 4-p, $-CH_3$ | 3, 4-p, $-CH_3$ | 0 | 2 | 2 | 4-p, $-CH_2-$ | — | — | $-(CH_2)_4CH_3$ | — | — | 1 | 0 | 0 |
| 35 | — | 3, 4-p, $-CH_3$ | 3, 4-p, $-CH_3$ | 0 | 2 | 2 | 4-p, $-CH_2-$ | — | — | $-CH_2CH(CH_3)_2$ | — | — | 1 | 0 | 0 |
| 36 | — | 3, 4-p, $-CH_3$ | 3, 4-p, $-CH_3$ | 0 | 2 | 2 | 4-p, $-CH_2-$ | — | — | $-CH_2CH_2OCH_3$ | — | — | 1 | 0 | 0 |
| 37 | — | 3, 4-p, $-CH_3$ | 3, 4-p, $-CH_3$ | 0 | 2 | 2 | 4-p, $-CH_2-$ | — | — | $-CH_2CH_2Cl$ | — | — | 1 | 0 | 0 |
| 38 | — | 3, 4-p, $-CH_3$ | 3, 4-p, $-CH_3$ | 0 | 2 | 2 | 4-p, $-CH(CH_3)-$ | — | — | $-CH_3$ | — | — | 1 | 0 | 0 |
| 39 | — | 3, 4-p, $-CH_3$ | 3, 4-p, $-CH_3$ | 0 | 2 | 2 | 4-p, $-CH(CH_3)-$ | — | — | $-CH_2CH_2OCH_3$ | — | — | 1 | 0 | 0 |
| 40 | — | — | — | 0 | 0 | 0 | 4-p, $-CH_2CH_2-$ | — | — | $-CH_3$ | — | — | 1 | 0 | 0 |

TABLE 54

| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 41 | — | — | — | 0 | 0 | 0 | 4-p, $—CH_2—$ | 4-p, $—CH_2—$ | — | $—CH(CH_3)_2$ | $—CH(CH_3)_2$ | — | 1 | 1 | 0 |
| 42 | — | — | — | 0 | 0 | 0 | 4-p, $—CH_2—$ | 4-p, $—CH_2—$ | — | $—CH_2CH_3$ | $—CH_2CH_3$ | — | 1 | 1 | 0 |
| 43 | — | — | — | 0 | 0 | 0 | 4-p, $—CH_2—$ | 4-p, $—CH_2—$ | — | $—CH_2CH_2CH_3$ | $—CH_2CH_2CH_3$ | — | 1 | 1 | 0 |
| 44 | — | — | — | 0 | 0 | 0 | 4-p, $—CH_2—$ | 4-p, $—CH_2—$ | — | $—(CH_2)_4CH_3$ | $—(CH_2)_4CH_3$ | — | 1 | 1 | 0 |
| 45 | — | — | — | 0 | 0 | 0 | 4-p, $—CH_2—$ | 4-p, $—CH_2—$ | — | $—CH_2CH(CH_3)_2$ | $—CH_2CH(CH_3)_2$ | — | 1 | 1 | 0 |
| 46 | — | — | — | 0 | 0 | 0 | 4-p, $—CH_2—$ | 4-p, $—CH_2—$ | — | $—CH_2CH_2OCH_3$ | $—CH_2CH_2OCH_3$ | — | 1 | 1 | 0 |
| 47 | — | — | 4-p, $—CH_3$ | 0 | 0 | 1 | 4-p, $—CH_2—$ | 4-p, $—CH_2—$ | — | $—CH_3$ | $—CH_3$ | — | 1 | 1 | 0 |
| 48 | — | — | 4-p, $—CH_3$ | 0 | 0 | 1 | 4-p, $—CH_2—$ | 4-p, $—CH_2—$ | — | $—CH_2CH_3$ | $—CH_2CH_3$ | — | 1 | 1 | 0 |
| 49 | — | — | 4-p, $—CH_3$ | 0 | 0 | 1 | 4-p, $—CH_2—$ | 4-p, $—CH_2—$ | — | $—CH_2CH_2CH_3$ | $—CH_2CH_2CH_3$ | — | 1 | 1 | 0 |
| 50 | — | — | 4-p, $—CH_3$ | 0 | 0 | 1 | 4-p, $—CH_2—$ | 4-p, $—CH_2—$ | — | $—(CH_2)_4CH_3$ | $—(CH_2)_4CH_3$ | — | 1 | 1 | 0 |
| 51 | — | — | 4-p, $—CH_3$ | 0 | 0 | 1 | 4-p, $—CH_2—$ | 4-p, $—CH_2—$ | — | $—CH_2CH(CH_3)_2$ | $—CH_2CH(CH_3)_2$ | — | 1 | 1 | 0 |
| 52 | — | — | 4-p, $—CH_3$ | 0 | 0 | 1 | 4-p, $—CH_2—$ | 4-p, $—CH_2—$ | — | $—CH_2CH_2OCH_3$ | $—CH_2CH_2OCH_3$ | — | 1 | 1 | 0 |
| 53 | — | — | 4-p, $—CH_3$ | 0 | 0 | 1 | 4-p, $—CH_2—$ | 4-p, $—CH_2—$ | — | $—CH_2CH_2Cl$ | $—CH_2CH_2Cl$ | — | 1 | 1 | 0 |
| 54 | — | — | 4-p, $—CH_3$ | 0 | 0 | 1 | 4-p, $—CH(CH_3)—$ | 4-p, $—CH(CH_3)—$ | — | $—CH_3$ | $—CH_3$ | — | 1 | 1 | 0 |
| 55 | — | — | 4-p, $—CH_3$ | 0 | 0 | 1 | 4-p, $—CH(CH_3)—$ | 4-p, $—CH(CH_3)—$ | — | $—CH_2CH_2OCH_3$ | $—CH_2CH_2OCH_3$ | — | 1 | 1 | 0 |
| 56 | — | — | 4-p, $—OCH_3$ | 0 | 0 | 1 | 4-p, $—CH_2—$ | 4-p, $—CH_2—$ | — | $—CH_3$ | $—CH_3$ | — | 1 | 1 | 0 |
| 57 | — | — | 4-p, $—OCH_3$ | 0 | 0 | 1 | 4-p, $—CH_2—$ | 4-p, $—CH_2—$ | — | $—CH_2CH_3$ | $—CH_2CH_3$ | — | 1 | 1 | 0 |
| 58 | — | — | 4-p, $—OCH_3$ | 0 | 0 | 1 | 4-p, $—CH_2—$ | 4-p, $—CH_2—$ | — | $—CH_2CH_2CH_3$ | $—CH_2CH_2CH_3$ | — | 1 | 1 | 0 |
| 59 | — | — | 4-p, $—OCH_3$ | 0 | 0 | 1 | 4-p, $—CH_2—$ | 4-p, $—CH_2—$ | — | $—(CH_2)_4CH_3$ | $—(CH_2)_4CH_3$ | — | 1 | 1 | 0 |
| 60 | — | — | 4-p, $—OCH_3$ | 0 | 0 | 1 | 4-p, $—CH_2—$ | 4-p, $—CH_2—$ | — | $—CH_2CH(CH_3)_2$ | $—CH_2CH(CH_3)_2$ | — | 1 | 1 | 0 |

TABLE 55

| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 61 | — | — | 4-p, $—OCH_3$ | 0 | 0 | 1 | 4-p, $—CH_2—$ | 4-p, $—CH_2—$ | — | $—CH_2CH_2OCH_3$ | $—CH_2CH_2OCH_3$ | — | 1 | 1 | 0 |
| 62 | — | — | 4-p, $—OCH_3$ | 0 | 0 | 1 | 4-p, $—CH_2—$ | 4-p, $—CH_2—$ | — | $—CH_2CH_2Cl$ | $—CH_2CH_2Cl$ | — | 1 | 1 | 0 |
| 63 | — | — | 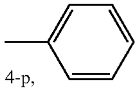 4-p, | 0 | 0 | 1 | 4-p, $—CH_2—$ | 4-p, $—CH_2—$ | — | $—CH_3$ | $—CH_3$ | — | 1 | 1 | 0 |
| 64 | — | — | 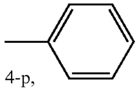 4-p, | 0 | 0 | 1 | 4-p, $—CH_2—$ | 4-p, $—CH_2—$ | — | $—CH_2CH_3$ | $—CH_2CH_3$ | — | 1 | 1 | 0 |
| 65 | — | — | 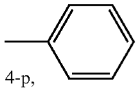 4-p, | 0 | 0 | 1 | 4-p, $—CH_2—$ | 4-p, $—CH_2—$ | — | $—CH_2CH_2CH_3$ | $—CH_2CH_2CH_3$ | — | 1 | 1 | 0 |
| 66 | — | — | 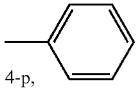 4-p, | 0 | 0 | 1 | 4-p, $—CH_2—$ | 4-p, $—CH_2—$ | — | $—(CH_2)_4CH_3$ | $—(CH_2)_4CH_3$ | — | 1 | 1 | 0 |
| 67 | — | — | 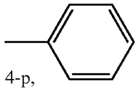 4-p, | 0 | 0 | 1 | 4-p, $—CH_2—$ | 4-p, $—CH_2—$ | — | $—CH_2CH(CH_3)_2$ | $—CH_2CH(CH_3)_2$ | — | 1 | 1 | 0 |
| 68 | — | — | 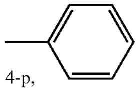 4-p, | 0 | 0 | 1 | 4-p, $—CH_2—$ | 4-p, $—CH_2—$ | — | $—CH_2CH_2OCH_3$ | $—CH_2CH_2OCH_3$ | — | 1 | 1 | 0 |
| 69 | — | — | 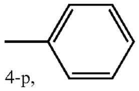 4-p, | 0 | 0 | 1 | 4-p, $—CH_2—$ | 4-p, $—CH_2—$ | — | $—CH_2CH_2Cl$ | $—CH_2CH_2Cl$ | — | 1 | 1 | 0 |
| 70 | — | — | 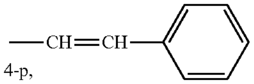 4-p, | 0 | 0 | 1 | 4-p, $—CH_2—$ | 4-p, $—CH_2—$ | — | $—CH(CH_3)_2$ | $—CH(CH_3)_2$ | — | 1 | 1 | 0 |

TABLE 55-continued
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 71 | — | — | 4-p, 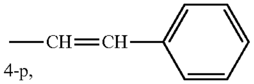 | 0 | 0 | 1 | 4-p, $-CH_2-$ | 4-p, $-CH_2-$ | — | $-CH_2CH_3$ | $-CH_2CH_3$ | — | 1 | 1 | 0 |
| 72 | — | — | 4-p, 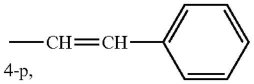 | 0 | 0 | 1 | 4-p, $-CH_2-$ | 4-p, $-CH_2-$ | — | $-CH_2CH_2CH_3$ | $-CH_2CH_2CH_3$ | — | 1 | 1 | 0 |
| 73 | — | — | 4-p, 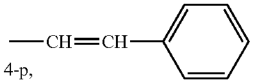 | 0 | 0 | 1 | 4-p, $-CH_2-$ | 4-p, $-CH_2-$ | — | $-(CH_2)_4CH_3$ | $-(CH_2)_4CH_3$ | — | 1 | 1 | 0 |

TABLE 56

| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 74 | — | — | 4-p, 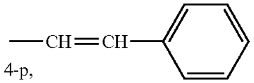 | 0 | 0 | 1 | 4-p, $—CH_2—$ | 4-p, $—CH_2—$ | — | $—CH_2CH(CH_3)_2$ | $—CH_2CH(CH_3)_2$ | — | 1 | 1 | 0 |
| 75 | — | — | 4-p, 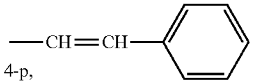 | 0 | 0 | 1 | 4-p, $—CH_2—$ | 4-p, $—CH_2—$ | — | $—CH_2CH_2OCH_3$ | $—CH_2CH_2OCH_3$ | — | 1 | 1 | 0 |
| 76 | — | — | 4-p, 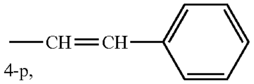 | 0 | 0 | 1 | 4-p, $—CH_2—$ | 4-p, $—CH_2—$ | — | $—CH_2CH_2Cl$ | $—CH_2CH_2Cl$ | — | 1 | 1 | 0 |
| 77 | — | — | 4-p, 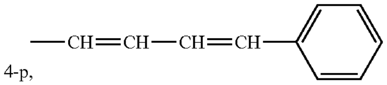 | 0 | 0 | 1 | 4-p, $—CH_2—$ | 4-p, $—CH_2—$ | — | $—CH_3$ | $—CH_3$ | — | 1 | 1 | 0 |
| 78 | — | — | 4-p, 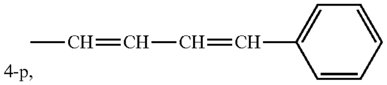 | 0 | 0 | 1 | 4-p, $—CH_2—$ | 4-p, $—CH_2—$ | — | $—CH_2CH_3$ | $—CH_2CH_3$ | — | 1 | 1 | 0 |
| 79 | — | — | 4-p, 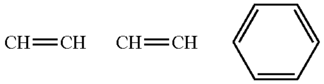 | 0 | 0 | 1 | 4-p, $—CH_2—$ | 4-p, $—CH_2—$ | — | $—CH_2CH_2CH_2$ | $—CH_2CH_2CH_3$ | — | 1 | 1 | 0 |
| 80 | — | — | 4-p, 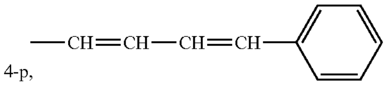 | 0 | 0 | 1 | 4-p, $—CH_2—$ | 4-p, $—CH_2—$ | — | $—(CH_2)_4CH_3$ | $—(CH_2)_4CH_3$ | — | 1 | 1 | 0 |
| 81 | — | — | 4-p, 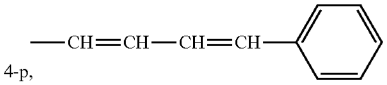 | 0 | 0 | 1 | 4-p, $—CH_2—$ | 4-p, $—CH_2—$ | — | $—CH_2CH(CH_3)_2$ | $—CH_2CH(CH_3)_2$ | — | 1 | 1 | 0 |
| 82 | — | — | 4-p, 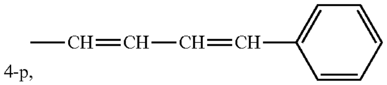 | 0 | 0 | 1 | 4-p, $—CH_2—$ | 4-p, $—CH_2—$ | — | $—CH_2CH_2OCH_3$ | $—CH_2CH_2OCH_3$ | — | 1 | 1 | 0 |
| 83 | — | — | 4-p, 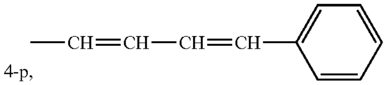 | 0 | 0 | 1 | 4-p, $—CH_2—$ | 4-p, $—CH_2—$ | — | $—CH_2CH_2Cl$ | $—CH_2CH_2Cl$ | — | 1 | 1 | 0 |

TABLE 56-continued
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 84 | — | — | 4-p, 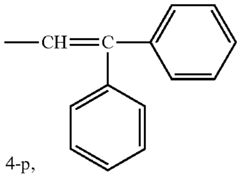 | 0 | 0 | 1 | 4-p, $-CH_2-$ | 4-p, $-CH_2-$ | — | $-CH(CH_3)_2$ | $-CH(CH_3)_2$ | — | 1 | 1 | 0 |

TABLE 57
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 85 | — | — | 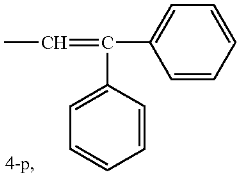 4-p, | 0 | 0 | 1 | 4-p, $-CH_2-$ | 4-p, $-CH_2-$ | — | $-CH_2CH_3$ | $-CH_2CH_3$ | — | 1 | 1 | 0 |
| 86 | — | — | 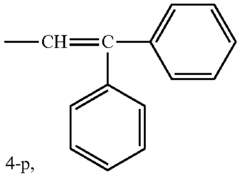 4-p, | 0 | 0 | 1 | 4-p, $-CH_2-$ | 4-p, $-CH_2-$ | — | $-CH_2CH_2CH_3$ | $-CH_2CH_2CH_3$ | — | 1 | 1 | 0 |
| 87 | — | — | 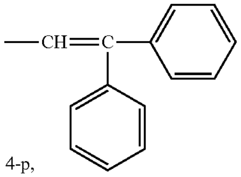 4-p, | 0 | 0 | 1 | 4-p, $-CH_2-$ | 4-p, $-CH_2-$ | — | $-(CH_2)_4CH_3$ | $-(CH_2)_4CH_3$ | — | 1 | 1 | 0 |
| 88 | — | — | 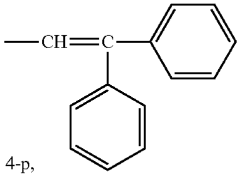 4-p, | 0 | 0 | 1 | 4-p, $-CH_2-$ | 4-p, $-CH_2-$ | — | $-CH_2CH(CH_3)_2$ | $-CH_2CH(CH_3)_2$ | — | 1 | 1 | 0 |
| 89 | — | — | 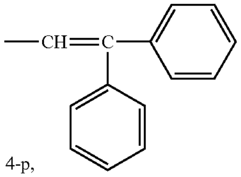 4-p, | 0 | 0 | 1 | 4-p, $-CH_2-$ | 4-p, $-CH_2-$ | — | $-CH_2CH_2OCH_3$ | $-CH_2CH_2OCH_3$ | — | 1 | 1 | 0 |

TABLE 57-continued
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 90 | — | — | 4-p, 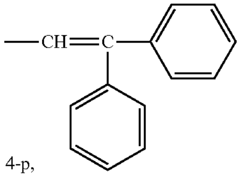 | 0 | 0 | 1 | 4-p, $-CH_2-$ | 4-p, $-CH_2-$ | — | $-CH_2CH_2Cl$ | $-CH_2CH_2Cl$ | — | 1 | 1 | 0 |
| 91 | — | — | 4-p, 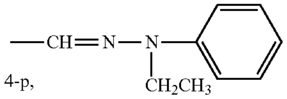 | 0 | 0 | 1 | 4-p, $-CH_2-$ | 4-p, $-CH_2-$ | — | $-CH_3$ | $-CH_3$ | — | 1 | 1 | 0 |

TABLE 58
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 92 | — | — | 4-p, 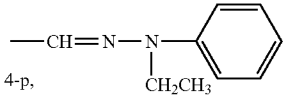 | 0 | 0 | 1 | 4-p, $-CH_2-$ | 4-p, $-CH_2-$ | — | $-CH_2CH_3$ | $-CH_2CH_3$ | — | 1 | 1 | 0 |
| 93 | — | — | 4-p, 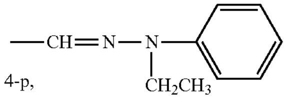 | 0 | 0 | 1 | 4-p, $-CH_2-$ | 4-p, $-CH_2-$ | — | $-CH_2CH_2CH_3$ | $-CH_2CH_2CH_3$ | — | 1 | 1 | 0 |
| 94 | — | — | 4-p, 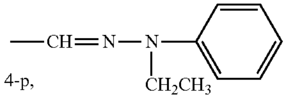 | 0 | 0 | 1 | 4-p, $-CH_2-$ | 4-p, $-CH_2-$ | — | $-(CH_2)_4CH_3$ | $-(CH_2)_4CH_3$ | — | 1 | 1 | 0 |
| 95 | — | — | 4-p, 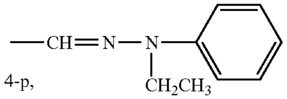 | 0 | 0 | 1 | 4-p, $-CH_2-$ | 4-p, $-CH_2-$ | — | $-CH_2CH(CH_3)_2$ | $-CH_2CH(CH_3)_2$ | — | 1 | 1 | 0 |
| 96 | — | — | 4-p, 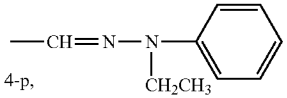 | 0 | 0 | 1 | 4-p, $-CH_2-$ | 4-p, $-CH_2-$ | — | $-CH_2CH_2OCH_3$ | $-CH_2CH_2OCH_3$ | — | 1 | 1 | 0 |
| 97 | — | — | 4-p, 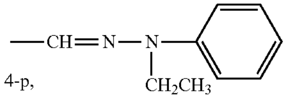 | 0 | 0 | 1 | 4-p, $-CH_2-$ | 4-p, $-CH_2-$ | — | $-CH_2CH_2Cl$ | $-CH_2CH_2Cl$ | — | 1 | 1 | 0 |
| 98 | — | — | 4-p, 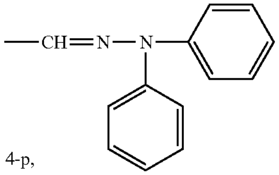 | 0 | 0 | 1 | 4-p, $-CH_2-$ | 4-p, $-CH_2-$ | — | $-CH_3$ | $-CH_3$ | — | 1 | 1 | 0 |

TABLE 58-continued
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 99 | — | — | 4-p, 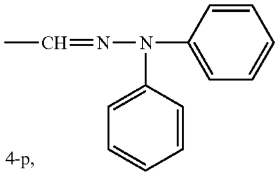 | 0 | 0 | 1 | 4-p, $-CH_2-$ | 4-p, $-CH_2-$ | — | $-CH_2CH_3$ | $-CH_2CH_3$ | — | 1 | 1 | 0 |

TABLE 59
| No. | $X^{11}$ | $X^{12}$ | $X^{13}$ | p1 | p2 | p3 | $L^1$ | $L^2$ | $L^3$ | $R^{21}$ | $R^{22}$ | $R^{23}$ | q1 | q2 | q3 |
|---|---|---|---|---|---|---|---|---|---|---|---|---|---|---|---|
| 100 | — | — | 4-p, 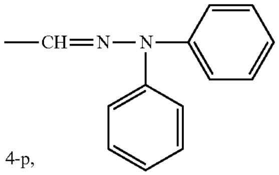 | 0 | 0 | 1 | 4-p, $-CH_2-$ | 4-p, $-CH_2-$ | — | $-CH_2CH_2CH_3$ | $-CH_2CH_2CH_3$ | — | 1 | 1 | 0 |
| 101 | — | — | 4-p, 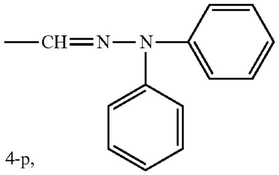 | 0 | 0 | 1 | 4-p, $-CH_2-$ | 4-p, $-CH_2-$ | — | $-(CH_2)_4CH_3$ | $-(CH_2)_4CH_3$ | — | 1 | 1 | 0 |
| 102 | — | — | 4-p, 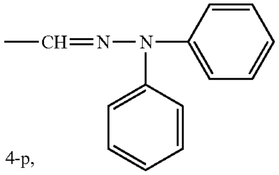 | 0 | 0 | 1 | 4-p, $-CH_2-$ | 4-p, $-CH_2-$ | — | $-CH_2CH(CH_3)_2$ | $-CH_2CH(CH_3)_2$ | — | 1 | 1 | 0 |
| 103 | — | — | 4-p, 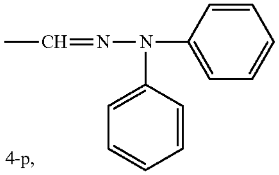 | 0 | 0 | 1 | 4-p, $-CH_2-$ | 4-p, $-CH_2-$ | — | $-CH_2CH_2OCH_3$ | $-CH_2CH_2OCH_3$ | — | 1 | 1 | 0 |
| 104 | — | — | 4-p, 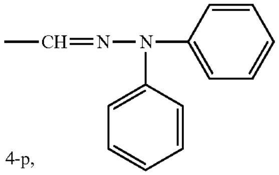 | 0 | 0 | 1 | 4-p, $-CH_2-$ | 4-p, $-CH_2-$ | — | $-CH_2CH_2Cl$ | $-CH_2CH_2Cl$ | — | 1 | 1 | 0 |

TABLE 60

| No. | $X^{11}$ | $X^{12}$ | $X^{13}$ | p1 | p2 | p3 | $L^1, L^2, L^3$ | $R^{21}, R^{22}, R^{23}$ | q1 | q2 | q3 |
|---|---|---|---|---|---|---|---|---|---|---|---|
| 105 | — | — | — | 0 | 0 | 0 | 4-p, $—CH_2CH_2CH_2—$ | $—CH_3$ | 1 | 1 | 1 |
| 106 | — | — | — | 0 | 0 | 0 | 4-p, $—CH_2—$ | $—CH_2CH_3$ | 1 | 1 | 1 |
| 107 | — | — | — | 0 | 0 | 0 | 4-p, $—CH_2—$ | $—CH_2CH_2CH_3$ | 1 | 1 | 1 |
| 108 | — | — | — | 0 | 0 | 0 | 4-p, $—CH_2—$ | $—(CH_2)_4CH_3$ | 1 | 1 | 1 |
| 109 | — | — | — | 0 | 0 | 0 | 4-p, $—CH_2—$ | $—CH_2CH(CH_3)_2$ | 1 | 1 | 1 |
| 110 | — | — | — | 0 | 0 | 0 | 4-p, $—CH_2—$ | $—CH_2CH_2OCH_3$ | 1 | 1 | 1 |
| 111 | — | — | — | 0 | 0 | 0 | 4-p, $—CH_2—$ | $—CH_2CH_2Cl$ | 1 | 1 | 1 |
| 112 | — | 3-p, $—CH_3$ | 3-p, $—CH_3$ | 0 | 1 | 1 | 4-p, $—CH_2—$ | $—CH_3$ | 1 | 1 | 1 |
| 113 | — | 3-p, $—CH_3$ | 3-p, $—CH_3$ | 0 | 1 | 1 | 4-p, $—CH_2—$ | $—CH_2CH_3$ | 1 | 1 | 1 |
| 114 | — | 3-p, $—CH_3$ | 3-p, $—CH_3$ | 0 | 1 | 1 | 4-p, $—CH_2—$ | $—CH_2CH_2CH_3$ | 1 | 1 | 1 |
| 115 | — | 3-p, $—CH_3$ | 3-p, $—CH_3$ | 0 | 1 | 1 | 4-p, $—CH_2—$ | $—(CH_2)_4CH_3$ | 1 | 1 | 1 |
| 116 | — | 3-p, $—CH_3$ | 3-p, $—CH_3$ | 0 | 1 | 1 | 4-p, $—CH_2—$ | $—CH_2CH(CH_3)_2$ | 1 | 1 | 1 |
| 117 | — | 3-p, $—CH_3$ | 3-p, $—CH_3$ | 0 | 1 | 1 | 4-p, $—CH_2—$ | $—CH_2CH_2OCH_3$ | 1 | 1 | 1 |
| 118 | — | 3-p, $—CH_3$ | 3-p, $—CH_3$ | 0 | 1 | 1 | 4-p, $—CH_2—$ | $—CH_2CH_2Cl$ | 1 | 1 | 1 |
| 119 | 3,5-p, $—CH_3$ | 3,5-p, $—CH_3$ | 3,5-p, $—CH_3$ | 2 | 2 | 2 | 4-p, $—CH_2—$ | $—CH_3$ | 1 | 1 | 1 |
| 120 | 3-p, $—CH_3$ | 3-p, $—CH_3$ | 3-p, $—CH_3$ | 1 | 1 | 1 | 4-p, $—CH_2—$ | $—CH_2CH_3$ | 1 | 1 | 1 |
| 121 | 3-p, $—CH_3$ | 3-p, $—CH_3$ | 3-p, $—CH_3$ | 1 | 1 | 1 | 4-p, $—CH_2—$ | $—CH_2CH_2CH_3$ | 1 | 1 | 1 |
| 122 | 3-p, $—CH_3$ | 3-p, $—CH_3$ | 3-p, $—CH_3$ | 1 | 1 | 1 | 4-p, $—CH_2—$ | $—(CH_2)_4CH_3$ | 1 | 1 | 1 |
| 123 | 3-p, $—CH_3$ | 3-p, $—CH_3$ | 3-p, $—CH_3$ | 1 | 1 | 1 | 4-p, $—CH_2—$ | $—CH_2CH(CH_3)_2$ | 1 | 1 | 1 |
| 124 | 3-p, $—CH_3$ | 3-p, $—CH_3$ | 3-p, $—CH_3$ | 1 | 1 | 1 | 4-p, $—CH_2—$ | $—CH_2CH_2OCH_3$ | 1 | 1 | 1 |
| 125 | 3-p, $—CH_3$ | 3-p, $—CH_3$ | 3-p, $—CH_3$ | 1 | 1 | 1 | 4-p, $—CH_2—$ | $—CH_2CH_2Cl$ | 1 | 1 | 1 |

The compound represented by formula (XVIII) can be easily synthesized according to a method of, e.g., reacting a triphenylamine compound having a hydroxyalkyl group with dialkyl sulfate or alkyl iodide to etherify the hydroxyalkyl group. In that case, a reagent to be used can be arbitrarily selected from dimethyl sulfate, diethyl sulfate, methyl iodide, ethyl iodide, etc., and the amount of from 1 to 3 equivalents to the hydroxyalkyl group is sufficient, preferably from 1 to 2 equivalents. As the basic catalyst, those arbitrarily selected from sodium hydroxide, potassium hydroxide, sodium methoxide, sodium ethoxide, sodium t-butoxide, potassium t-butoxide, sodium hydride, sodium metal, etc., can be used, and the amount of from 1 to 3 equivalents to the hydroxyalkyl group is sufficient, preferably from 1 to 2 equivalents. The reaction can be carried out at a temperature of from 0° C. to the boiling point of the solvent to be used.

As the solvents for use in the reaction, benzene, toluene, methylene chloride, tetrahydrofuran, N,N'-dimethylformamide, dimethylsulfoxide, N-methylpyrrolidone, 1,3-dimethyl-2-imidazolidinone, etc., are exemplified, and these solvents can be used alone, or two or three solvents can be used as mixture. According to the kind of reaction, quaternary ammonium salts, e.g., tetra-n-butylammonium iodide, can be used as a layer-to-layer moving catalyst.

To the curable resin composition for forming protective layer 7, a compound represented by the following formula (X) can also be added for controlling various physical properties, e.g., the strength and film resistance of protective layer 7.

$$Si(R^{50})_{(4-c)}Q_c \tag{X}$$

wherein $R^{50}$ represents a hydrogen atom, an alkyl group, or a substituted or unsubstituted aryl group, Q represents a hydrolyzable group, and c represents an integer of from 1 to 4.

The specific examples of the compounds represented by formula (X) include the silane coupling agents as shown below. As the silane coupling agents, tetrafunctional alkoxysilane (c=4), e.g., tetramethoxysilane and tetraethoxysilane; trifunctional alkoxysilane (c=3), e.g., methyltrimethoxy-silane, methyltriethoxysilane, ethyltrimethoxysilane, methyltrimethoxyethoxysilane, vinyltrimethoxysilane, vinyltriethoxysilane, phenyltrimethoxysilane, γ-glycidoxypropylmethyldiethoxysilane, γ-glycidoxypropyltrimethoxysilane, γ-glycidoxypropyltrimethoxysilane, γ-aminopropyltriethoxysilane, γ-aminopropyltrimethoxysilane, γ-aminopropylmethyldimethoxysilane, N-β-(aminoethyl)-γ-aminopropyltriethoxysilane, (tridecafluoro-1,1,2,2-tetrahydrooctyl)triethoxysilane, (3,3,3-trifluoropropyl) trimethoxysilane, 3-(heptafluoroisopropoxy) propyltriethoxysilane, 1H,1H,2H,2H-perfluoroalkyltriethoxysilane, 1H,1H,2H,2H-perfluorodecyltriethoxysilane, and 1H,1H,2H,2H-perfluorooctyltriethoxysilane; bifunctional alkoxysilane (c=2), e.g., dimethyldimethoxysilane, diphenyldimethoxysilane, and methylphenyldimethoxysilane; and monofunctional alkoxysilane (c=1), e.g., trimethylmethoxysilane can be exemplified. For increasing the film strength, a tri- or tetrafunctional alkoxysilane is preferred, and for increasing flexibility and a film-forming property, a mono- or bifunctional alkoxysilane is preferred.

Moreover, silicon series hard coat agents mainly made of these coupling agents can also be used. As commercially available hard coat agents, KP-85, X-40-9740 and X-40-2239 (manufactured by Shin-Etsu Chemical Co., Ltd., Silicone Division), and AY42-440, AY42-441 and AY49-208 (manufactured by Toray Dow-Corning Silicone Co., Ltd.) can be used.

For heightening the strength of protective layer 7, it is also preferred to use a compound having two or more silicon atoms represented by the following formula (XI) in the curable resin composition for forming protective layer 7.

$$B—[Si(R^{51})_{(3-d)}Q_d]_2 \tag{XI}$$

wherein B represents a divalent organic group, $R^{51}$ represents a hydrogen atom, an alkyl group, or a substituted or unsubstituted aryl group, Q represents a hydrolyzable group, and d represents an integer of 1 to 3.

As the examples of the compounds represented by formula (XI), more specifically the following compounds (XI-1) to (XI-16) are exemplified.

TABLE 61

| | |
|---|---|
| XI-1 | $(MeO)_3Si—(CH_2)_2—Si(OMe)_3$ |
| XI-2 | $(MeO)_2MeSi—(CH_2)_2—SiMe(OMe)_2$ |
| XI-3 | $(MeO)_2MeSi—(CH_2)_6—SiMe(OMe)_2$ |
| XI-4 | $(MeO)_3Si—(CH_2)_6—Si(OMe)_3$ |
| XI-5 | $(EtO)_3Si—(CH_2)_6—Si(OEt)_3$ |
| XI-6 | $(MeO)_2MeSi—(CH_2)_{10}—SiMe(OMe)_2$ |
| XI-7 | $(MeO)_3Si—(CH_2)_3—NH—(CH_2)_3—Si(OMe)_3$ |
| XI-8 | $(MeO)_3Si—(CH_2)_3—NH—(CH_2)_2—NH—(CH_2)_3—Si(OMe)_3$ |
| XI-9 | 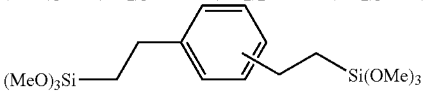 |
| XI-10 | 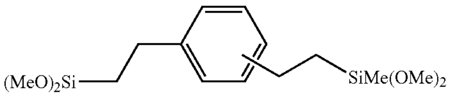 |
| XI-11 | 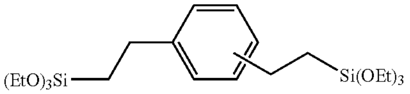 |
| XI-12 | 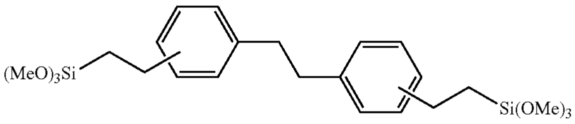 |
| XI-13 | 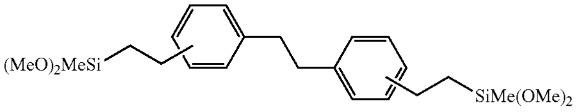 |
| XI-14 | 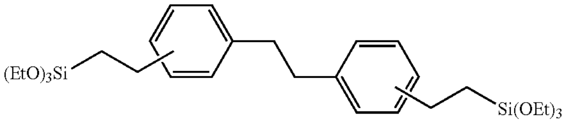 |
| XI-15 | $(MeO)_3SiC_3H_6—O—CH_2CH\{—O—C_3H_6Si(OMe)_3\}—CH_2\{—O—C_3H_6Si(OMe)_3\}$ |
| XI-16 | $(MeO)_3SiC_2H_4—SiMe_2—O—SiMe_2—O—SiMe_2—C_2H_4Si(OMe)_3$ |

Further, for the control of film characteristics and the lengthening of the pot life of liquid, resins soluble in alcohol and ketone solvents may be added. As such resins, polyvinyl butyral resins, polyvinyl formal resins, polyvinyl acetal resins, e.g., partially acetalized polyvinyl acetal resins in which a part of the butyral is modified with formal or acetoacetal (e.g., S-LEC B, K, etc., manufactured by Sekisui Chemical Co., Ltd.), polyamide resins, cellulose resins, and phenolic resins are exemplified. Polyvinyl acetal resins are especially preferred in view of capable of improving electric characteristics.

Further, various resins can be added to the curable resin composition for the purpose of improving the resistance to discharge gas, mechanical strength, scratch resistance, particle dispersibility, viscosity control, reduction of torque, control of abrasion loss, and lengthening of pot life. In the invention, it is preferred to further contain resins soluble in an alcohol. As the resins soluble in alcohol solvents, polyvinyl butyral resins, polyvinyl formal resins, polyvinyl acetal resins, e.g., partially acetalized polyvinyl acetal resins in which a part of the butyral is modified with formal or acetoacetal (e.g., S-LEC B, K, etc., manufactured by Sekisui Chemical Co., Ltd.), polyamide resins and cellulose resins are exemplified. Polyvinyl acetal resins are especially preferred in view of capable of improving electric characteristics.

The weight average molecular weight of these resins is preferably from 2,000 to 100,000, more preferably from 5,000 to 50,000. When the weight average molecular weight is smaller than 2,000, desired effects are liable not to be obtained, while when the weight average molecular weight is larger than 100,000, the solubility lowers and the addition amount is limited and liable to cause film defects in coating. The addition amount of the resins is preferably from about 1 to about 40 weight %, more preferably from 1 to 30 weight %, and most preferably from about 5 to about 20 weight %. When the addition amount is less than about 1 weight %, desired effects are difficult to obtain, and when the amount is larger than about 40 weight %, there is the possibility of the occurrence of blur of an image under high temperature high humidity conditions. These resins maybe used alone or two or more resins may be used as mixture.

For the lengthening of pot life and the control of film characteristics, it is preferred to contain a cyclic compound having a repeating structural unit represented by the following formula (XII) or the derivative of the compound.

(XII)

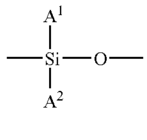

wherein $A^1$ and $A^2$ each represents a monovalent organic group.

As the cyclic compounds having a repeating structural unit represented by formula (XII), commercially available cyclic siloxane can be exemplified. Specifically, cyclic siloxanes, such as cyclic dimethylcyclosiloxanes, e.g., hexamethylcyclotrisiloxane, octamethylcyclotetrasiloxane, decamethylcyclopentasiloxane, and dodecamethylcyclohexasiloxane, cyclic methylphenylcyclosiloxanes, e.g., 1,3,5-trimethyl-1,3,5-triphenylcyclotrisiloxane, 1,3,5,7-tetramethyl-1,3,5,7-tetraphenylcyclotetrasiloxane, and 1,3,5,7,9-pentamethyl-1,3,5,7,9-pentaphenylcyclopentasiloxane, cyclic phenylcyclosiloxanes, e.g., hexaphenylcyclotrisiloxane, fluorine-containing cyclosiloxanes, e.g., 3-(3,3,3-trifluoropropyl)methylcyclotrisiloxane, hydrosilyl group-containing cyclosiloxanes, e.g., methylhydrosiloxane mixture, pentamethylcyclopentasiloxane, and phenylhydrocyclosiloxane, and vinyl group-containing cyclosiloxanes, e.g., pentavinylpentamethylcyclopentasiloxane can be exemplified. These cyclic siloxane compounds may be used alone, or two or more compounds may be used as mixture.

Further, various fine particles can be added to the curable resin composition for forming protective layer 7 for the purpose of controlling the resistance to adhesion of contaminants on the surface of the electrophotographic photoreceptor, lubricity and hardness.

As an example of the fine particles, silicon-containing fine particles can be exemplified. The silicon-containing fine particles are fine particles containing silicon atoms as the constituting element, specifically colloidal silica and silicone fine particles are exemplified. Colloidal silica used as silicon-containing fine particles has a volume average particle size of preferably from 1 to 100 nm, more preferably from 10 to 30 nm, selected from acidic or alkaline aqueous dispersion and organic solvent dispersions such as alcohol, ketone and ester, and commercially available products can be used. The solid content of colloidal silica in the curable resin composition is not especially restricted, but the content is preferably in the range of from about 0.1 to about 50 weight % on the basis of the total solids content in the curable resin composition, more preferably from about 0.1 to about 30 weight %, in view of film-forming property, electric characteristics and strength.

Silicone fine particles used as the silicon-containing fine particles are preferably spherical, having a volume average particle size of preferably from 1 to 500 nm, more preferably from 10 to 100 nm, selected from silicone resin particles, silicone rubber particles and silica particles surface-treated with silicone, and commercially available products can be used.

Silicone fine particles are particles of small particle size and chemically inert and excellent in dispersibility in resins. Further, sufficient characteristics can be obtained with a small addition amount, so that the surface properties of an electrophotographic photoreceptor can be improved without hindering a crosslinking reaction. That is, in the state of being uniformly taken in a stable crosslinking structure, the fine particles can improve the lubrication and water repellency of the surface of the electrophotographic photoreceptor, and good abrasion resistance and the adhesion resistance of contaminants can be maintained for a long period of time. The content of silicone fine particles in the curable resin composition is preferably in the range of from about 0.1 to about 30 weight % on the basis of the total solids content in the curable resin composition, more preferably from about 0.5 to about 10 weight %.

As the examples of other fine particles, fluorine fine particles, e.g., ethylene tetrafluoride, ethylene trifluoride, propylene hexafluoride, vinyl fluoride, and vinylidene fluoride, fine particles comprising resins obtained by copolymerization of fluorine resins and monomers having hydroxyl groups as described in the manuscripts of the lectures in *Eighth Forum of Polymer Materials*, p. 89, and semi-conductive metallic oxides, e.g., $ZnO—Al_2O_3$, $SnO_2—Sb_2O_3$, $In_2O_3—SnO_2$, $ZnO—TiO_2$, $MgO—Al_2O_3$, $FeO—TiO_2$, $TiO_2$, $SnO_2$, $In_2O_3$, ZnO and MgO can be exemplified.

As fine particles, it is preferred to add electrically conductive fine particles such as metals, metallic oxides and carbon blacks to the curable resin composition for forming protective layer 7. As the metals, aluminum, zinc, copper, chromium, nickel, silver and stainless steel, and plastic particles whose surfaces are deposited with these metals are exemplified. As the metallic oxides, zinc oxide, titanium oxide, tin oxide, antimony oxide, indium oxide, bismuth oxide, indium oxide doped with tin, tin oxide doped with antimony or tantalum, and zirconium oxide doped with antimony are exemplified. These metals and metallic oxides may be used alone or two or more kinds in combination. When two or more metals and metallic oxides are used in combination, the form of combination may be mere mixture, or they may be solid states or fused states.

The volume average particle size of the electrically conductive fine particles is preferably 0.3 μm or less in the point of the transparency of protective layer 7, more preferably 0.1 μm or less. Of the above electrically conductive fine particles, metallic oxides are especially preferably used in view of transparency. For controlling dispersibility, it is preferred that fine particles are subjected to surface treatment. As the surface treating agents, silane coupling agents, silicone oils, siloxane compounds and surfactants are exemplified. The surface treating agents containing fluorine atoms are preferred.

By the addition of these electrically conductive fine particles, there is the tendency for the charge transportability and electric characteristics of protective layer 7 to be improved.

For the purpose of controlling the resistance to adhesion of contaminants, lubrication and hardness of the surface of an electrophotographic photoreceptor, oils such as silicone oils can also be added. As the silicone oils, silicone oils, e.g., dimethylpolysiloxane, diphenylpolysiloxane, and phenylmethylsiloxane, and reactive silicone oils, e.g., amino-modified polysiloxane, epoxy-modified polysiloxane, carboxyl-modified polysiloxane, carbinol-modified polysiloxane, methacrylate-modified polysiloxane, mercapto-modified polysiloxane, and phenol-modified polysiloxane can be exemplified. The silicone oil may be previously added to the curable resin composition for forming protective layer 7, or immersion treatment may be carried out under reduced pressure or pressurization after manufacturing a photoreceptor.

The curable resin composition for forming protective layer 7 can also contain additives, e.g., a plasticizer, a surface modifier, an antioxidant and a light degradation preventive. As the plasticizers, e.g., biphenyl, biphenyl chloride, terphenyl, dibutyl phthalate, diethylene glycol phthalate, dioctyl phthalate, triphenyl phosphate, methylnaphthalene, benzophenone, chlorinated paraffin, polypropylene, polystyrene, and various fluoro-hydrocarbons are exemplified.

The curable resin composition for forming protective layer 7 can contain antioxidants, e.g., hindered phenol, hindered amine, and antioxidants having a partial structure of thioether or phosphite, and these compounds are effective for stabilizing electric potential in the time of environmental fluctuation and improving image quality.

As the antioxidants, the following compounds are exemplified. For example, as hindered phenols, Sumilizer BHT-R, Sumilizer MDP-S, Sumilizer BBM-S, Sumilizer WX-R, Sumilizer NW, Sumilizer BP-76, Sumilizer BP-101, Sumilizer GA-80, Sumilizer GM, and Sumilizer GS (manufactured by Sumitomo Chemical Co., Ltd.), IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WL, IRGANOX 1520L, IRGANOX245, IRGANOX259, IRGANOX3114, IRGANOX3790, IRGANOX5057, and IRGANOX 565 (manufactured by Ciba Specialty Chemicals Inc.), Adekastab AO-20, Adekastab AO-30, Adekastab AO-40, Adekastab AO-50, Adekastab AO-60, Adekastab AO-70, Adekastab AO-80, and Adekastab AO-330 (manufactured by Asahi Denka Co., Ltd.), as hindered amines, Sanol LS2626, Sanol LS765, Sanol LS770, and Sanol LS744 (manufactured by Sankyo Lifetech Co., Ltd.), Tinuvin 144 and Tinuvin 622LD (manufactured by Ciba Specialty Chemicals Inc.), Mark LA57, Mark LA67, Mark LA62, Mark LA68, and Mark LA63 (manufactured by Asahi Denka Co., Ltd.), Sumilizer TPS (manufactured by Sumitomo Chemical Co., Ltd.), as thioether series, Sumilizer TP-D (manufactured by Sumitomo Chemical Co., Ltd.), and as phosphite series, Mark 2112, Mark PEP•8, Mark PEP•24G, Mark PEP•36, Mark 329K and Mark HP•10 (manufactured by Asahi Denka Co., Ltd.) are exemplified, and hindered phenol and hindered amine series antioxidants are especially preferred. These antioxidants may further be modified with a material forming a crosslinking film and a substituent capable of crosslinking reaction, e.g., an alkoxysilyl group.

The curable resin composition for forming protective layer 7 can contain insulating resins, e.g., polyvinyl butyral resins, polyallylate resins (polycondensation products of bisphenol A and phthalic acid, etc.), polycarbonate resins, polyester resins, phenoxy resins, vinyl chloride-vinyl acetate copolymers, polyamide resins, acrylic resins, polyacrylamide resins, polyvinylpyridine resins, cellulose resins, urethane resins, epoxy resins, casein, polyvinyl alcohol resins, and polyvinyl pyrrolidone resins. These insulating resins can be added in arbitrary proportion, and the adhesion of protective layer 7 with charge-transporting layer 6, thermal shrinkage and coating defects due to repellency can be controlled by the addition of insulating resins.

A catalyst can be added to the curable resin composition for forming protective layer 7 or in preparing protective layer 7. As the catalysts, inorganic acids, e.g., hydrochloric acid, acetic acid and sulfuric acid, organic acids, e.g., formic acid, propionic acid, oxalic acid, benzoic acid, phthalic acid, and maleic acid, alkali catalysts, e.g., potassium hydroxide, sodium hydroxide, calcium hydroxide, ammonia and triethylamine, and the following shown solid catalysts insoluble in the reaction system are exemplified.

As the solid catalysts insoluble in the reaction system, cationic ion exchange resins, e.g., Amberlite 15, Amberlite 200C, and Amberlyst 15E (manufactured by Rohm & Haas), Dowex MWC-1-H, Dowex 88, Dowex HCR-W2 (manufactured by Dow Chemical Company), Lebachit SPC-108 and Lebachit SPC-118 (manufactured by Bayer Yakuhin Ltd.), Diaion RCP-150H (manufactured by Mitsubishi Kasei Corp.), Sumikaion KC-470, Duolite C26-C, Duolite C-433 and Duolite 464 (manufactured by Sumitomo Chemical Co., Ltd.), and Nafion H (manufactured by E.I. Du Pont de Nemours); anionic ion exchange resins, e.g., Amberlite IRA-400 and Amberlite IRA-45 (manufactured by Rohm & Haas); inorganic solids wherein a group containing a protonic acid radical is bonded to the surface, e.g., $Zr(O_3PCH_2CH_2SO_3H)_2$, $Th(O_3PCH_2CH_2COOH)$; polyorganosiloxane having a protonic acid radical, e.g., polyorganosiloxane having a sulfonic acid group; heteropoly acids, e.g., cobalttungstic acid and phosphomolybdic acid; isopoly acids, e.g., niobic acid, tantalic acid and molybdic acid; monoelement metallic oxides, e.g., silica gel, alumina, chromia, zirconia, CaO and MgO; composite metallic oxides, e.g., silica-alumina, silica-magnesia, silica-zirconia, and zeolite; clay minerals, e.g., acid clay, activated clay, montmorillonite, and kaolinite; metal sulfate, e.g., $LiSO_4$ and $MgSO_4$; metal phosphate, e.g., zirconia phosphate and lanthanum phosphate; metal nitrate, e.g., $LiNO_3$ and $Mn(NO_3)_2$; inorganic solids wherein a group containing an amino group is bonded to the surface, e.g., solids obtained by the reaction of aminopropyltrimethoxysilane on silica gel; and polyorgano-siloxane containing an amino group, e.g., amino-modified silicone resins are exemplified.

When the solid catalysts insoluble in photo-functional compounds, reaction products, water and solvents are used in the preparation of the curable resin composition, the stability of the coating solution is liable to be improved and so preferred. The solid catalysts insoluble in the reaction system are not especially restricted so long as the catalytic components are insoluble in the charge transportable material having a reactive functional group, other additives, water and solvents.

The use amount of these solid catalysts insoluble in the reaction system is not particularly limited, but the amount is preferably from 0.1 to 100 weight parts per 100 weight parts of the charge transportable material having a reactive functional group. Further, since these solid catalysts are insoluble in the material compounds, reaction products and solvents as described above, they can be easily removed after the reaction by ordinary methods.

The reaction temperature and the reaction time are arbitrarily selected according to the material compounds and the kinds and the use amounts of the solid catalysts, but the reaction temperature is generally from 0 to 100° C., preferably from 10 to 70° C., and more preferably from 15 to 50° C., and the reaction time is preferably from 10 minutes to 100 hours. When the reaction time exceeds the least upper bound, gelation is liable to occur.

When the catalysts insoluble in the reaction system are used in preparing the curable resin composition, it is preferred to further use a catalyst soluble in the reaction system in combination for the improvement of the strength and the preservation stability of the solution. As the catalysts soluble in the reaction system, in addition to those described above, organic aluminum compounds, e.g., aluminum triethylate, aluminum triisopropylate, aluminum tri(sec-butylate), mono (sec-butoxy) aluminum diisopropylate, diisopropoxy aluminum (ethylacetoacetate), aluminum tris(ethylaceto-acetate), aluminum bis(ethylacetoacetate)monoacetyl-acetonate, aluminum tris(acetylacetonate), aluminum diisopropoxy(acetylacetonate), aluminum isopropoxy-bis-(acetylacetonate), aluminum tris(trifluoroacetylacetonate), and aluminum tris (hexafluoroacetylacetonate) can be used.

Besides the organic aluminum compounds, organic tin compounds, e.g., dibutyltin dilaurate, dibutyltin dioctiate, and dibutyltin diacetate; organic titanium compounds, e.g., titanium tetrakis(acetylacetonate), titanium bis(butoxy)bis (acetylacetonate), and titanium bis(isopropoxy)bis(acetylacetonate); and zirconium compounds, e.g., zirconium tetrakis (acetylacetonate), zirconium bis(butoxy)bis (acetylacetonate) and zirconium bis (isopropoxy)bis (acetylacetonate) can also be used, but it is preferred to use organic aluminum compounds in view of safety, low costs, and the length of pot life, and aluminum chelate compounds are more preferred.

The use amount of these catalysts soluble in the reaction system is not particularly limited, but the amount is preferably from 0.1 to 20 weight parts per 100 weight parts of the charge transportable material having a reactive functional group, and especially preferably from 0.3 to 10 weight parts.

When organic metal compounds are used as the catalysts in forming protective layer 7, it is preferred to add multidentate ligands to the composition from the aspects of pot life and curing efficiency. As the multidentate ligands, the following shown compounds and the compounds derived from these compounds are exemplified, but the invention is not limited thereto.

Specifically, the multidentate ligands include β-diketones, e.g., acetylacetone, trifluoroacetylacetone, hexafluoroacetylacetone, and dipivaloylmethylacetone; acetoacetatic esters, e.g., methyl acetoacetate and ethyl acetoacetate; bipyridine and derivatives of it; glycine and derivatives of it, ethylenediamine and derivatives of it; 8-oxyquinoline and derivatives of it; salicylaldehyde and derivatives of it; catechol and derivatives of it; bidentate ligands, e.g., 2-oxyazo compounds; diethyltriamine and derivatives of it; tridentate ligands, e.g., nitrilotriacetic acid and derivatives of it; and hexadentate ligands, e.g., ethylenediaminetetraacetic acid (EDTA) and derivatives of it. Further, besides the above organic ligands, inorganic ligands, e.g., pyrophosphoric acid and triphosphoric acid can be exemplified. As multidentate ligands, bidentate ligands are especially preferred, and as the specific example, besides the above ligands, a bidentate ligand represented by the following formula (XIII) is exemplified.

(XIII)

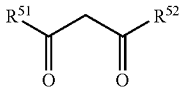

wherein $R^{51}$ and $R^{52}$ each represents an alkyl group having from 1 to 10 carbon atoms, an alkyl fluoride group, or an alkoxyl group having from 1 to 10 carbon atoms.

As multidentate ligand, it is preferred to use the bidentate ligand represented by the above formula (XIII), and formula (XIII) wherein $R^{51}$ and $R^{52}$ represent the same group is especially preferred. By making $R^{51}$ and $R^{52}$ the same, the coordination strength of the ligands around room temperature becomes strong, so that the curable resin composition can be further stabilized.

The compounding ratio of a multidentate ligand can be set arbitrarily, but the amount is preferably about 0.01 mol or more per mol of the organic metal compound used, more preferably about 0.1 mol or more, and especially preferably about 1 mol or more.

Protective layer 7 is formed with a protective layer forming coating solution comprising the curable resin composition containing the constituting materials described above.

The curable resin composition containing the above constitutional components can be prepared without using a solvent, or with solvents such as alcohols, e.g., methanol, ethanol, propanol, butanol, etc.; ketones, e.g., acetone, methyl ethyl ketone, etc.; and ethers, e.g., tetrahydrofuran, diethyl ether, dioxane, etc. The solvents can be used one kind alone, or two or more solvents can be used as mixture, and the solvents having a boiling point of 100° C. or lower are preferred. The use amount of the solvents can be set arbitrarily, but too small an amount results in the precipitation of the charge transportable material having a reactive functional group, so that the amount is preferably from 0.5 to 30 weight parts per 1 weight part of the charge transportable material having a reactive functional group, more preferably from 1 to 20 weight parts.

The reaction temperature and the reaction time in curing the curable resin composition are not particularly restricted, but in the light of the mechanical strength and chemical stability of protective layer 7 to be formed, the reaction temperature is preferably 60° C. or more, more preferably from 80 to 200° C., and the reaction temperature is preferably from 10 minutes to 5 hours. To maintain protective layer 7 obtained by curing the curable resin composition in a high temperature state is effective to contrive the stabilization of the characteristics of protective layer 7. Further, protective layer 7 can be hydrophobitized by surface treatment with hexamethyldisilazane and trimethylchlorosilane according to use.

When the curable resin composition is coated on charge-transporting layer 6, ordinary coating methods, e.g., blade coating, wire bar coating, spray coating, dip coating, ring-type meniscus coating, bead coating, air knife coating, and curtain coating can be used.

If a required layer thickness cannot be obtained by one time coating, a required layer thickness can be obtained by the recoating of a couple of times. In performing recoating a plurality of times, heating treatment may be carried out at every coating time, or may be performed after recoating a couple of times.

The thickness of protective layer 7 is preferably from 0.5 to 15 μm, more preferably from 1 to 10 μm, and still more preferably from 1 to 5 μm.

Protective layer 7 formed by curing the curable resin composition has excellent charge transportability and excellent mechanical strength in addition to sufficient photoelectric characteristics, so that protective layer 7 can be used as it is as the charge-transporting layer of a lamination type photoreceptor.

In the case where photosensitive layer 3 has monolayer type photosensitive layer 8 as the electrophotographic photoreceptor as shown in FIGS. 4 and 5, monolayer type photosensitive layer 8 is formed of a charge-generating material and a binder resin. As the charge-generating material, the same materials as used in charge-generating layer 5 in the function separating photosensitive layer, and as the binder resin, the same binder resins as used in charge-generating layer 5 and charge-transporting layer 6 in the function separating photosensitive layer can be used. The content of the charge-generating material in monolayer type photosensitive layer 8 is preferably from about 10 to about 85 weight % on the basis of the total solids content in monolayer type photosensitive layer 8, more preferably from about 20 to about 50 weight %. A charge-transporting material and a charge-transporting polymeric material may be added to monolayer type photosensitive layer 8 for the purpose of the improvement of photoelectric characteristics. The addition amount of these materials is preferably from about 5 to about 50 weight % on the basis of the total solids content in monolayer type photosensitive layer 8. The solvents for use in coating and the coating methods may be the same as those used in each layer described above. The layer thickness of monolayer type photosensitive layer 8 is preferably from 5 to 50 μm, more preferably from 10 to 40 μm.

In electrophotographic photoreceptors 1 shown in FIGS. 1 to 5, protective layers 7 that are the outermost surface layers, are functional layers comprising the cured product of the curable resin composition of the invention, but these functional layers need not be outermost surface layers. For example, undercoat layer 4 may be the functional layer comprising the cured product of the curable resin composition of the invention.

Figure 6:
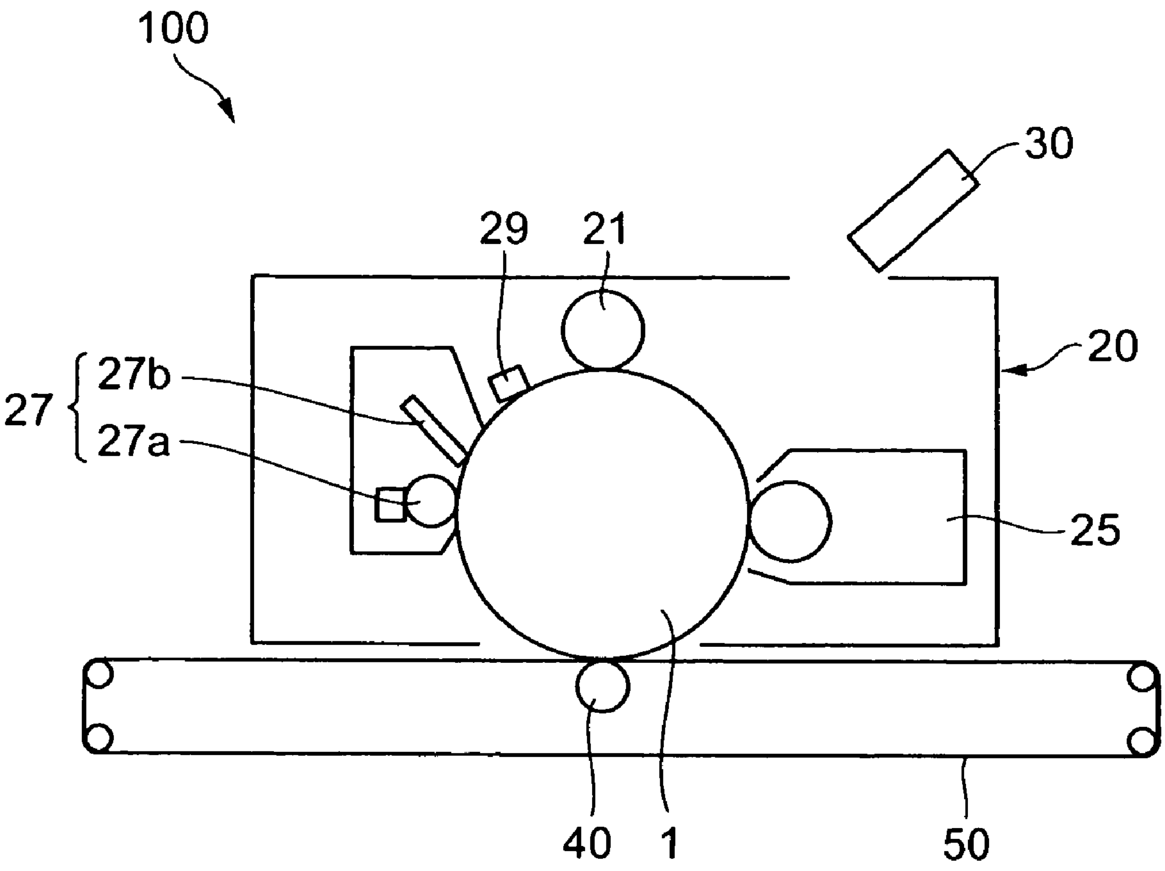
FIG. 6 is a typical diagram showing one exemplary embodiment of an image-forming apparatus in the invention.

Image-Forming Apparatus and Process Cartridge:

FIG. 6 is a typical diagram showing one exemplary embodiment of an image-forming apparatus in the invention. Image-forming apparatus 100 shown in FIG. 6 comprises the body of an image forming apparatus (not shown) provided with process cartridge 20 equipped with electrophotographic photoreceptor 1, exposure device 30, transfer device 40, and transfer intermediate 50. In image-forming apparatus 100, exposure device 30 is arranged at a position capable of exposing electrophotographic photoreceptor 1 through the opening of process cartridge 20, transfer device 40 is arranged at a position facing to electrophotographic photoreceptor 1 via transfer intermediate 50, and transfer intermediate 50 is arranged so as to be partly in contact with electrophotographic photoreceptor 1.

Process cartridge 20 is integration by incorporating electrophotographic photoreceptor 1, charging device 21, developing device 25, cleaning device 27, and fibrous member (a toothbrush shape) 29 into one body in a case by means of a fitting rail. The case is provided with an opening for exposure.

Charging device 21 is a charger for charging electrophotographic photoreceptor 1 by a contact system. Developing device 25 is a section that forms a toner image by the development of the electrostatic latent image on electrophotographic photoreceptor 1.

The toner used in developing device 25 is described below. The average shape factor ($ML^2/A$) of the toner is preferably from 100 to 150, more preferably from 100 to 140, and the volume average particle size is preferably from 2 to 12 μm, more preferably from 3 to 9 μm. By the use of the toner having the above average shape factor and volume average particle size, images having high developability, transferability and image quality can be obtained.

The average shape factor $ML^2/A$ is calculated according to the following formula (1).

$$(ML^2/A)=((\text{maximum length})^2/\text{project area})\times(\pi/4)\times 100 \quad (1)$$

As specific means for calculating the average shape factor, an image of toner is taken into an image analyzer (LUZEX (III), produced by NIRECO Corporation) from an optical microscope so as to measure an equivalent circle diameter of each of arbitrary 100 toner particles. Then, based on the maximum lengths and the areas thereof, values of the shape factor shown in the formula are obtained and are number-averaged to obtain the average shape factor.

Although toners are not particularly restricted by manufacturing methods so long as the above ranges of average shape factor and volume average particle size are satisfied, toners manufactured by the following methods are used, e.g., a kneading and pulverizing method of kneading a binder resin, a colorant and a parting agent and, if necessary, adding a charge controlling agent, pulverizing and classifying; a method of changing the shape of the particles obtained by the kneading and pulverizing method by mechanical impact force or heat energy; an emulsion polymerization coagulation method of emulsion polymerizing the polymerizable monomer of a binder resin, mixing the obtained dispersion and the dispersion of a colorant and a parting agent and, if necessary, a charge controlling agent, coagulating, and fusing by heating to thereby obtain toner particles; a suspension polymerization method of suspending a polymerizable monomer for obtaining a binder resin, a solution of a colorant and a parting agent and, if necessary, a charge controlling agent, in an aqueous solvent, and polymerizing; and a dissolution suspension method of suspending a binder resin, a colorant and a parting agent and, if necessary, a charge controlling agent, in an aqueous solvent, to thereby obtain particles are exemplified.

Further, well-known methods, e.g., a manufacturing method of a core/shell structure by further adhering coagulated particles with the above obtained toner particles as core, and fusing by heating can be used. As the manufacturing methods of toners, from the viewpoint of the control of shape and particle size distribution, the suspension polymerization method with an aqueous solvent, the emulsion polymerization coagulation method, and the dissolution suspension method are preferred, and the emulsion polymerization coagulation method is especially preferred.

Toners mother particles comprise a binder resin, a colorant and a parting agent, and, if necessary, silica and a charge controlling agent.

As the binder resins used in toner mother particles, homopolymers and copolymers, such as styrenes, e.g., styrene and chlorostyrene, monoolefins, e.g., ethylene, propylene, butylene and isoprene, vinyl esters, e.g., vinyl acetate, vinyl propionate, vinyl benzoate, and vinyl butyrate, α-methylene aliphatic monocarboxylates, e.g., methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl ethers, e.g., vinyl methyl ether, vinyl ethyl ether, and vinyl butyl ether, vinyl ketones, e.g., vinyl methyl ketone, vinyl hexyl ketone and vinyl isopropenyl ketone, and polyester resins by copolymerization of dicarboxylic acids and diols are exemplified.

As representative binder resins, polystyrene, styrene-alkyl acrylate copolymers, styrene-alkyl methacrylate copolymers, styrene-acrylonitrile copolymers, styrene-butadiene copolymers, styrene-maleic anhydride copolymers, polyethylene, polypropylene andpolyester resins are exemplified. In addition, polyurethane, epoxy resins, silicone resins, polyamide, modified rosins, and paraffin waxes are also exemplified.

As the representative colorants, magnetic powders, e.g., magnetite and ferrite, carbon black, aniline blue, calyl blue, chrome yellow, ultramarine blue, Du Pont Oil Red, quinoline yellow, methylene blue chloride, phthalocyanine blue, malachite green oxalate, lamp black, rose bengale, C.I. Pigment Red 48:1, C.I. Pigment Red 122, C.I. Pigment Red 57:1, C.I. Pigment Yellow 97, C.I. Pigment Yellow 17, C.I. Pigment Blue 15:1, and C.I. Pigment Blue 15:3 are exemplified.

As the parting agents, low molecular weight polyethylene, low molecular weight polypropylene, Fischer-Tropsch wax, montan wax, carnauba wax, rice wax, candelilla wax, etc. can be exemplified as representatives.

As the charge controlling agents, well-known compounds can be used, e.g., azo metal complex compounds, salicylic acid metal complex compounds, and resin type charge-controlling agents having a polar group can be used. In manufacturing a toner by a wet method, it is preferred to use materials hardly soluble in water in the light of the control of ionic strength and the reduction of environmental pollution by waste water. Toners may be any of magnetic toners containing a magnetic material and nonmagnetic toners not containing a magnetic material.

The toners for use in developing device 25 can be manufactured by mixing the above toner mother particles and external additives with a Henschel mixer or a V blender. When toner mother particles are manufactured according to wet methods, additives can be added externally by a wet method.

The toners for use in developing device 25 may contain lubricating particles. As the examples of the lubricating particles, solid lubricants, e.g., graphite, molybdenum disulfide, talc, fatty acid metal salts, etc., low molecular weight polyolefins, e.g., polypropylene, polyethylene, polybutene, etc., silicones having a softening point by heating, aliphatic amides, e.g., oleic acid amide, erucic acid amide, ricinoleic acid amide, stearic acid amide, etc., vegetable waxes, e.g., carnauba wax, rice wax, candelilla wax, Japan wax, jojoba oil, etc., animal waxes, e.g., bees wax, mineral and petroleum waxes, e.g., montan wax, ozokerite, ceresin, paraffin wax, microcrystalline wax, Fischer-Tropsch wax, and modified products of these compounds can be used. These compounds can be used alone or two or more compounds can be used in combination. However, the volume average particles of these compounds is preferably in the range of from 0.1 to 10 μm, and particles having the above chemical structures may be pulverized to thereby make all of uniform size. The addition amount totoners is preferably from about 0.05 to about 2.0 weight %, more preferably from about 0.1 to about 1.5 weight %.

Inorganic fine particles, organic fine particles, and composite fine particles obtained by adhering inorganic fine particles to the organic fine particles may be added to the toners for use in developing device 25 for the purpose of the exclusion of the adhering matters and degraded matters on the surface of electrophotographic photoreceptor.

As the inorganic fine particles, various inorganic oxides, nitrides and borides, e.g., silica, alumina, titannia, zirconia, barium titanate, aluminum titanate, strontium titanate, magnesium titanate, zinc oxide, chromium oxide, cerium oxide, antimony oxide, tungsten oxide, tin oxide, tellurium oxide, manganese oxide, boron oxide, silicon carbide, boron carbide, titanium carbide, silicon nitride, titanium nitride, boron nitride, etc., are preferably used.

These inorganic fine particles may be subjected to surface treatment with titanium coupling agents, e.g., tetrabutyl titanate, tetraoctyl titanate, isopropyltriiso-stearoyl titanate, isopropyltridecylbenzenesulfonyl titanate, bis(dioctylpyrophosphate)oxyacetate titanate, etc., and silane coupling agents, e.g., γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, decyltrimethoxysilane, dodecyltrimethoxysilane, phenyltrimethoxysilane, o-methylphenyltrimethoxysilane, p-methylphenyltrimethoxysilane, etc. Further, inorganic fine particles hydrophobitized with silicone oil, and higher aliphatic acid metal salts, e.g., aluminum stearate, zinc stearate, calcium stearate, etc., are also preferably used.

As the organic fine particles, styrene resin particles, styrene acrylic resin particles, polyester resin particles, and urethane resin particles can be exemplified.

The particle size of these fine particles as the volume average particle size is preferably from 5 to 1,000 nm, more preferably from 5 to 800 nm, and still more preferably from 5 to 700 nm. When the volume average particle size is less than the greatest lower bound, the particles are liable to be lacking in abrasion properties. On the other hand, when it exceeds the least upper bound, scratches are liable to occur on the surface of electrophotographic photoreceptor. It is also preferred that the sum of the addition amounts of the above described particles and lubricating particles be about 0.6 weight % or more.

As other inorganic oxides added to toners, it is preferred to use small particle size inorganic oxide having a primary particle size of 40 nm or smaller for the purpose of the control of the flowability of fine particles and electrification, and further use inorganic oxide having a larger particle size than the former inorganic oxide for the purpose of the reduction of adhesion and the control of electrification. Well-known inorganic oxide fine particles, but for the purpose of precise charge control, it is preferred to use silica and titanium oxide in combination. Further, dispersibility increases and the raising effect of flowability of fine particles becomes high by the surface treatment of fine particles. It is also preferred to add to toners carbonates, e.g., calcium carbonate and magnesium carbonate and inorganic minerals, e.g., hydrotalcite, for removing the products by discharge.

A color toner for electrophotography is used as mixture with a carrier. As the carrier, iron powder, glass beads, ferrite powder, nickel powder, and these powders coated with resins are used. The blending ratio with carriers can be arbitrarily set.

Cleaning device 27 is equipped with fibrous member (a roll shape) 27*a* and cleaning blade (a blade member) 27*b*.

Cleaning device 27 is equipped with fibrous member 27*a* and cleaning blade 27*b*, but those equipped with either one may be used as cleaning device. Fibrous member 27*a* may take a roll shape or a toothbrush shape. Fibrous member 27*a* may be fixed on the body of the cleaning device or may be supported as rotary member, or may be supported in a manner capable of oscillating in the axis direction of the photoreceptor. As fibrous member 27*a*, polyester, nylon, acrylic, fabric-like things comprising extra fine fibers, e.g., Toraysee (manufactured by Toray Industries Inc.), and brush-like things planted with resin fibers such as nylon, acrylic, polyolefin or polyester in the state of a substrate or a carpet are exemplified. As fibrous member 27*a*, the above things may be provided with electric conductivity by compounding electrically conductive powders and ionic conductive agents, or those comprising fibers having an electrically conductive layer formed inside or outside every fiber can also be used. When fibers have electric conductivity, the electrical resistance is preferably from $10^2$ to $10^9\Omega$ as a fiber unit. The thickness of the fiber of fibrous member 27*a* is preferably from 30 d (denier) or less, more preferably 20 d or less, and the density of fibers is preferably 20,000/inch$^2$ or more, more preferably 30,000/inch$^2$ or more.

Cleaning device 27 is required to remove adhering matters on the surface of photoreceptors (e.g., the products by discharge) by means of the cleaning blade and cleaning brush. It is preferred to supply a lubricating material (a lubricating component) such as metallic soap, higher alcohol, wax, or silicone oil to the cleaning members for achieving this object for a long term and stabilizing the functions of the cleaning members.

For example, when a roll-like member is used as fibrous member 27*a*, it is preferred to supply lubricating components to the surface of electrophotographic photoreceptor by bringing into contact with lubricating components, such as metallic soap and wax. As cleaning blade 27*b*, ordinary used rubber blades are used. When a rubber blade is used as cleaning blade 27*b*, supplying lubricating components to the surface of electrophotographic photoreceptor is especially effective to restrain the chipping and abrasion of the blade.

Process cartridge 20 described is freely attachable to and detachable from the body of the image-forming apparatus, and constitutes the image-forming apparatus together with the body of the image-forming apparatus.

It is sufficient that exposure device 30 can expose charged electrophotographic photoreceptor 1 to thereby form an electrostatic latent image. As the light source of exposure device 30, it is preferred to use a surface emission laser of a multibeam system.

It is sufficient that transfer device 40 can transfer atoner image on electrophotographic photoreceptor 1 to an object to be transferred (transfer intermediate 50), and an ordinary roll-like transfer device is used.

As transfer intermediate 50, a belt-like body provided with semi-electric conductivity, e.g., polyimide, polyamideimide, polycarbonate, polyallylate, or rubber (an intermediate transfer belt) is used. As the shape of transfer intermediate 50, a drum-like shape can also be used besides a belt-like body. There are also direct transfer system image forming apparatus not equipped with a transfer intermediate, and the electrophotographic photoreceptor of the invention is suitable for such image forming apparatus. The reason is that since paper powder and talc generating from printing paper easily adhere to an electrophotographic photoreceptor, and image defects attributable to the adhered substances are liable to occur, but the electrophotographic photoreceptor of the invention is excellent in cleaning properties, so that the removal of paper powder and talc is easy and stable images can be obtained even with a direct transfer system image-forming apparatus.

Media to be transferred in the invention are not especially restricted so long as they are media capable of being transferred a toner image formed on electrophotographic photoreceptor 1. For example, when an image is directly transferred from electrophotographic photoreceptor 1 to, e.g., paper, the paper is a medium to be transferred, and when transfer intermediate 50 is used, the transfer intermediate is a medium to be transferred.

Figure 7:
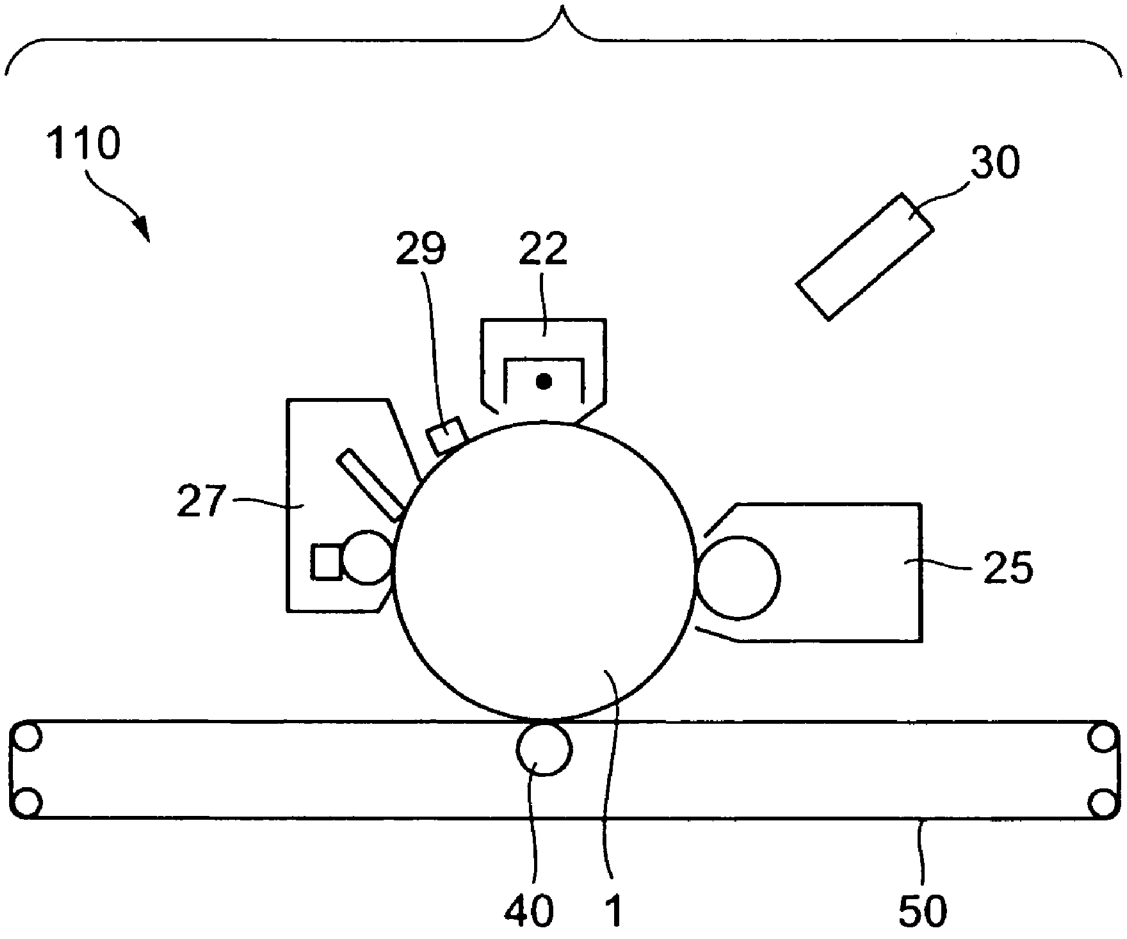
FIG. 7 is a typical diagram showing another exemplary embodiment of an image-forming apparatus in the invention.

FIG. 7 is a typical diagram showing another exemplary embodiment of an image-forming apparatus according to the invention. In image-forming apparatus 110 shown in FIG. 7, electrophotographic photoreceptor 1 is fixed to the body of the image-forming apparatus, and charging device 22, developing device 25 and cleaning device 27 are respectively put in respective cartridges independently as an charging cartridge, a developing cartridge and a cleaning cartridge. Charging device 22 is equipped with an charging device to electrify by a corona discharge system.

In image-forming apparatus 110, electrophotographic photoreceptor 1 and other devices are separated, and charging device 22, developing device 25 and cleaning device 27 are not fixed to the body of the image-forming apparatus with machine screws, caulking, adhesion and welding, and they are attachable and detachable by the operation of pulling or pushing.

Since the electrophotographic photoreceptor in the invention is excellent in the resistance to abrasion, there are cases where each device is not necessary to be put in a cartridge. Accordingly, by making the constitution of not fixing charging device 22, developing device 25 and cleaning device 27 to the body of the image-forming apparatus with machine screws, caulking, adhesion and welding, and being attachable and detachable by the operation of pulling or pushing, the costs of the members per printing of one time can be reduced. Further, two or more of these devices can be encased in respective cartridges attachable and detachable, by which the costs of the members per printing of one time can further be reduced.

Image-forming apparatus 110 has the same constitution as image-forming apparatus 100 except that charging device 22, developing device 25 and cleaning device 27 are put in respective cartridges.

Figure 8:
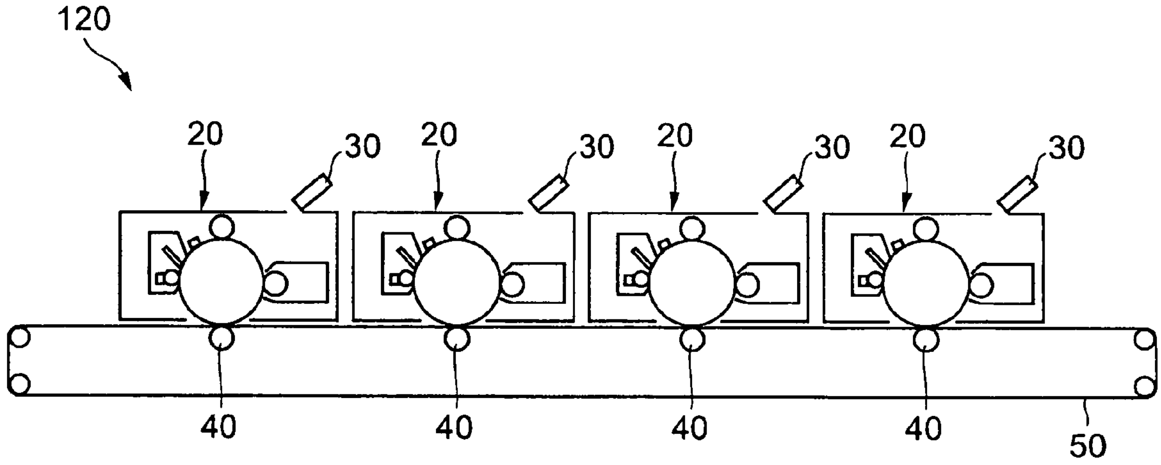
FIG. 8 is a typical diagram showing another exemplary embodiment of an image-forming apparatus in the invention.

FIG. 8 is a typical diagram showing another exemplary embodiment of an image-forming apparatus in the invention. Image-forming apparatus 120 is a tandem system full color image-forming apparatus equipped with four process cartridges 20. In image-forming apparatus 120, four process cartridges 20 are arranged in a row on transfer intermediate 50, wherein one electrophotographic photoreceptor can be used per one color. Image-forming apparatus 120 has the same constitution as image-forming apparatus 100 except that image-forming apparatus 120 is a tandem system.

In tandem system image-forming apparatus 120, the abrasion loss of each electrophotographic photoreceptor varies according to the use ratio of each color, so that electric characteristics of each electrophotographic photoreceptor are liable to differ. According to such a tendency, the developability of toners gradually varies from the initial state, the hue of printed image changes and stable images are liable to be difficult to obtain. In particular, for the miniaturization of image-forming apparatus, there is a tendency to use an electrophotographic photoreceptor of a small size, and this tendency is conspicuous in the case where an electrophotographic photoreceptor of 30 mmϕ or smaller is used. When the constitution of the electrophotographic photoreceptor according to the invention is adopted in an electrophotographic photoreceptor, abrasion of the surface of an electrophotographic photoreceptor can be sufficiently restrained even when the diameter of the electrophotographic photoreceptor is 30 mmϕ or smaller. Accordingly, the electrophotographic photoreceptor in the invention is especially effective for a tandem system image-forming apparatus.

Figure 9:
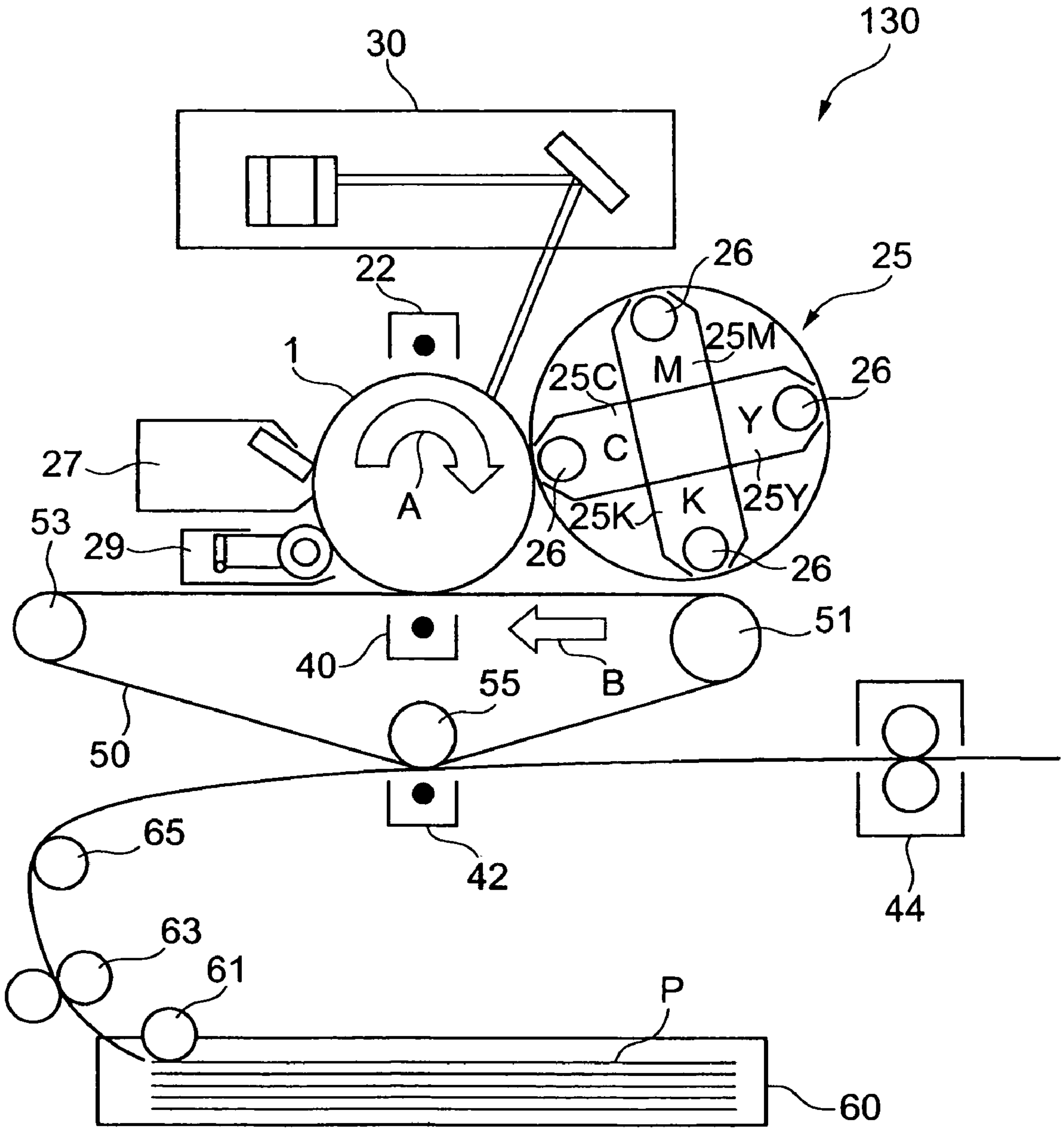
FIG. 9 is a typical diagram showing another exemplary embodiment of an image-forming apparatus in the invention.

FIG. 9 is a typical diagram showing another exemplary embodiment of an image-forming apparatus in the invention. Image-forming apparatus 130 shown in FIG. 9 is a so-called four cycle system image-forming apparatus of forming a toner image with a plurality of colors with one electrophotographic photoreceptor. Image-forming apparatus 130 is equipped with photoreceptor drum 1 that is rotated with a driving unit (not shown) at a prescribed rotary speed in the direction of arrow A in the figure, and charging device 22 for charging the peripheral surface of photoreceptor drum 1 is provided above photoreceptor drum 1.

Exposure device 30 equipped with a surface emission laser array as the exposure light source is arranged above charging device 22. Exposure device 30 modulates a plurality of laser beams emitted from the light source according to the image to be formed, polarizes the laser beams in the scanning direction, and scans on the peripheral surface of photoreceptor drum 1 in parallel with the axis of photoreceptor drum 1, by which an electrostatic latent image is formed on the charged peripheral surface of photoreceptor drum 1.

Developing device 25 is arranged on the side of photoreceptor drum 1. Developing device 25 is equipped with a roller-like accommodation body arranged capable of freely rotating. Four accommodation parts are formed in the accommodation body, and developing unit 25Y, 25M, 25C or 25K is provided in each accommodation part. Each developing unit 25Y, 25M, 25C or 25K is equipped with developing roller 26, and the toner of a color of Y, M, C or K is reserved in each developing unit.

Full color image is formed in image-forming apparatus 130 during the time while photoreceptor drum 1 turns round four times. That is, during the time while photoreceptor drum 1 makes four revolutions, charging device 22 performs electrification of the peripheral surface of photoreceptor drum 1, and exposure device 30 repeats scanning of laser beams modulated according to any of image data of Y, M, C, K representing a color image to be formed on the peripheral surface of photoreceptor drum 1 with changing image data for use in the modulation of laser beans every one revolution of photoreceptor drum 1. Developing device 25 works the developing unit corresponding to the peripheral surface of photoreceptor drum 1, in the state that any developing roller 26 of developing units 25Y, 25M, 25C and 25K is corresponding to the peripheral surface of photoreceptor drum 1, and develops the electrostatic latent image formed on the peripheral surface of photoreceptor drum 1 in a specific color to thereby form a toner image of a specific color on the peripheral surface of photoreceptor drum 1, and this procedure is repeated every one revolution of photoreceptor drum 1 with revolving the accommodation body so that the developing unit for use in the development of the electrostatic latent image is changed. By this operation, every one revolution of photoreceptor drum 1, toner images of Y, M, C and K are getting to be formed on the peripheral surface of photoreceptor drum 1 successively so as to be overlapped with each other, and at the point of four revolutions of photoreceptor drum 1, a full color toner image is to be formed on the peripheral surface of photoreceptor drum 1.

Endless intermediate transfer belt 50 is arranged almost below photoreceptor drum 1. Intermediate transfer belt 50 is strained around rollers 51, 53 and 55, and arranged so that the peripheral surface comes into contact with the peripheral surface of photoreceptor drum 1. Rollers 51, 53 and 55 are revolved by the transmission of driving force of a motor (not shown), whereby intermediate transfer belt 50 is turned round in the direction of arrow B in FIG. 9.

Transfer device 40 is arranged opposite to photoreceptor drum 1 with intermediate transfer belt 50 between, and a toner image formed on the peripheral surface of photoreceptor drum 1 is transferred to the image-forming surface of intermediate transfer belt 50 by transfer device 40.

On the opposite side of developing device 25 with photoreceptor drum 1 between, lubricant supplying device 29 and cleaning device 27 are arranged at the peripheral surface of photoreceptor drum 1. When the toner image formed on the peripheral surface of photoreceptor drum 1 is transferred to intermediate transfer belt 50, a lubricant is supplied to the peripheral surface of photoreceptor drum 1 by cleaning device 27, and the area of the peripheral surface of photoreceptor drum 1 carried the transferred toner image is cleaned by cleaning device 27.

Tray 60 is arranged on the lower side of intermediate transfer belt 50, and a plurality of paper P as the recording materials are piled and hold in tray 60. Take out roller 61 is arranged to the upper left of tray 60, and a pair of rollers 63 and roller 65 are arranged in this order on the downstream of the taking out direction of paper P by take out roller 61. Recording paper positioned uppermost of the pile is taken out from tray 60 by the rotation of take out roller 61 and transported by pair rollers 63 and roller 65.

Transfer device 42 is arranged on the opposite side of roller 55 with intermediate transfer belt 50 between. Paper P transported by pair rollers 63 and roller 65 is fed between intermediate transfer belt 50 and transfer device 42, and the toner image formed on the image-forming surface of intermediate transfer belt 50 is transferred to the paper P by transfer device 42. Fixing device 44 equipped with fixing roller pair is arranged on the downstream of transfer device 42 in the direction of transporting of paper P, paper P on which the toner image is transferred is discharged out of image-forming apparatus 130 after fixing the transferred toner image by heating with fixing device 44 and put on a paper discharge tray (not shown).

Figure 10:
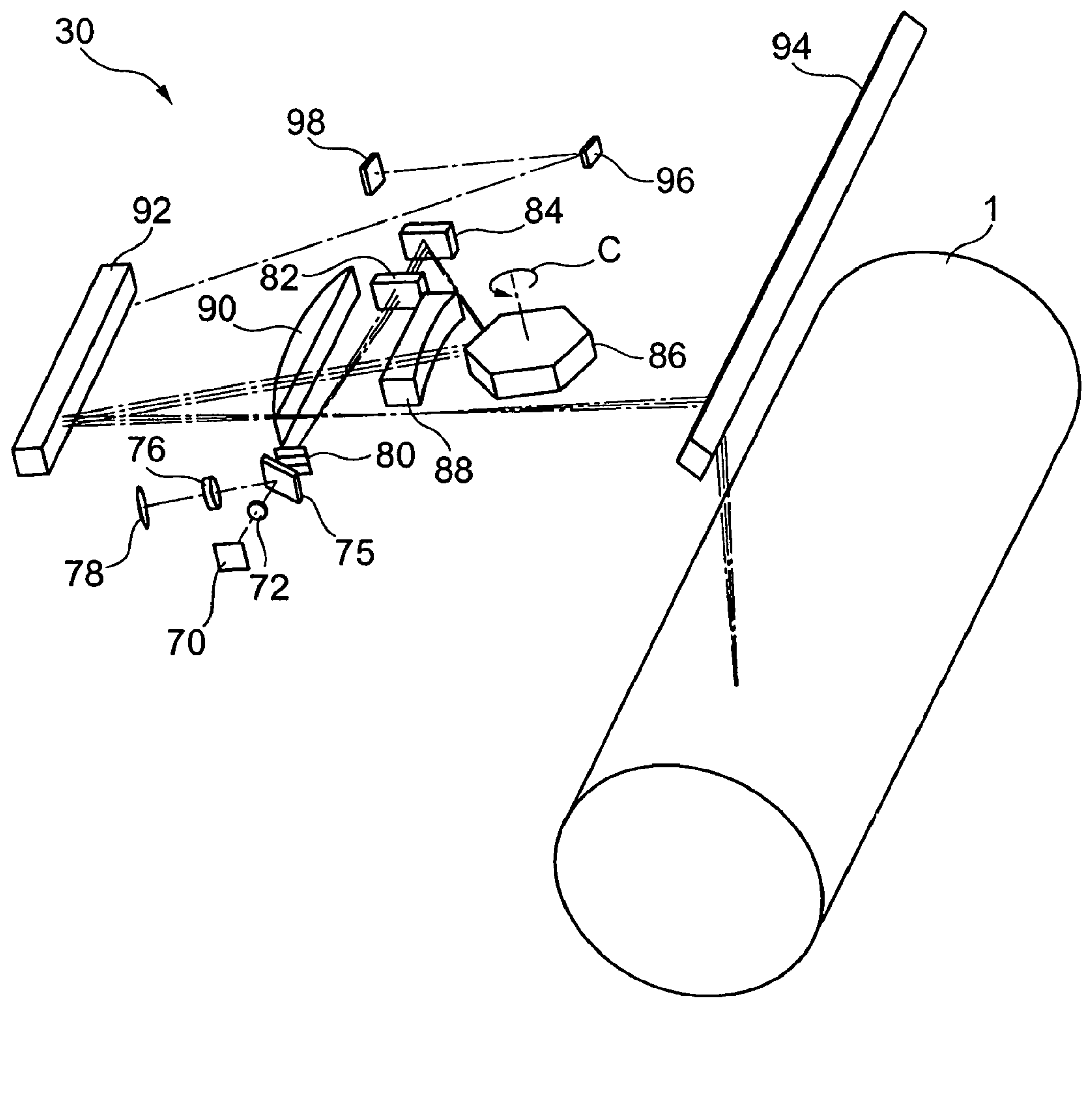
FIG. 10 is a schematic diagram showing an example of an exposure apparatus (a light scanning apparatus) equipped with a surface emission laser array as the exposure light source.

In the next place, an exemplary embodiment of exposure device 30 equipped with a surface emission laser array as the exposure light source is described with referring to FIG. 10. Exposure device 30 is equipped with surface emission laser array 70 emitting laser beams of m (m is 3 or more). In FIG. 10, only 3 laser beams are shown for the sake of simplification, but surface emission laser array 70 comprising arrayed surface emission lasers can comprise to emit several ten laser beams. With respect to the array of surface emission laser beams (the array of laser beams emitted from surface emission laser array 70), two-dimensional array (e.g., in matrix-like) can be possible besides the array of a single row.

Collimator lens 72 and half mirror 74 are-arranged in order on the laser beam emission side of surface emission laser array 70. Laser beams emitted from surface emission laser array 70 are subjected to incidence to half mirror 74 after being made almost parallel light flux by collimator lens 72, and a part of the incident laser beams are separated and reflected by half mirror 74. Lens 76 and light quantity sensor 78 are arranged in order on the laser beam reflection side of half mirror 74, a part of laser beams separated from the main laser beam (laser beam for use in exposure) by half mirror 74 and reflected is transmitted through lens 76 and subjected to incidence to light quantity sensor 78, and the light quantity is detected by light quantity sensor 78.

Since laser beams are not emitted from the opposite side to the laser emitting side of surface emission laser (laser beams are emitted from both ends in the case of end face emission laser), it becomes necessary to separate a part of the laser beams for use in exposure and detect light quantity as above for detecting and controlling light quantity.

Aperture 80, cylinder lens 82 having power only in the by-scanning direction, and turnup mirror 84 are arranged in order on the laser beam emission side of half mirror 74. Main laser beams emitted from half mirror 74 are faired by aperture 80, and then refracted by cylinder lens 82 so as to form images in a long line in the main scanning direction in the vicinity of the reflection surface of rotary polygonal mirror 86, and reflected by turnup mirror 84 to the side of rotary polygonal mirror 86. It is preferred to arrange aperture 80 nearby the focal point of collimator lens 72 for equally fairing a plurality of laser beams.

Rotary polygonal mirror 86 is rotated in the direction of arrow C in FIG. 10 by the transmission of driving force of a motor (not shown), and polarizes and reflects the laser beam subjected to reflection and incidence by turnup mirror 84 along the main scanning direction. On the laser bean emission side of rotary polygonal mirror 86 are arranged Fθ lenses 88, 90 having power only in the main scanning direction, and laser beam polarized and reflected by rotary polygonal mirror 86 moves on the peripheral surface of electrophotographic photoreceptor 1 at almost equal speed and is refracted by Fθ lenses 88, 90 so that the image-forming position in the main scanning direction coincides with the peripheral surface of electrophotographic photoreceptor 1.

On the laser bean emission side of Fθ lenses 88, 90 are arranged in the order of cylinder mirrors 92, 94 having power only in the by-scanning direction, laser beam transmitted Fθ lenses 88, 90 is reflected by cylinder mirrors 92, 94 so that the image-forming position in the by-scanning direction coincides with the peripheral surface of electrophotographic photoreceptor 1 and irradiated on the peripheral surface of electrophotographic photoreceptor 1. Cylinder mirrors 92, 94 also have compensatory function of surface collapse to make conjugation of rotary polygonal mirror 86 and the peripheral surface of electrophotographic photoreceptor 1 in the by-scanning direction.

On the laser beam emission side of cylinder mirror 92 is arranged pickup mirror 96 at the position corresponding to the end of scanning start side (SOS: Start Of Scan) of the scanning range of laser beams, and beam position-detecting sensor 98 is arranged on the laser beam emission side of pickup mirror 96. Laser beams emitted from surface emission laser array 70 are reflected by pickup mirror 96 and subjected to incidence to beam position-detecting sensor 98 when the face reflecting laser beam of reflecting faces of rotary polygonal mirror 86 changes and faces the direction to emit incident beam in the direction corresponding to SOS (also refer to imaginary lines in FIG. 10).

In modulating laser beams scanning the peripheral surface of electrophotographic photoreceptor 1 with the rotation of rotary polygonal mirror 86 to thereby form an electrostatic latent image, signals outputted from beam position-detecting sensor 98 are used to take synchronization of modulation start timing in the main scanning in each time.

In exposure device 30, collimator lens 72, cylinder lens 82, and two cylinder mirrors 92, 94 are each arranged so as to be a focal in the by-scanning direction. The reason for this is to restrain the difference among scanning line bows of a plurality of laser beams and the variation in distance between scanning lines by a plurality of laser beams.

EXAMPLE

The invention will be described more specifically with reference to Examples and Comparative Examples, but the invention is not limited thereto.

Example 1

A cylindrical aluminum substrate is ground with a centerless grinder to reach surface roughness (ten-point average roughness: Rz) of 0.6 μm. The aluminum substrate subjected to centerless grinding is cleaned with degreasing treatment, etching treatment with a 2 weight % sodium hydroxide solution for 1 minute, neutralization treatment, and washing with pure water in this order. In the next place, an anodic oxide film is formed (electric current density: 1.0 $A/dm^2$) on the surface of the aluminum substrate with a 10 weight % sulfuric acid solution. After washing with water, sealing treatment is performed by immersing the aluminum substrate in a 1 weight % nickel acetate solution at 80° C. for 25 minutes. Further, washing with pure water and drying treatment are carried out. Thus, the aluminum substrate having formed on the surface the anodic oxide film having a thickness of about 7.5 μm is obtained.

In the next place, 1 weight part of chlorogallium phthalocyanine having strong diffraction peaks at 7.4°, 16.6°, 25.5° and 28.3° of Bragg angle (2θ±0.2°) in X-ray diffraction spectrum thereof with a CuKα characteristic X ray, 1 weight part of polyvinyl butyral (S-LEC BM-S, manufactured by Sekisui Chemical Co., Ltd.), and 100 weight parts of n-butyl acetate are blended, dispersed by treatment with glass beads in a paint shaker for 1 hour to obtain a charge-generating layer-forming coating solution. The coating solution is coated on the aluminum substrate by dip coating and the coated layer is dried by heating at 100° C. for 10 minutes, whereby a charge-generating layer having a layer thickness of about 0.15 μm is obtained.

Subsequently, 2 weight parts of a benzidine compound represented by formula (XIV) shown below, and 2.5 weight parts of a polymer compound (a viscosity average molecular weight: 39,000) having a structural unit represented by formula (XV) shown below are dissolved in 25 weight parts of chlorobenzene, whereby a charge-transporting layer-forming coating solution is obtained.

(XIV)

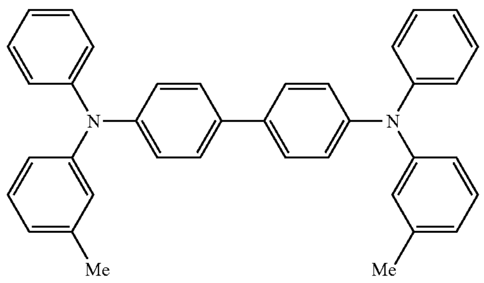

(XV)

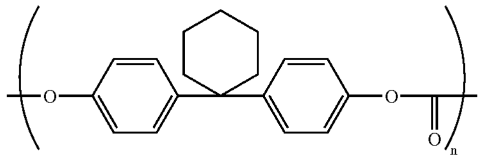

The obtained coating solution is coated on the charge-generating layer by dip coating and the coated layer is dried by heating at 130° C. for 40 minutes, whereby a charge transporting layer having a layer thickness of 20 μm is formed.

Four point five (4.5) weight parts of the exemplified compound (I-25), and 5.5 weight parts of a resol type phenolic resin (PL-4852, manufactured by Gun Ei Chemical Industry Co., Ltd.) are dissolved in 20 weight parts of butanol, and then 0.045 weight parts of paratoluenesulfonic acid is added to the above solution, whereby a protective layer-forming coating solution is obtained. The obtained coating solution is coated on the charge-transporting layer by dip coating and the coated layer is dried by heating at 150° C. for 40 minutes, whereby a protective layer (an uppermost surface layer) having a layer thickness of 2.5 μm is obtained. Thus, the manufacture of an electrophotographic photoreceptor is completed.

Example 2

In the first place, a cylindrical aluminum substrate subjected to honing treatment is prepared. Subsequently, 100 weight parts of a zirconium compound (Orgatix ZC540, manufactured by Matsumoto Chemical Industry Co., Ltd.), 10 weight parts of a silane compound (A1100, manufactured by Nippon Unicar Co., Ltd.), 3 weight parts of polyvinyl butyral (S-LEC BM-S, manufactured by Sekisui Chemical Co., Ltd.), 380 weight parts of isopropanol, and 200 weight parts of butanol are blended to prepare an undercoat layer-forming coating solution. The coating solution is coated on the aluminum substrate by dip coating, and the coated layer is dried by heating at 150° C. for 10 minutes, whereby an undercoat layer having a layer thickness of about 0.17 μm is obtained.

In the next place, 1 weight part of hydroxy gallium phthalocyanine having strong diffraction peaks at 7.5°, 9.9°, 12.5°, 16.3°, 18.6°, 25.1° and 28.3° of Bragg angle (2θ±0.2°) in X-ray diffraction spectrum thereof with a CuKα characteristic X ray, 1 weight part of polyvinyl butyral (S-LEC BM-S, manufactured by Sekisui Chemical Co., Ltd.), and 100 weight parts of n-butyl acetate are blended, dispersed by treatment with glass beads in a paint shaker for 2 hours to obtain a charge-generating layer-forming coating solution. The coating solution is coated on the undercoat layer by dip coating and the coated layer is dried by heating at 100° C. for 10 minutes, whereby a charge generating layer having a layer thickness of about 0.15 μm is formed.

Subsequently, 2 weight parts of a compound represented by formula (XVI) shown below, and 3 weight parts of a polymer compound (a viscosity average molecular weight: 50,000) having a structural unit represented by formula (XVII) shown below are dissolved in 20 weight parts of chlorobenzene, whereby a charge-transporting layer-forming coating solution is obtained.

In the next place, 1 weight part of titanyl phthalocyanine having a strong diffraction peak at 27.2° of Bragg angle (2θ±0.2°) in X-ray diffraction spectrum thereof with a CuKα characteristic X ray, 1 weight part of polyvinyl butyral (S-LEC BM-S, manufactured by Sekisui Chemical Co., Ltd.), and 100 weight parts of n-butyl acetate are blended, dispersed by treatment with glass beads in a paint shaker for 1 hour to obtain a charge-generating layer-forming coating solution. The coating solution is coated on the undercoat layer by dip coating and the coated layer is dried by heating at 100° C. for 10 minutes, whereby a charge-generating layer having a layer thickness of about 0.15 μm is obtained.

(XVI)

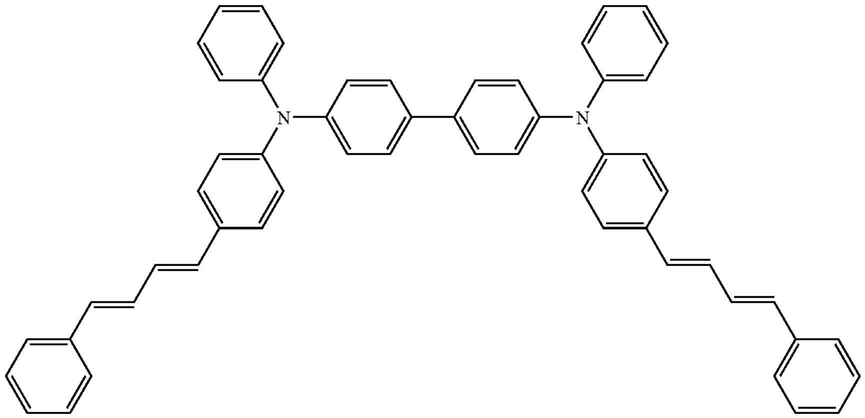

(XVII)

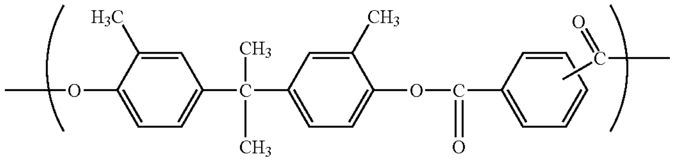

The obtained coating solution is coated on the charge-generating layer by dip coating and the coated layer is dried by heating at 120° C. for 45 minutes to form a charge transporting layer having a layer thickness of 20 μm.

In the next place, 4.5 weight parts of the exemplified compound (II-16), and 5.5 weight parts of a resol type phenolic resin (PR-53123, manufactured by Sumitomo Kasei Co., Ltd.) are dissolved in 20 weight parts of butanol, and then 0.04 weight parts of dodecylbenzenesulfonic acid is added to the above solution, whereby a protective layer-forming coating solution is obtained. The obtained coating solution is coated on the charge-transporting layer by dip coating and the coated layer is dried by heating at 150° C. for 40 minutes, whereby a protective layer (an uppermost surface layer) having a layer thickness of 3 μm is obtained. Thus, the manufacture of an electrophotographic photoreceptor is completed.

Example 3

An undercoat layer having a thickness of about 0.17 μm is formed on an aluminum substrate according to the same procedure as in Example 2.

Subsequently, 2 weight parts of a benzidine compound represented by formula (XIV) shown above, and 2.5 weight parts of a polymer compound (a viscosity average molecular weight: 79,000) having a structural unit represented by formula (XV) shown above are dissolved in 25 weight parts of chlorobenzene, whereby a charge-transporting layer-forming coating solution is obtained. The obtained coating solution is coated on the charge-generating layer by dip coating and the coated layer is dried by heating at 130° C. for 40 minutes to form a charge transporting layer having a layer thickness of 20 μm.

In the next place, 3 weight parts of the exemplified compound (III-6), and 3 weight parts of a resol type phenolic resin (Phenolite 5010, manufactured by Dainippon Ink and Chemicals Inc.) are dissolved in 20 weight parts of butanol, and then 0.1 weight parts of polyether-modified silicone oil (KF 615 (A), manufactured by Shin-Etsu Chemical Co., Ltd.), and 0.02 weight parts of phenolsulfonic acid are added to the above solution, whereby a protective layer-forming coating solution is prepared. The obtained coating solution is coated on the charge-transporting layer by ring-type meniscus coating and the coated layer is air-dried at room temperature for 3 minutes, and then cured by heat treatment at 130° C. for 1 hour, whereby a protective layer (an uppermost surface layer)

having a layer thickness of 3 μm is formed. Thus, the manufacture of an electrophotographic photoreceptor is completed.

Example 4

One hundred (100) weight parts of zinc oxide (SMZ-017N, manufactured by TAYCA CORPORATION) is blended with 500 weight parts of toluene by stirring, and 2 weight parts of a silane coupling agent (A1100, manufactured by Nippon Unicar Co., Ltd.) is added thereto, and the mixture is stirred for 5 hours. The toluene is then distilled under reduced pressure, and the reaction system is subjected to baking at 120° C. for 2 hours. As a result of fluorescent X-ray analysis of the obtained surface-treated zinc oxide, the ratio of Si element strength to zinc element strength is $1.8\times10^{-4}$.

Thirty-five (35) weight parts of the above surface-treated zinc oxide, 15 weight parts of blocked isocyanate (Sumidule 3175, manufactured by Sumitomo Bayer Urethane Co.) as a curing agent, 6 weight parts of butyral resin (BM-1, manufactured by Sekisui Chemical Co., Ltd.), and 44 weight parts of methyl ethyl ketone are blended, and the blend is dispersed with 1 mmφ (diameter) glass beads in a sand mill for 2 hours to obtain a dispersion. To the obtained dispersion, 0.005 weight parts of dioctyltin dilaurate and 17 weight parts of Tospear 130 (manufactured by GE Toshiba Silicones) are added to prepare an undercoat layer-forming coating solution. The coating solution is coated on an aluminum substrate and cured by drying at 160° C. for 100 minutes, whereby an undercoat layer having a thickness of 20 μm is formed.

In the next place, 1 weight part of hydroxy gallium phthalocyanine having strong diffraction peaks at 7.5°, 9.9°, 12.5°, 16.3°, 18.6°, 25.1° and 28.3° of Bragg angle (2θ±0.2°) in X-ray diffraction spectrum thereof with a CuKα characteristic X ray, 1 weight part of polyvinyl butyral (S-LEC BM-S, manufactured by Sekisui Chemical Co., Ltd.), and 100 weight parts of n-butyl acetate are blended, dispersed by treatment with glass beads in a paint shaker for 1 hour to obtain a charge-generating layer-forming coating solution. The coating solution is coated on the undercoat layer by dip coating and the coated layer is dried by heating at 100° C. for 10 minutes, whereby a charge generating layer having a layer thickness of about 0.15 μm is formed.

Subsequently, 2 weight parts of a benzidine compound represented by formula (XIV) shown above, and 2.5 weight parts of a polymer compound (a viscosity average molecular weight: 79,000) having a structural unit represented by formula (XV) shown above are dissolved in 25 weight parts of chlorobenzene, whereby a charge-transporting layer-forming coating solution is obtained. The obtained coating solution is coated on the charge-generating layer by dip coating and the coated layer is dried by heating at 110° C. for 40 minutes to form a charge transporting layer having a layer thickness of 20 μm.

Subsequently, 3 weight parts of the exemplified compound (IV-6), and 3 weight parts of a resol type phenolic resin (PL-2211, manufactured by Gun Ei Chemical Industry Co., Ltd.) are dissolved in 20 weight parts of butanol, and then 0.02 weight parts of paratoluenesulfonic acid is added to the above solution, whereby a protective layer-forming coating solution is obtained. The obtained coating solution is coated on the charge-transporting layer by ring-type meniscus coating and the coated layer is cured by heat treatment at 130° C. for 1 hour, whereby a protective layer (an uppermost surface layer) having a layer thickness of 3 μm is formed. Thus, the manufacture of an electrophotographic photoreceptor is completed.

Example 5

An undercoat layer having a thickness of 20 μm is formed on an aluminum substrate according to the same procedure as in Example 4. Subsequently, a charge-generating layer having a layer thickness of about 0.15 μm is formed on the undercoat layer, further a charge-transporting layer having a layer thickness of about 20 μm is formed on the charge-generating layer.

In the next place, 3 weight parts of the exemplified compound (IV-11), and 3 weight parts of aresol typephenolic resin (PL-4852, manufactured by Gun Ei Chemical Industry Co., Ltd.) are dissolved in 20 weight parts of butanol, and then 0.02 weight parts of dodecylbenzenesulfonic acid is added to the above solution, whereby a protective layer-forming coating solution is obtained. The obtained coating solution is coated on the charge-transporting layer by ring-type meniscus coating and the coated layer is cured by heat treatment at 130° C. for 1 hour, whereby a protective layer (an uppermost surface layer) having a layer thickness of 3 μm is formed. Thus, the manufacture of an electrophotographic photoreceptor is completed.

Example 6

An undercoat layer having a thickness of 20 μm is formed on an aluminum substrate according to the same procedure as in Example 4. Subsequently, a charge-generating layer having a thickness of about 0.15 μm is formed on the undercoat layer, further a charge-transporting layer having a thickness of about 20 μm is formed on the charge-generating layer.

In the next place, 2 weight parts of the exemplified compound (XVIII-10), and 2.2 weight parts of a resol type phenolic resin (PL-4852, manufactured by Gun Ei Chemical Industry Co., Ltd.) are dissolved in 10 weight parts of n-butyl alcohol, 0.4 weight parts of 3,5-di-t-butyl-4-hydroxytoluene (BHT) and 0.3 weight parts of paratoluenesulfonic acid are added to the above solution and stirred at room temperature for 30 minutes, and then the solution is filtered through a filter having a pore diameter of 0.5 μm, whereby a protective layer-forming coating solution is obtained. The obtained coating solution is coated on the charge-transporting layer by ring-type dip coating, the coated layer is air-dried at room temperature for 30 minutes, and then cured by heat treatment at 140° C. for 1 hour, whereby a protective layer (an uppermost surface layer) having a thickness of 3 μm is formed. Thus, the manufacture of an electrophotographic photoreceptor is completed.

Compound (XVIII-10) is synthesizedas follows. That is, 100 g of 4,4'-bishydroxymethyltriphenylamine is dissolved in 600 ml of tetrahydrofuran, 120 g of potassium t-butoxide is added thereto, and the solution is stirred for 1 hour. A solution obtained by dissolving 160 g of methyl iodide in 80 ml of tetrahydrofuran is slowly dropped to the above solution over two hours. After termination of dropping, the solution is thoroughly stirred for 2 hours, poured to a separating funnel, added with 500 ml of toluene, and washed with 500 ml of distilled water four times. A layer of toluene is dried and the solvent is distilled off, and the reaction product is purified by silica gel column chromatography, whereby 102 g of compound (XVIII-10) is obtained.

Example 7

An undercoat layer having a thickness of 20 μm is formed on an aluminum substrate according to the same procedure as in Example 4. Subsequently, a charge-generating layer having a thickness of about 0.15 μm is formed on the undercoat layer, further a charge-transporting layer having a thickness of about 20 μm is formed on the charge-generating layer.

In the next place, 2 weight parts of the exemplified compound (XVIII-50), and 2.3 weight parts of a resol type phenolic resin (PL-4852, manufactured by Gun Ei Chemical Industry Co., Ltd.) are dissolved in 10 weight parts of n-butyl alcohol, and 0.4 weight parts of 3,5-di-t-butyl-4-hydroxytoluene (BHT) is added thereto and stirred at room temperature for 30 minutes. To the obtained solution is added 0.5 weight parts of tin oxide fine particles (S-1, manufactured by JEMCO) surface treated (treatment amount: 5 weight %) with a fluorine coupling agent (KBM7103, manufactured by Shin-Etsu Chemical Co., Ltd.), and the solution is dispersed with glass beads by means of a paint shaker for 1 hour. After removing the glass beads, 0.3 weight parts of dodecylbenzenesulfonic acid is further added to the reaction solution, whereby a protective layer-forming coating solution is obtained. The obtained coating solution is coated on the charge-transporting layer by ring-type dip coating, the coated layer is air-dried at room temperature for 30 minutes, and then cured by heat treatment at 150° C. for 1 hour, whereby a protective layer (an uppermost surface layer) having a thickness of 3 μm is formed. Thus, the manufacture of an electrophotographic photoreceptor is completed.

Comparative Example 1

An electrophotographic photoreceptor in Comparative Example 1 is manufactured in the same manner as in Example 3 except that phenolsulfonic acid is not added to the protective layer-forming coating solution.

Comparative Example 2

An electrophotographic photoreceptor in Comparative Example 2 is manufactured in the same manner as in Example 3 except that 3 weight parts of triphenylamine is used in place of 3 weight parts of the exemplified compound (III-6), and 10 weight parts of butanol and 10 weight parts of cyclohexanone are used in place of 20 weight parts of butanol in the protective layer-forming coating solution.

Comparative Example 3

An electrophotographic photoreceptor in Comparative Example 3 is manufactured in the same manner as in Example 3 except that 0.02 weight parts of hexamethylenetetramine is used in place of 0.02 weight parts of phenolsulfonic acid in the protective layer-forming coating solution.

Evaluation Test 1 of Film Forming Property:

The surfaces of electrophotographic photoreceptors (the surfaces of the protective layers) prepared in Examples 1 to 7 and Comparative Examples 1 to 3 are observed with an optical microscope, and the film-forming property of each sample is evaluated according to the following criteria of evaluation by counting the number of projection-like failures on the surface (a projection having a maximum breadth of about 50 μm or more) The results obtained are shown in Table 62 below.

A: Projection-like failure is not observed on the surface of an electrophotographic photoreceptor.

B: Projection-like failures of 50 or less are observed on the surface of an electrophotographic photoreceptor (practicable).

C: Projection-like failures of from 50 to 100 are observed on the surface of an electrophotographic photoreceptor (becomes a problem in practical use in a color machine strict in speck).

D: Projection-like failures exceeding 100 are observed on the surface of an electrophotographic photoreceptor (becomes a problem in practical use).

Electrification and Exposure Test:

The electrophotographic photoreceptors prepared in Examples 1 to 7 and Comparative Examples 1 to 3 are subjected to the following processes (A), (B) and (C) under high temperature high humidity condition (27° C. 75% RH).

(A) Electrification process of charging an electrophotographic photoreceptor with a scorotron charger of grid application voltage of −700 V (B) Exposure process of radiating light of 10.0 erg/cm$^2$ with a semiconductor laser having a wavelength of 780 nm, 1 sec. after process (A)

(C) Discharg process of radiating red LED (a wavelength of 780 nm) of 50.0 erg/cm$^2$, 3 sec. after process (A)

In the processes, a laser printer-modified scanner (XP-15 manufactured by Fuji Xerox Co., Ltd. ismodified) is used. Process (A) and process (B) of 100 kcycle are repeated, and the amount of potential variation $\Delta V_{RP}$ (absolute value) is obtained from the potential ($V_{RP}$) in performing process (C) at the time of 1 kcycle and the potential ($V_{RP}$) in performing process (C) at the time of 100 kcycle. On the basis of the amount of potential variation $\Delta V_{RP}$, the stability by repetition of each electrophotographic photoreceptor is evaluated according to the following criteria of evaluation. The results obtained are shown in Table 62 below.

A: $\Delta V_{RP}$ is 10 V or less (offers no problem).

B: $\Delta V_{RP}$ is 20 V or less (offers no problem in practical use).

C: $\Delta V_{RP}$ is 30 V or less (there is the possibility of becoming a problem during long term use).

D: $\Delta V_{RP}$ is 30 V or more (becomes a problem in practical use).

Machine Running Test 1:

Each of the electrophotographic photoreceptors prepared in Examples 1 to 7 and Comparative Examples 1 to 3 is mounted on a printer DocuCentre Color 500 (manufactured by Fuji Xerox Co., Ltd.) equipped with a transfer intermediate, a blade member, a fibrous cleaning member, and a lubricating material-supplying member to manufacture an image-forming apparatus. An image-forming test (image density: about 5%) of the quantity corresponding to 5,000 sheets of paper is performed by no paper mode under a high temperature high humidity condition (28° C. 80% RH), and then an image-forming test (image density: about 5%) of the quantity corresponding to 5,000 sheets of paper is performed under a low temperature low humidity condition (10° C. 20% RH) with the above image-forming apparatus, and under a high temperature high humidity condition (28° C. 80% RH) after the above tests, the image quality (1 dot line diagonal 45° fine line reproducibility and 20% halftone reproducibility) is evaluated according to the following criteria of evaluation. When there are defects, e.g., projection-like failures and streaky peeling failures, on an electrophotographic photoreceptor, the image quality evaluation is performed where there are no defects. The results obtained are shown in Table 62 below.

A: Out of problem.

B: A little reduction of density is observed (out of problem in practical use).

C: The reduction of density is observed (becomes a problem in practical use).

Machine Running Test 2:

Each of the electrophotographic photoreceptors prepared in Examples 1 to 7 and Comparative Examples 1 to 3 is mounted on a printer DocuColor 1256GA (manufactured by Fuji Xerox Co., Ltd.) equipped with multi-beam surface emission lasers to manufacture an image-forming apparatus. After an image forming test (image density: about 5%) of the quantity corresponding to 5,000 sheets of paper is performed by general mode under a high temperature high humidity condition (28° C. 80% RH), and then an image-forming test (image density: about 5%) of the quantity corresponding to 5,000 sheets of paper is performed under a low temperature low humidity condition (10° C. 20% RH) with the above image-forming apparatus, the image quality (1 dot line diagonal 45° fine line reproducibility and 20% halftone reproducibility) under a high temperature high humidity condition (28° C. 80% RH) is evaluated according to the criteria of evaluation shown above (machine running test 1). The results obtained are shown in Table 62 below.

Machine Running Test 3:

Each of the electrophotographic photoreceptors prepared in Examples 1 to 7 and Comparative Examples 1 to 3 is mounted on a printer DocuCentre Color 400CP (manufactured by Fuji Xerox Co., Ltd.) to manufacture an image-forming apparatus. After an image-forming test (image density: about 5%) of the quantity corresponding to 5,000 sheets of paper is performed by general mode under a high temperature high humidity condition (28° C. 80% RH), and then an image-forming test (image density: about 5%) of the quantity corresponding to 5,000 sheets of paper is performed under a low temperature low humidity condition (10° C. 20% RH) with the above image-forming apparatus, the image quality (1 dot line diagonal 45° fine line reproducibility and 20% halftone reproducibility) under a high temperature high humidity condition (28° C. 80% RH) is evaluated according to the criteria of evaluation shown above (machine running test 1). The results obtained are shown in Table 62 below.

Evaluation Test 2 of Film Forming Properties:

The surface (the surface of the protective layer) of each of the electrophotographic photoreceptors in Examples 1 to 7 and Comparative Examples l to 3 after machine running test 2 is observed with an optical microscope, and the number of streaky peeling failures on the surface is counted and evaluated according to the following criteria of evaluation. The results obtained are shown in Table 62 below.

A: Streaky peeling failure is not found.

B: Five or less streaky peeling failures (1 mm in the direction of process, 0.5 mm or more in breadth) are confirmed on the photoreceptor (offers no problem in practical use).

C: Streaky peeling failures of more than 5 and 20 or less (1 mm in the direction of process, 0.5 mm or more in breadth) are confirmed on the photoreceptor (becomes a problem in practical use in a color machine strict in speck).

D: Streaky peeling failures of more than 20 (1 mm in the direction of process, 0.5 mm or more in breadth) are confirmed on the photoreceptor (becomes a problem in practical use).

TABLE 62

| Ex. No. | Evaluation Test 1 of Film Forming Properties (initial stage) | Evaluation Test 2 of Film Forming Properties (surface properties) (after printing) | $\Delta V_{RP}$ | Machine Running Test 1 Fine Line Reproducibility | Machine Running Test 1 Halftone Reproducibility | Machine Running Test 2 Fine Line Reproducibility | Machine Running Test 2 Halftone Reproducibility | Machine Running Test 3 Fine Line Reproducibility | Machine Running Test 3 Halftone Reproducibility |
|---|---|---|---|---|---|---|---|---|---|
| Ex. 1 | A | B | A | A | A | A | A | A | A |
| Ex. 2 | A | B | A | A | A | A | A | A | A |
| Ex. 3 | A | B | A | A | A | A | A | A | A |
| Ex. 4 | A | A | A | A | A | A | A | A | A |
| Ex. 5 | A | A | A | A | A | A | A | A | A |
| Ex. 6 | A | A | A | A | A | A | A | A | A |
| Ex. 7 | B | B | A | A | A | A | A | A | A |
| Comp. Ex. 1 | C | C | C | B | B | B | B | B | B |
| Comp. Ex. 2 | D | Evaluation is impossible due to poor film forming properties (projection-like failures exceeded 100, and blanks by peeling of 50 or so are confirmed). | | | | | | | |
| Comp. Ex. 3 | B | D | C | B | B | B | B | B | B |

As can be seen from the results shown in Table 62, it is confirmed that the electrophotographic photoreceptors in the exemplary embodiments of the invention (Examples 1 to 7) are stable in electric charactertitics even in long term use, little in image degradation, so that high image quality and long life can be realized, as compared with the electrophotographic photoreceptors in Comparative Examples 1 to 3. Further, the process cartridges and the image-forming apparatus in the exemplary embodiments of the invention can sufficiently restrain image defects and realize high image quality and long life. It is further confirmed from the above results that the functional layer of an electrophotographic photoreceptor having mechanical strength and electric characteristics at the same time achieved in a high level can be formed according to the curable resin composition in the exemplary embodiments of the invention.

What is claimed is:

1. A curable resin composition comprising:

a resol type phenolic resin;

a charge transportable material having a reactive functional group; and at least one of an organic sulfonic acid and its derivative;

wherein the charge transportable material having a reactive functional group comprises one or more of a compound represented by formula (II), (III), (IV) or (XX):

$$F[-(X^2)_{n2}-(R^2)_{n3}-(Z^2)_{n4}G]_{n5} \qquad (II)$$

wherein F represents an organic group derived from a compound having a positive hole-transporting property; $X^2$ represents an oxygen atom or a sulfur atom; $R^2$ represents an alkylene group; $Z^2$ represents an oxygen atom, a sulfur atom, NH, or COO; G represents an epoxy group; n2 and n3 each represent 0 or 1; n4 represents 1; and n5 represents an integer of from 1 to 4;

(III)

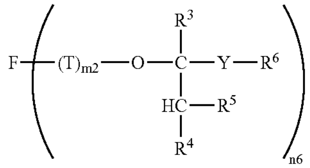

wherein F represents an organic group derived from a compound having a positive hole-transporting property; T represents a divalent group; Y represents an oxygen atom or a sulfur atom; $R^3$, $R^4$ and $R^5$ each represents a hydrogen atom or a monovalent organic group; $R^6$ represents a monovalent organic group; m2 represents 1; and n6 represents an integer of from 1 to 4; provided that $R^5$ and $R^6$ may be bonded to each other to form a heterocyclic ring with Y as a hetero atom;

(IV)

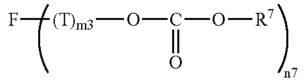

wherein F represents an organic group derived from a compound having a positive hole-transporting property; T represents a divalent group; $R^7$ represents a monovalent organic group; m3 represents 0 or 1; and n7 represents an integer of from 1 to 4;

(XX)

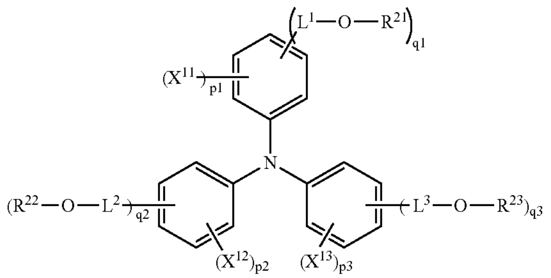

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styrvl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies q1+q2+q3≧1.

2. The curable resin composition as claimed in claim 1, wherein content of said at least one of the organic sulfonic acid and its derivative is from about 0.01 to about 5 weight % based on total solids content in the curable resin composition.

3. The curable resin composition as claimed in claim 1, wherein F is a group represented by formula (V):

(V)

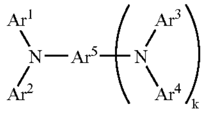

wherein $Ar^1$, $Ar^2$, $Ar^3$ and $Ar^4$ each represents a substituted or unsubstituted aryl group; $Ar^5$ represents a substituted or unsubstituted aryl group or arylene group; provided that from 1 to 4 of $Ar^1$ to $Ar^5$ have a hand to be bonded to: a site represented by formula (VII) in the compound represented by formula (II), a site represented by formula (VIII) in the compound represented by formula (III); or a site represented by formula (IX) in the compound represented by formula (IV):

$$—(X^2)_{n2}—(R^2)_{n3}—(Z^2)_{n4}G \quad (VII)$$

(VIII)

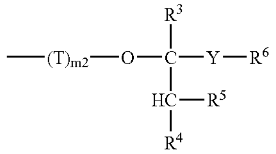

(IX)

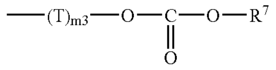

4. An electrophotographic photoreceptor comprising:

an electrically conductive support; and a photosensitive layer comprising a functional layer, provided on the electrically conductive support, wherein the functional layer comprising a cured product of a curable resin that comprises: a resol type phenolic resin; a charge transportable material having a reactive functional group; and at least one of an organic sulfonic acid and its derivative;

wherein the charge transportable material having a reactive functional group comprises one or more of a compound represented by formula (II), (III), (IV) or (XX):

$$F[—(X^2)_{n2}—(R^2)_{n3}\text{-}(Z^2)_{n4}G]_{n5} \quad (II)$$

wherein F represents an organic group derived from a compound having a positive hole-transporting property; $X^2$ represents an oxygen atom or a sulfur atom; $R^2$ represents an alkylene group; $Z^2$ represents an oxygen atom, a sulfur atom, NH, or COO; G represents an epoxy group; n2 and n3 each represent 0 or 1; n4 represents 1; and n5 represents an integer of from 1 to 4;

(III)

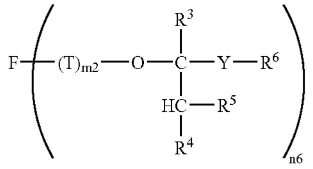

wherein F represents an organic group derived from a compound having a positive hole-transporting property; T represents a divalent group; Y represents an oxygen atom or a sulfur atom; $R^3$, $R^4$ and $R^5$ each represents a hydrogen atom or a monovalent organic group; $R^6$ represents a monovalent organic group; m2 represents 1; and n6 represents an integer of from 1 to 4; provided that $R^5$ and $R^6$ may be bonded to each other to form a heterocyclic ring with Y as a hetero atom;

(IV)

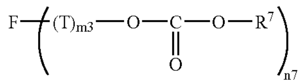

wherein F represents an organic group derived from a compound having a positive hole-transporting property; T represents a divalent group; $R^7$ represents a monovalent organic group; m3 represents 0 or 1; and n7 represents an integer of from 1 to 4;

(XX)

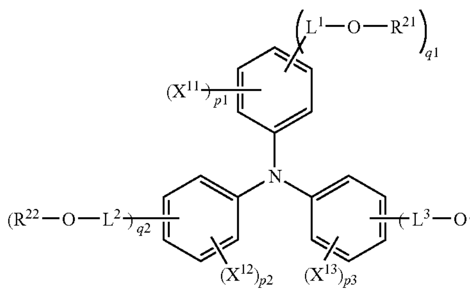

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group: $L^1$, $L^2$ and $L^3$ each represents an alkylene group; p1, p2 and p3 each represents an integer from 0 to 2; and q1, q2 and q3 each represents 0 or 1, and satisfies $q1+q2+q3 \geqq 1$.

5. The electrophotographic photoreceptor as claimed in claim 4, wherein content of said at least one of the organic sulfonic acid and its derivative is from about 0.01 to about 5 weight % based on total solids content in the curable resin composition.

6. The electrophotographic photoreceptor as claimed in claim 4, wherein F is a group represented by formula (V):

(V)

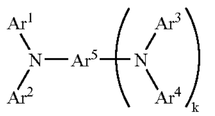

wherein $Ar^1$, $Ar^2$, $Ar^3$ and $Ar^4$ each represents a substituted or unsubstituted aryl group; $Ar^5$ represents a substituted or unsubstituted aryl group or arylene group; provided that from 1 to 4 of $Ar^1$ to $Ar^5$ have a hand to be bonded to: a site represented by formula (VII) in the compound represented by formula (II), a site represented by formula (VIII) in the compound represented by formula (III); or a site represented by formula (IX) in the compound represented by formula (IV):

$$—(X^2)_{n2}—(R^2)_{n3}—(Z^2)_{n4}G \quad \text{(VII)}$$

(VIII)

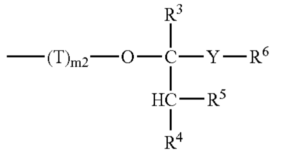

(IX)

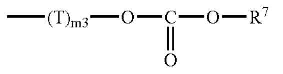

7. The electrophotographic photoreceptor as claimed in claim 4, wherein the functional layer is an outermost surface layer arranged farthest from the electrically conductive support.

8. A process cartridge comprising:

(i) an electrophotographic photoreceptor comprising:

an electrically conductive support; and a photosensitive layer comprising a functional layer, provided on the electrically conductive support, wherein the functional layer comprising a cured product of a curable resin that comprises: a resol type phenolic resin; a charge transportable material having a reactive functional group; and at least one of an organic sulfonic acid and its derivative; and (ii) at least one selected from the group consisting of an charging section that charges the electrophotographic photoreceptor, a developing section that forms a toner image by developing an electrostatic latent image formed on the electrophotographic photoreceptor with a toner, and a cleaning section that removes the residual toner on a surface of the electrophotographic photoreceptor;

wherein the charge transportable material having a reactive functional group comprises one or more of a compound represented by formula (II), (III), (IV) or (XX):

$$F[—(X^2)_{n2}—(R^2)_{n3}\text{-}(Z^2)_{n4}G]_{n5} \quad \text{(II)}$$

wherein F represents an organic group derived from a compound having a positive hole-transporting property; $X^2$ represents an oxygen atom or a sulfur atom; $R^2$ represents an alkylene group; $Z^2$ represents an oxygen atom, a sulfur atom, NH, or COO; G represents an epoxy group; n2 and n3 each represent 0 or 1; n4 represents 1; and n5 represents an integer of from 1 to 4;

(III)

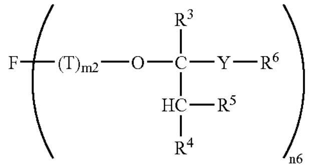

wherein F represents an organic group derived from a compound having a positive hole-transporting property; T represents a divalent group; Y represents an oxygen atom or a sulfur atom; $R^3$, $R^4$ and $R^5$ each represents a hydrogen atom or a monovalent organic group; $R^6$ represents a monovalent organic group; m2 represents 1; and n6 represents an integer of from 1 to 4; provided that $R^5$ and $R^6$ may be bonded to each other to form a heterocyclic ring with Y as a hetero atom;

(IV)

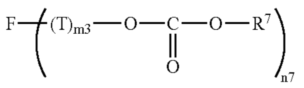

wherein F represents an organic group derived from a compound having a positive hole-transporting property; T represents a divalent group; $R^7$ represents a monovalent organic group; m3 represents 0 or 1; and n7 represents an integer of from 1 to 4;

(XX)

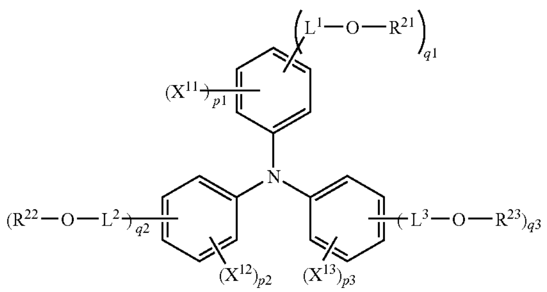

wherein $x^{11}$, $x^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1,and satisfies $q1+q2+q3 \geqq 1$.

9. An image-forming apparatus comprising:

(i) an electrophotographic photoreceptor comprising:

an electrically conductive support; and a photosensitive layer comprising a functional layer, provided on the electrically conductive support, wherein the functional layer comprising a cured product of a curable resin that comprises: a resol type phenolic resin; a charge transportable material having a reactive functional group; and at least one of an organic sulfonic acid and its derivative;

(ii) an charging section that charges the electrophotographic photoreceptor;

(iii) an exposure section that forms an electrostatic latent image on the electrically charged electrophotographic photoreceptor;

(iv) a developing section that forms a toner image by developing the electrostatic latent image with a toner; and (v) a transfer section that transfers the toner image from the electrophotographic photoreceptor to an object to be transferred;

wherein the charge transportable material having a reactive functional group comprises one or more of a compound represented by formula (II), (III), (IV) or (XX):

$$F[-(X^2)_{n2}-(R^2)_{n3}\text{-}(Z^2)_{n4}G]_{n5} \quad \text{(II)}$$

wherein F represents an organic group derived from a compound having a positive hole-transporting property; $X^2$ represents an oxygen atom or a sulfur atom; $R^2$ represents an alkylene group; $Z^2$ represents an oxygen atom, a sulfur atom, NH, or COO; G represents an epoxy group; n2 and n3 each represent 0 or 1; n4 represents 1; and n5 represents an integer of from 1 to 4;

(III)

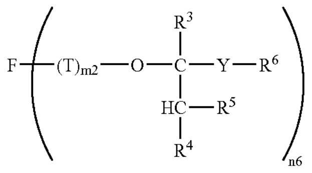

wherein F represents an organic group derived from a compound having a positive hole-transporting property; T represents a divalent group; Y represents an oxygen atom or a sulfur atom; $R^3$, $R^4$ and $R^5$ each represents a hydrogen atom or a monovalent organic group; $R^6$ represents a monovalent organic group; m2 represents 1; and n6 represents an integer of from 1 to 4; provided that $R^5$ and $R^6$ may be bonded to each other to form a heterocyclic ring with Y as a hetero atom;

(IV)

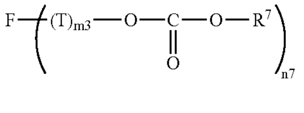

wherein F represents an organic group derived from a compound having a positive hole-transporting property; T represents a divalent group; $R^7$ represents a monovalent organic group; m3 represents 0 or 1; and n7 represents an integer of from 1 to 4;

(XX)

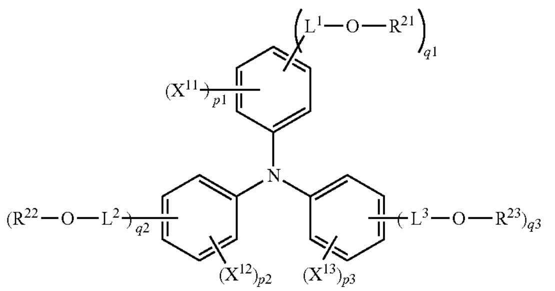

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethvl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies q1+q2+q3≧1.

10. The image-forming apparatus as claimed in claim 9 further comprising a cleaning section that cleans a surface of the electrophotographic photoreceptor after image transfer, the cleaning section comprising at least one of a blade member and a fibrous member.

11. The image-forming apparatus as claimed in claim 9, wherein the transfer section transfers the toner image on a surface of the electrophotographic photoreceptor to the object to be transferred via a transfer intermediate.

12. The curable resin composition as claimed in claim 1, wherein the charge transportable material having a reactive functional group comprises a compound represented by formula (XX):

(XX)

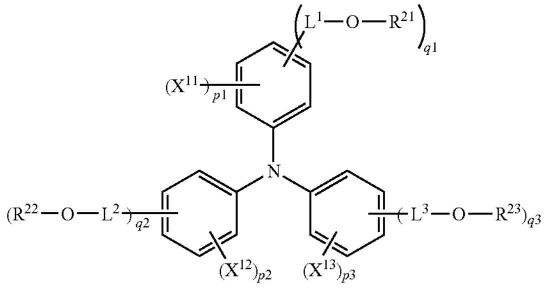

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies q1+q2+q3≧1.

13. The electrophotographic photoreceptor as claimed in claim 4, wherein the charge transportable material having a reactive functional group comprises a compound represented by formula (XX):

(XX)

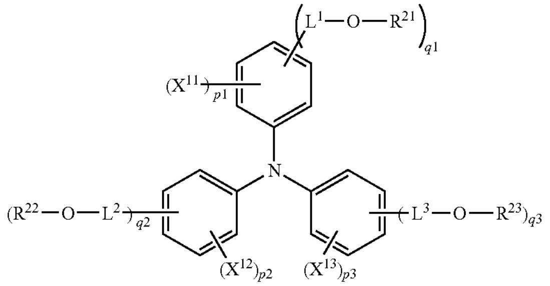

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies q1+q2+q3≧1.

14. The process cartridge as claimed in claim 8, wherein the charge transportable material having a reactive functional group comprises a compound represented by formula (XX):

(XX)

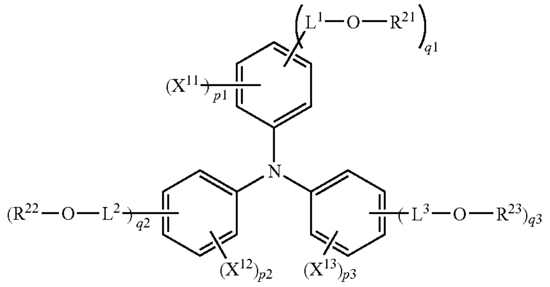

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies q1+q2+q3≧1.

15. The image-forming apparatus as claimed in claim 9, wherein the charge transportable material having a reactive functional group comprises a compound represented by formula (XX):

(XX)

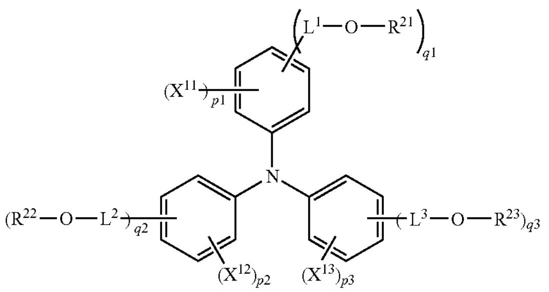

wherein $X^{11}$, $X^{12}$ and $X^{13}$ each represents a halogen atom, an alkyl group having from 1 to 10 carbon atoms, an alkoxyl group having from 1 to 10 carbon atoms, a substituted or unsubstituted aryl group, an aralkyl group having from 7 to 10 carbon atoms, a substituted or unsubstituted styryl group, a substituted or unsubstituted butadiene group, or a substituted or unsubstituted hydrazone group; $R^{21}$, $R^{22}$ and $R^{23}$ each represents one selected from the group consisting of a methyl group, ethyl group, n-propyl group, i-propyl group, i-butyl group, hydroxylethyl group, methoxyethyl group, ethoxymethyl group, methoxy group, ethoxy group, and propoxy group; $L^1$, $L^2$ and $L^3$ each represents an alkylene group; p1, p2 and p3 each represents an integer from 0 to 2; and q1, q2 and q3 each represents 0 or 1, and satisfies $q1+q2+q3 \geqq 1$.

* * * * *